US010375578B2

(12) United States Patent
Yerramalli et al.

(10) Patent No.: US 10,375,578 B2
(45) Date of Patent: Aug. 6, 2019

(54) EIMTA CONFIGURATION FOR LTE IN UNLICENSED SPECTRUM

(71) Applicant: QUALCOMM Incorporated, San Diego, CA (US)

(72) Inventors: Srinivas Yerramalli, San Diego, CA (US); Tao Luo, San Diego, CA (US); Peter Gaal, San Diego, CA (US); Wanshi Chen, San Diego, CA (US); Xiaoxia Zhang, San Diego, CA (US); Hao Xu, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 15/004,628

(22) Filed: Jan. 22, 2016

(65) Prior Publication Data

US 2016/0227417 A1 Aug. 4, 2016

Related U.S. Application Data

(60) Provisional application No. 62/109,599, filed on Jan. 29, 2015.

(51) Int. Cl.
*H04W 16/14* (2009.01)
*H04L 5/00* (2006.01)
(Continued)

(52) U.S. Cl.
CPC ............. *H04W 16/14* (2013.01); *H04L 5/001* (2013.01); *H04L 5/0098* (2013.01);
(Continued)

(58) Field of Classification Search
CPC ..................................................... H04W 16/14
See application file for complete search history.

(56) References Cited

U.S. PATENT DOCUMENTS

2013/0163543 A1* 6/2013 Freda ................ H04W 72/0406
370/329
2013/0343288 A1 12/2013 Ratasuk et al.
(Continued)

FOREIGN PATENT DOCUMENTS

EP  2696530 A2  2/2014

OTHER PUBLICATIONS

International Search Report and Written Opinion—PCT/US2016/014768—ISA/EPO—dated May 6, 2016.

*Primary Examiner* — Jeffrey M Rutkowski
*Assistant Examiner* — Chae S Lee
(74) *Attorney, Agent, or Firm* — Nerrie M. Zohn

(57) ABSTRACT

In the application of TDD and eIMTA to LTE in the unlicensed spectrum, various alterations may be needed to compensate for interference from and the behavior of RATs operating in this range of frequencies. Various UE and base station methods are presented, including modified TDD configurations and UE behaviors to advance operations on unlicensed spectrum. A method, an apparatus, and a computer-readable medium for wireless communication are provided whereby configuration information is conveyed to a UE for communicating on a carrier in the unlicensed spectrum. The configuration information indicates a subframe allocation for at least one frame on the unlicensed carrier. Other aspects are directed to the detection of the transmission, communication of new and modified eIMTA configuration transmissions, and mechanism and behaviors which address unreceived configuration information.

28 Claims, 26 Drawing Sheets

(51) Int. Cl.
*H04W 72/04* (2009.01)
*H04W 72/12* (2009.01)
*H04W 72/14* (2009.01)

(52) U.S. Cl.
CPC ..... *H04W 72/042* (2013.01); *H04W 72/1289* (2013.01); *H04W 72/14* (2013.01); *H04W 72/0446* (2013.01)

(56) References Cited

U.S. PATENT DOCUMENTS

| | | | | |
|---|---|---|---|---|
| 2014/0044105 | A1* | 2/2014 | Bontu | H04L 5/001 370/336 |
| 2014/0313993 | A1* | 10/2014 | Tabet | H04W 72/042 370/329 |
| 2015/0245219 | A1* | 8/2015 | Wei | H04W 16/14 370/336 |
| 2015/0245376 | A1* | 8/2015 | Bashar | H04L 1/18 370/277 |
| 2015/0264678 | A1* | 9/2015 | Yin | H04W 52/22 370/329 |

\* cited by examiner

EIMTA CONFIGURATION FOR LTE IN UNLICENSED SPECTRUM

CROSS-REFERENCE TO RELATED APPLICATION(S)

This application claims the benefit of U.S. Provisional Application Ser. No. 62/109,599, entitled "EIMTA CONFIGURATION FOR LTE IN UNLICENSED SPECTRUM" and filed on Jan. 29, 2015, which is expressly incorporated by reference herein in its entirety.

BACKGROUND

Field

The present disclosure relates generally to communication systems, and more particularly, to techniques applying enhanced interference mitigation and traffic adaptation (eIMTA) configuration to LTE in an unlicensed spectrum.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In LTE, a physical downlink control channel (PDCCH) scrambled with eIMTA radio network temporary identifier (RNTI) may carry several eIMTA configurations (e.g., DL/UL configurations). Further, these eIMTA configurations may correspond to different carriers scheduled as part of a multi-carrier configuration. There is a need for techniques that enable use of eIMTA procedures for LTE on unlicensed spectrum.

SUMMARY

In the application of time division duplex (TDD) and eIMTA to LTE in the unlicensed spectrum various alterations may be needed to compensate for interference from and the behavior of radio access technologies (RATs) operating in this range of frequencies. Various UE and base station methods are presented, including modified TDD configurations and UE behaviors to advance operations on unlicensed spectrum. A method, an apparatus, and a computer-readable medium for wireless communication are provided whereby configuration information is conveyed to a UE for communicating on a carrier in the unlicensed spectrum. The configuration information indicates a subframe allocation for at least one frame on the unlicensed carrier. Other aspects are directed to the detection of the transmission, communication of new and modified eIMTA configuration transmissions, and mechanism to address unreceived configuration information.

In an aspect of the disclosure, a method, a computer-readable medium, and an apparatus are provided. The apparatus may be an UE. The UE receives first configuration information for a secondary component carrier (SCC) in a first frame on a primary component carrier (PCC) from a base station. The PCC is in a licensed spectrum. The SCC is in an unlicensed spectrum. The first configuration information indicates a first subframe allocation for at least one frame on the SCC. The UE attempts to detect a start of data transmission from the base station on the SCC. The UE receives a downlink subframe from the base station during the at least one frame on the SCC in accordance with the first subframe allocation when the attempt to detect the start of data transmission is successful. The downlink subframe is an initial subframe of the data transmission and subsequent to the start of the first subframe allocation. Further, the UE includes means for receiving first configuration information for an SCC in a first frame on a PCC from a base station. The PCC is in a licensed spectrum. The SCC is in an unlicensed spectrum. The first configuration information indicates a first subframe allocation for at least one frame on the SCC. The UE also includes means for attempting to detect a start of data transmission from the base station on the SCC. The UE further includes means for receiving a downlink subframe from the base station during the at least one frame on the SCC in accordance with the first subframe allocation when the attempt to detect the start of data transmission is successful. The downlink subframe is an initial subframe of the data transmission and subsequent to the start of the first subframe allocation.

In another aspect of the disclosure, a method, a computer-readable medium, and an apparatus are provided. The apparatus may be an UE. The UE detects a start of data transmission from a base station on a carrier in a first frame. The carrier is in an unlicensed spectrum. The UE attempts to receive first configuration information on the carrier from the base station. The first configuration information indicates a first subframe allocation for at least one frame on the carrier. The UE receives a downlink subframe from the base station during the at least one frame on the carrier in accordance with the first subframe allocation when the attempt to receive the first configuration information on the carrier is successful. The downlink subframe is an initial subframe of the data transmission and subsequent to the start of the first subframe allocation. Further, the UE includes means for detecting a start of data transmission from a base station on a carrier in a first frame. The carrier is in an unlicensed spectrum. The UE also includes means for attempting to receive first configuration information on the carrier from the base station. The first configuration information indicates a first subframe allocation for at least one frame on the carrier. The UE further includes means for receiving a downlink subframe from the base station during the at least one frame on the carrier in accordance with the first subframe allocation when the attempt to receive the first configuration information on the carrier is successful. The downlink subframe is an initial subframe of the data transmission and subsequent to the start of the first subframe allocation.

In another aspect of the disclosure, a method, a computer-readable medium, and an apparatus are provided. The apparatus may be a base station. The base station transmits first configuration information for a SCC in a first frame on a PCC to a UE. The PCC is in a licensed spectrum. The SCC is in an unlicensed spectrum. The first configuration information indicates a first subframe allocation for at least one frame on the SCC. The base station attempts to transmit an indicator indicating a start of data transmission to the UE in accordance with the first subframe allocation on the SCC. The base station transmits a downlink subframe to the UE during the at least one frame on the SCC in accordance with the first subframe allocation when the attempt to transmit the indicator is successful. The downlink subframe is an initial subframe of the data transmission and subsequent to the start of the first subframe allocation. The base station includes means for transmitting first configuration information for an SCC in a first frame on a PCC to a UE. The PCC is in a licensed spectrum. The SCC is in an unlicensed spectrum. The first configuration information indicates a first subframe allocation for at least one frame on the SCC. The base station also includes means for attempting to transmit an indicator indicating a start of data transmission to the UE in accordance with the first subframe allocation on the SCC. The base station further includes means for transmitting a downlink subframe to the UE during the at least one frame on the SCC in accordance with the first subframe allocation when the attempt to transmit the indicator is successful. The downlink subframe being an initial subframe of the data transmission and subsequent to the start of the first subframe allocation.

In another aspect of the disclosure, a method, a computer-readable medium, and an apparatus are provided. The apparatus may be a base station. The base station transmits an indicator indicating a start of data transmission to a UE on a carrier in a first frame. The carrier is in an unlicensed spectrum. The base station attempts to transmit first configuration information on the carrier to the UE. The first configuration information indicates a first subframe allocation for at least one frame on the carrier. The base station transmits a downlink subframe to the UE during the at least one frame on the carrier in accordance with the first subframe allocation when the attempt to transmit the first configuration information on the carrier is successful. The downlink subframe is an initial subframe of the data transmission and subsequent to the start of the first subframe allocation. Further, the base station includes means for transmitting an indicator indicating a start of data transmission to a UE on a carrier in a first frame. The carrier is in an unlicensed spectrum. The base station also includes means for attempting to transmit first configuration information on the carrier to the UE. The first configuration information indicates a first subframe allocation for at least one frame on the carrier. The base station further includes means for transmitting a downlink subframe to the UE during the at least one frame on the carrier in accordance with the first subframe allocation when the attempt to transmit the first configuration information on the carrier is successful. The downlink subframe is an initial subframe of the data transmission and subsequent to the start of the first subframe allocation.

DETAILED DESCRIPTION

Figure 1:
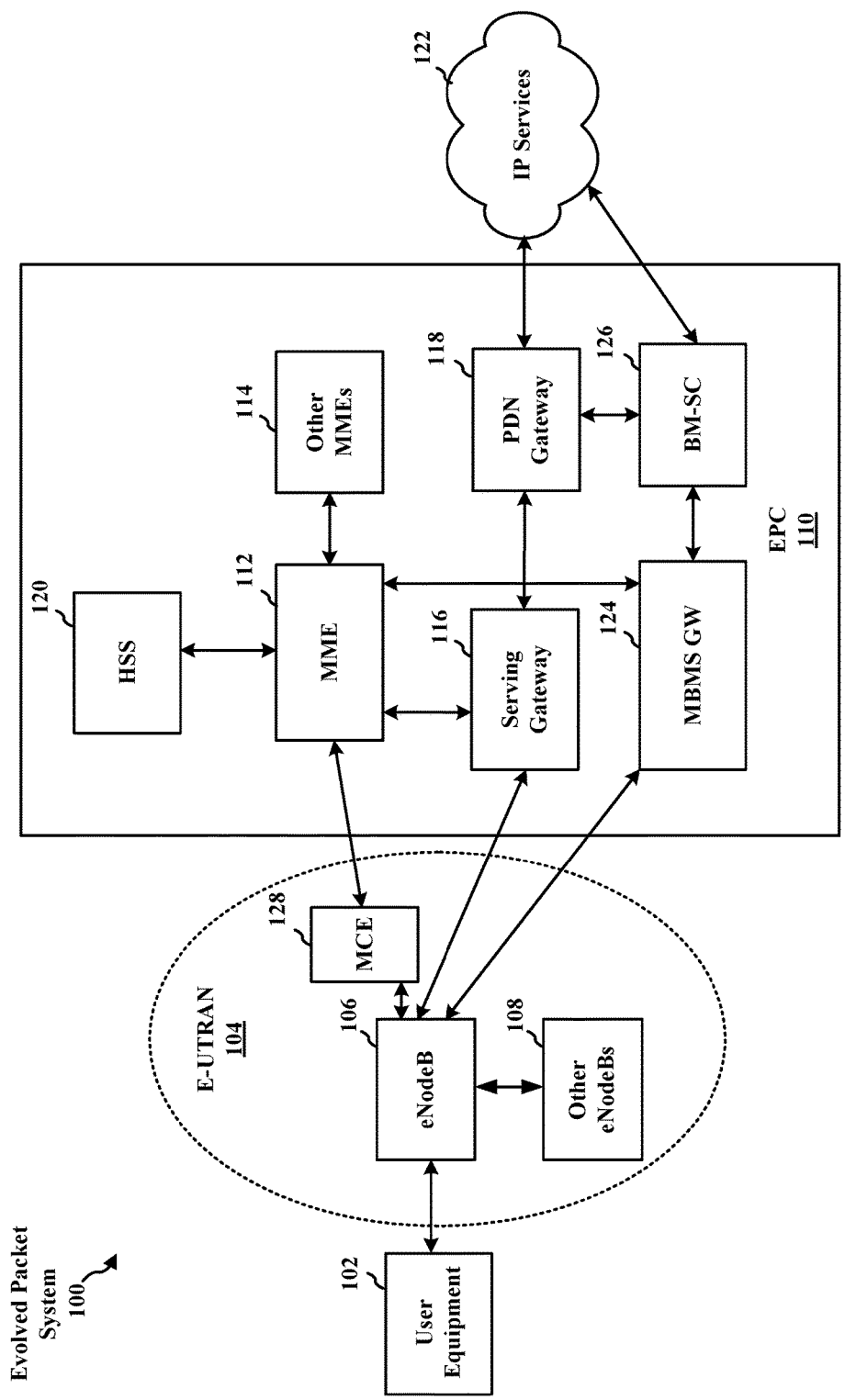
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture. The LTE network architecture may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
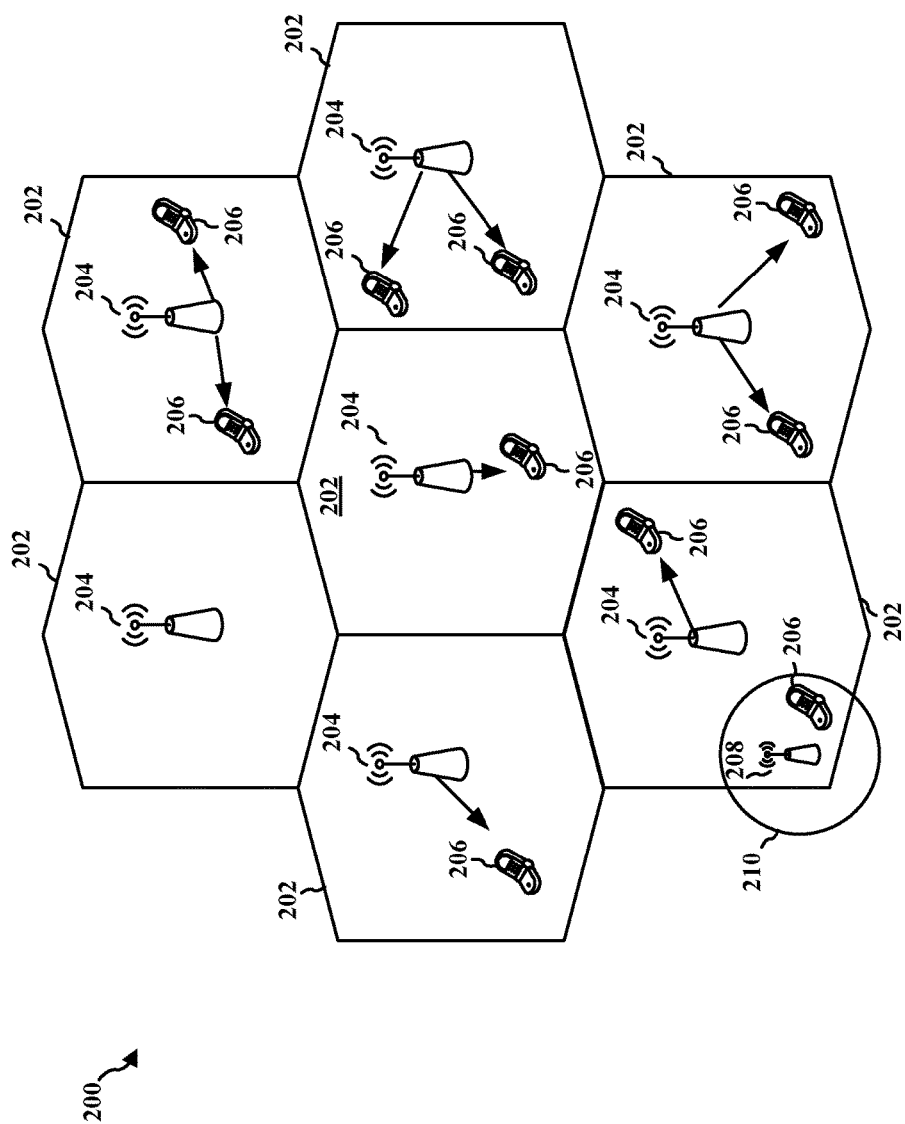
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and TDD. As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
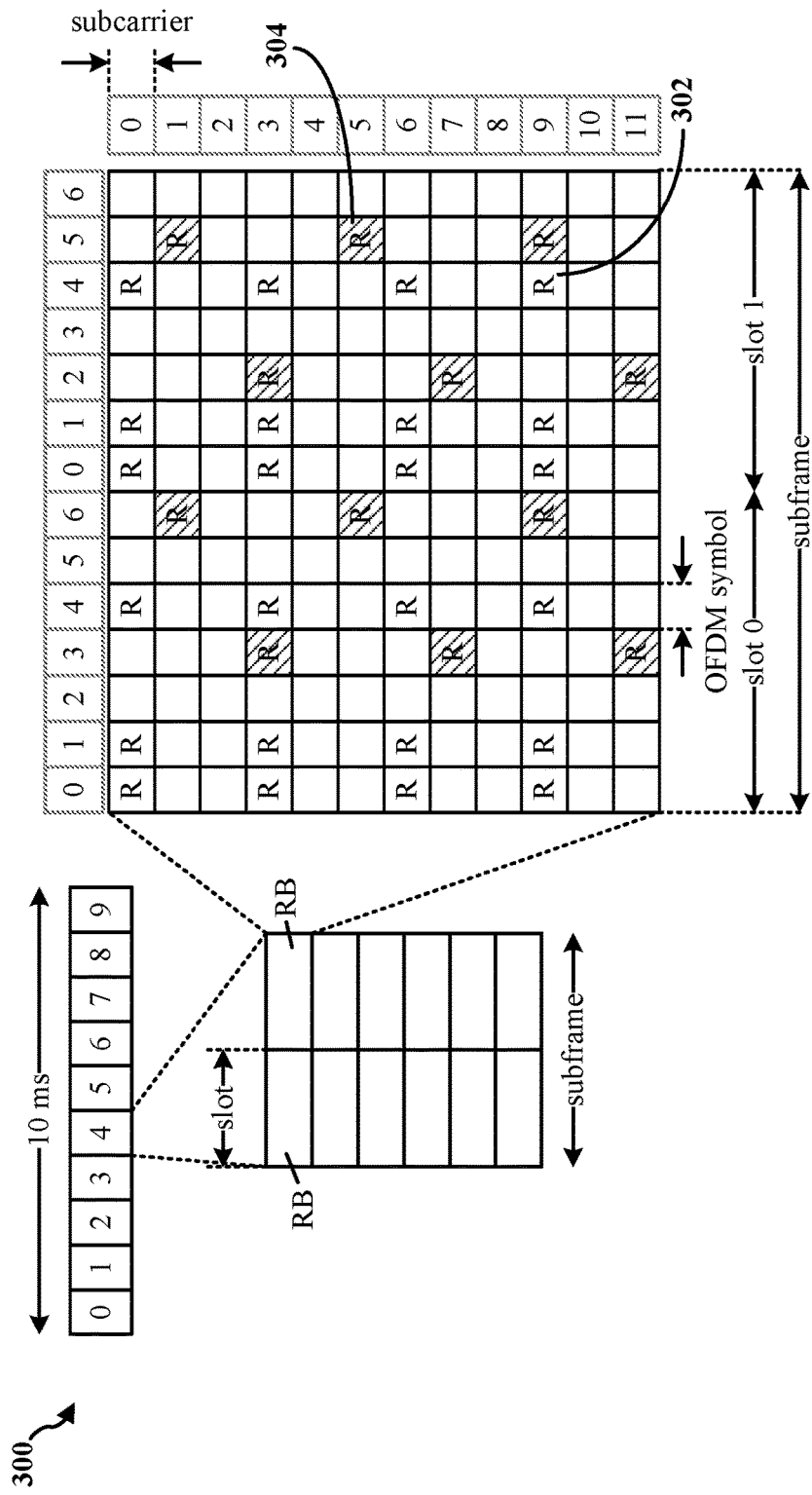
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
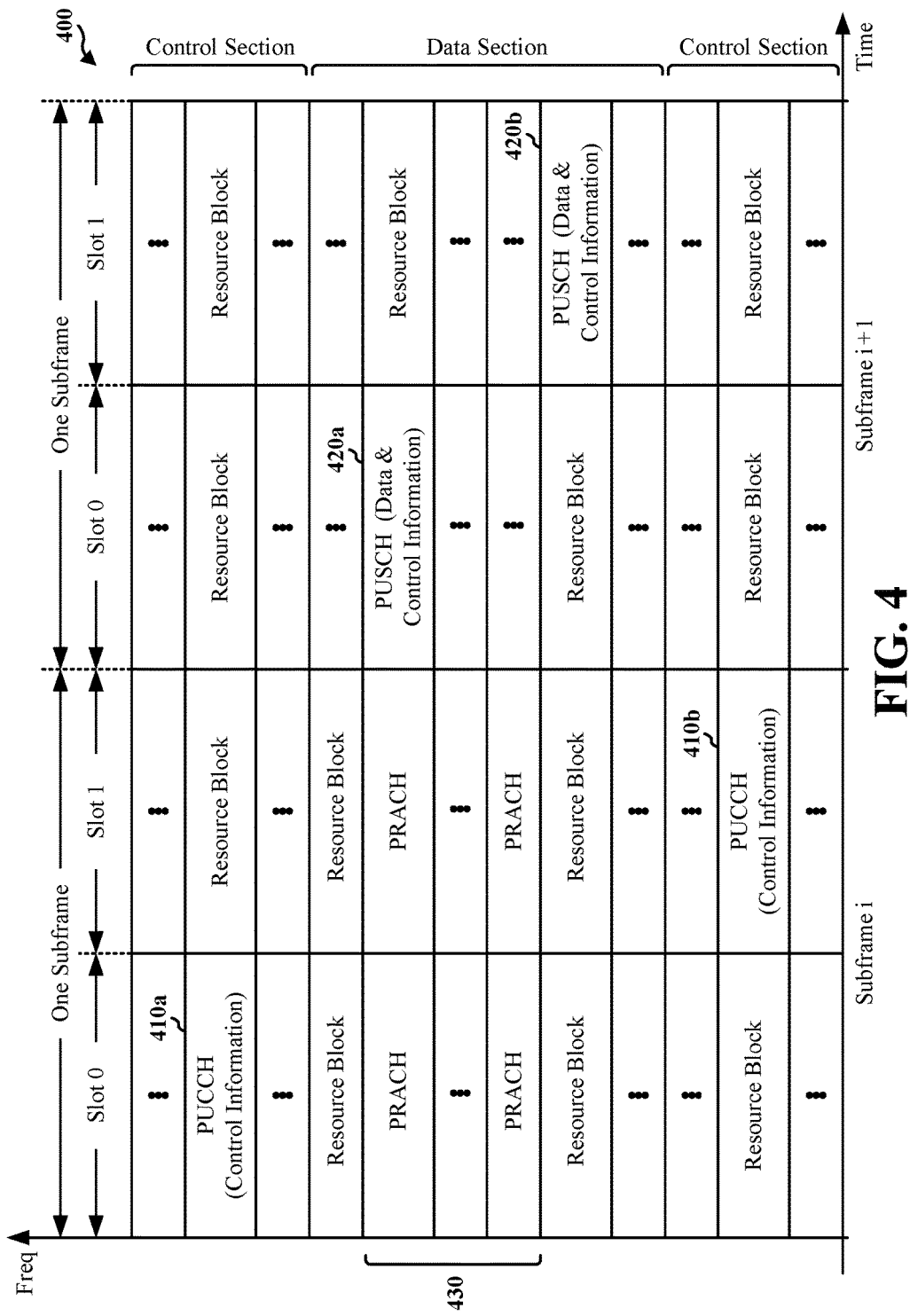
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
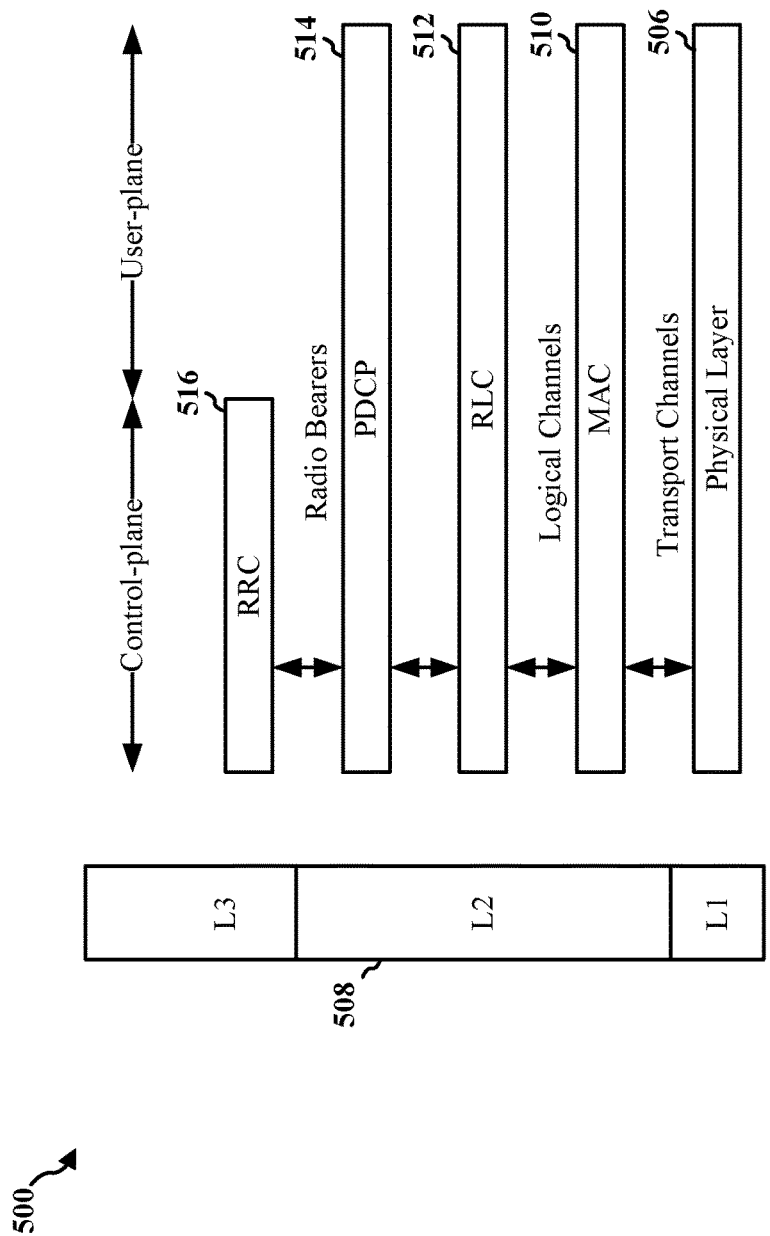
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
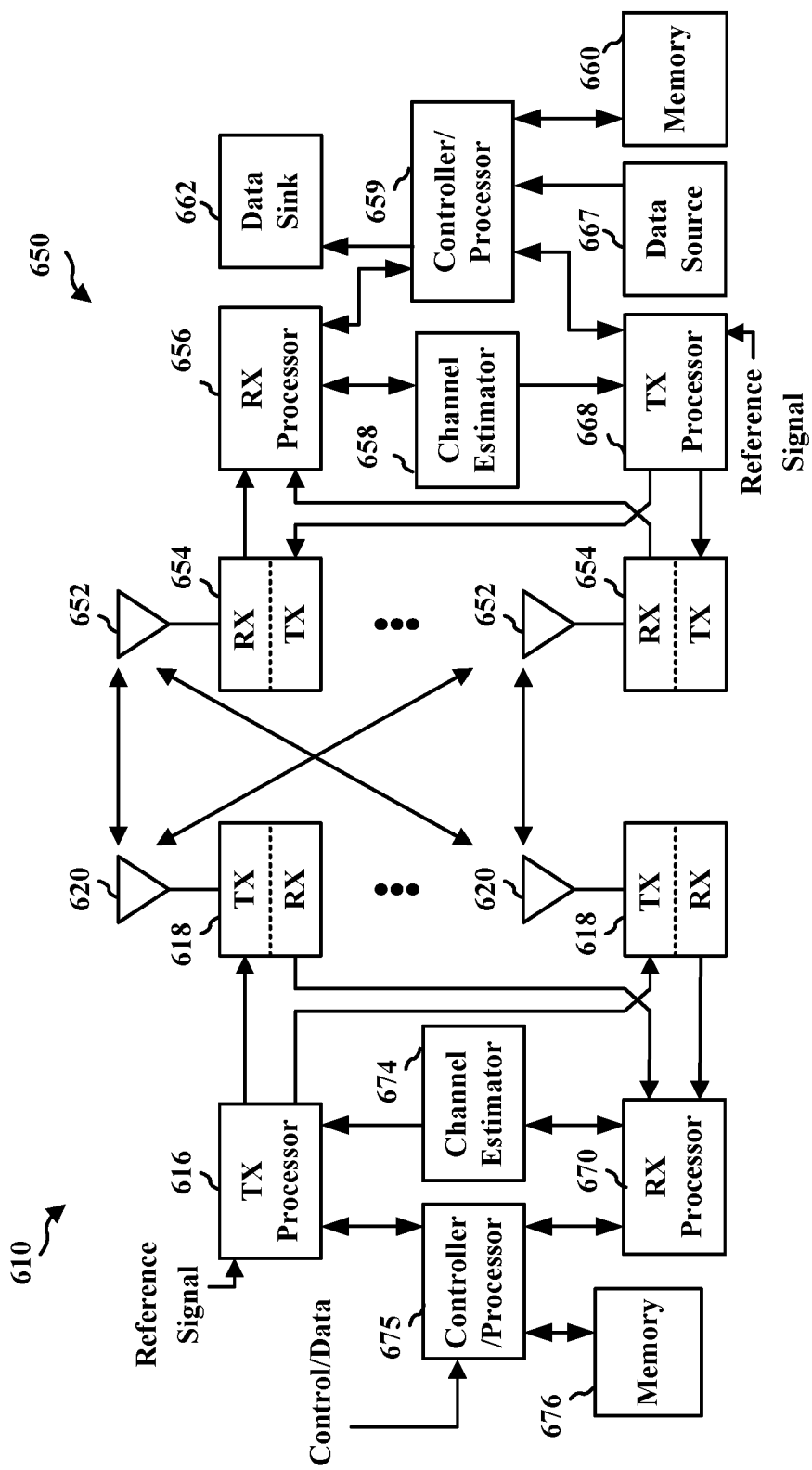
FIG. 6 is a diagram illustrating an example of an evolved Node B (eNB) and a user equipment (UE) in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
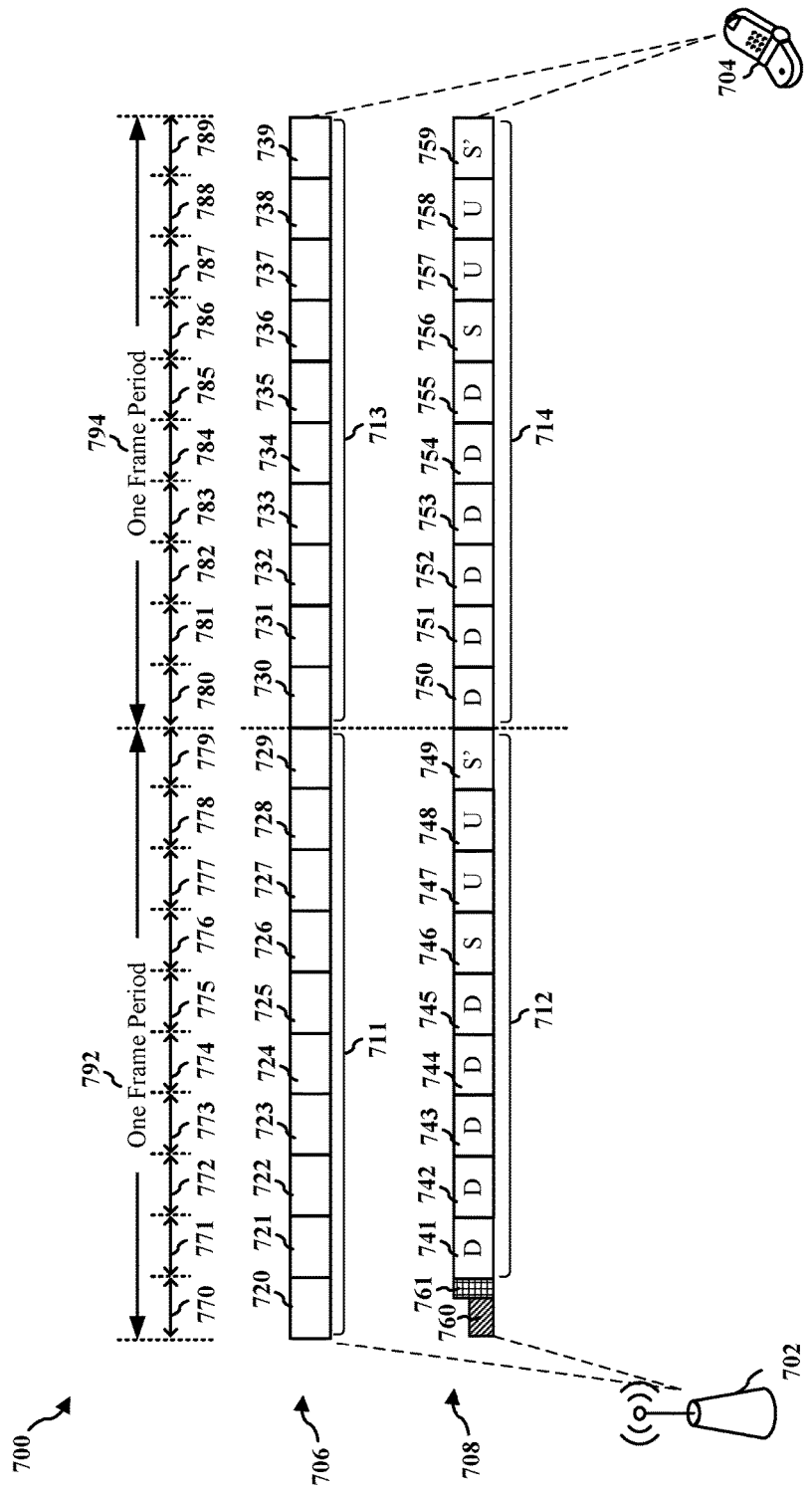
FIG. 7 is a diagram illustrating wireless communication between a UE and an eNB on a primary component carrier (PCC) and a secondary component carrier (SCC) in one configuration.

FIG. 7 is a diagram 700 illustrating wireless communication between a UE and an eNB on a PCC and an SCC in one configuration. An eNB 702 may communicate with a UE 704 on a PCC 706 and an SCC 708. The PCC 706 is in a licensed spectrum and the SCC 708 is in an unlicensed spectrum. The PCC 706 is illustrated with frames 711 and 713 overlapping frame periods 792 and 794, respectively. The frame 711 includes subframes 720-729 overlapping subframe periods 770-779, respectively. The frame 713 includes subframes 730-739 overlapping subframe periods 780-789, respectively. The SCC 708 is illustrated with frames 712 and 714 overlapping frame periods 792 and 794, respectively. The frame 712 includes subframes 741-749 overlapping subframe periods 771-779, respectively. An interference time period 760 and channel reservation and access indication signals 761 (e.g., a Downlink Channel Usage Beacon Sequence (D-CUBS)) are prior to the frame 712. The frame 714 includes subframes 750-759 overlapping subframe periods 780-789, respectively. In one example, the PCC 706 may be configured for downlink (DL) transmissions, and a frame transmitted on the PCC 706 may only contain downlink subframes. However, the PCC 706 may be configured with both uplink and downlink subframes in accordance with TDD or FDD implementations. The SCC 708 is in a TDD mode and may be configured for DL and an uplink (UL) transmissions at different times. A frame transmitted on the SCC 708 may have one or more downlink subframes (D), one or more uplink subframes (U), and/or one or more special subframes (S). Further, the eNB 702 may indicate allocation of downlink subframes, uplink subframes, and/or special subframes for a frame on the SCC 708 in an eIMTA configuration, which is to be transmitted to the UE 704.

A physical downlink control channel (PDCCH) scrambled with eIMTA radio network temporary identifier (RNTI) may carry several eIMTA configurations (e.g., DL/UL configurations). Further, these eIMTA configurations may correspond to different SCCs scheduled as part of the multi-carrier configuration. For example, 15 bits data used in a 20 MHz carrier may indicate 5 possibly different DL/UL configurations. 13 bits data used in a 10 MHz carrier may indicate 4 possibly different DL/UL configurations. The eNB 702 may use an RRC configuration message to indicate to the UE 704 the group of bits to monitor in the PDCCH in order to derive the DL/UL configuration for a given carrier.

Further, the eNB 702 may establish, in addition to the PCC 706 and the SCC 708, one or more SCCs. The UE 704 can monitor a different set of bits in the eIMTA-RNTI based PDCCH on the PCC 706 to derive the DL/UL configuration for a different SCC.

The unlicensed spectrum used by the SCC 708 may be shared by one or more other RATs (e.g., IEEE 802.11). The eNB 702 can use a carrier sensing and collision avoidance mechanism of the RAT(s) sharing the unlicensed spectrum to reserve the unlicensed spectrum. For example, when IEEE 802.11 is sharing the unlicensed spectrum, the eNB 702 can employ a channel reservation mechanism to reserve the unlicensed spectrum.

In this configuration, upon deciding to communicate data with the UE 704 on the SCC 708, the eNB 702 may transmit to the UE 704 an eIMTA configuration to be applied to the SCC 708 in the frame 711 transmitted on the PCC 706 in the frame period 792. The frame 711 has 10 subframes (i.e., subframes 720-729) each transmitted in a subframe period of the frame period 792. A selected subframe of the frame 711, e.g., the subframe 720 or the subframe 725, includes the eIMTA configuration. The eIMTA configuration directed to the UE 704 may be included in a PDCCH scrambled with the eIMTA-RNTI of the UE 704. The scrambled PDCCH may include downlink control information (DCI) format 1C. Upon receiving the subframe 720, the UE 704 detects and decodes the scrambled PDCCH in the common search space. The eIMTA configuration indicates an allocation of downlink subframes, uplink subframes, and special subframes in a frame. For example, the eIMTA configuration can indicate, for a scheduled frame, that subframes 0-5 are downlink subframes, that subframes 6 and 9 are special subframes, and that subframes 7-8 are uplink subframes.

For such a configuration, the switch between downlink and uplink occurs in the subframe 746 and the subframe 749, which are special subframes. A special subframe may be split into three parts: a downlink part (DwPTS), a guard period (GP), and an uplink part (UpPTS) common in LTE TDD configurations. Furthermore, the special subframe may include other transmissions relevant to unlicensed spectrum behavior. In one technique, the last subframe of a frame on the SCC 708 may be a special subframe (i.e., S'). Within the time period of the special subframe S' (e.g., the subframe period 779), the eNB 702 may use the reservation mechanism of the RAT (e.g., DCF with respect to IEEE 802.11)

sharing the unlicensed spectrum to acquire the unlicensed spectrum for the next frame period (e.g., the frame period 794).

At the beginning of the frame period 792, the eNB 702 may attempt to acquire the unlicensed spectrum using the reservation mechanism of the RAT sharing the unlicensed spectrum. For example, if the unlicensed spectrum is shared by the IEEE 802.11, the eNB 702 may use various medium access/random access procedures to acquire the unlicensed spectrum. It may take the eNB 702 the time period 760 to acquire the unlicensed spectrum. After acquiring the unlicensed spectrum, the eNB 702 may start communicating data with the UE 704 in the next subframe period. In this example, the time period 760 is within the subframe period 770 of the frame period 792. Accordingly, the eNB 702 may start communicating data with the UE 704 in the next subframe period (i.e., the subframe period 771) of the frame period 792.

In one technique, the eNB 702 transmits the eIMTA configuration for the SCC 708 to the UE 704 on the PCC 706 as described supra. Further, the eIMTA configuration may indicate that the boundaries of the frames transmitted on the SCC 708 are to be aligned with the frames transmitted on the PCC 706.

In a first option, the eIMTA configuration indicates that the allocation of the subframes is to be applied to one frame on the SCC 708. In other words, the periodicity (T) of the eIMTA configuration may be a preconfigured number of subframes. In this specific example, the periodicity is 10 subframes (i.e., T=10). In other examples, the periodicity may be 12, 14, 20, or other suitable number of subframes. The eIMTA configuration may be included in the subframe 0 of a frame transmitted on the PCC 706 and may request the UE 704 to apply the allocation to a frame transmitted on the SCC 708 in the same frame period. In this example, the eNB 702 transmits the eIMTA configuration in the subframe 720 of the frame 711 transmitted in the frame period 792. The eIMTA configuration is to be applied to a frame transmitted in the frame period 792 on the SCC 708. For example, the eIMTA configuration can indicate, for a frame to be applied, that subframes 0-5 are downlink subframes, that subframes 6 and 9 are special subframes, and that subframes 7-8 are uplink subframes.

As described supra, the eNB 702 acquires the unlicensed spectrum in the time period 760, which is within the subframe period 770. The eNB 702 determines that the partial frame 712 can be communicated with the UE 704 in the remaining subframe periods of the frame period 792. Specifically, the eNB 702 determines that subframes 741-749 of the partial frame 712 may be communicated with the UE 704 in subframe periods 771-779 of the frame period 792. The UE 704 further determines, in accordance with the eIMTA configuration of this specific example, that the subframes 741-745 are downlink subframes, that the subframe 746 and the subframe 749 are special subframes, and that the subframes 747-748 are uplink subframes. Prior to transmitting the subframe 741, the eNB 702 transmits channel reservation and access indication signals 761 (which may be, for example, a D-CUBS) on the SCC 708 to inform the UE 704 of the start of the partial frame 712. Upon receiving the channel reservation and access indication signals 761, the UE 704 can determine that the transmission of the partial frame 712 starts at the beginning of the subframe period 771, for example, based on the synchronization information received on the PCC 706. The UE 704 then processes and communicates the partial frame 712 in accordance with the eIMTA configuration.

In one technique, the eNB 702 and the UE 704 may be configured to always start communication of a frame in a downlink subframe. In this example, the UE 704 can determine that the subframe 741 is a downlink subframe. Accordingly, the UE 704 operates to receive the subframe 741 in the subframe period 771. Similarly, the UE 704 determines that the subframes 742-745 are downlink subframes and operates to receive the subframes 742-745. The UE 704 further determines that the subframes 747-748 are uplink subframes and may utilize those subframes to transmit data to the eNB 702.

As described supra, in this technique, the eNB 702 starts transmitting the partial frame 712 only when a downlink subframe is available. In certain circumstances, the eNB 702 may take a longer time to acquire the unlicensed spectrum. For example, the time period 760 may occupy the subframe periods 770-776. Thus, the partial frame 712 would only include subframes 747-749. In this example, the subframe 747 is allocated as an uplink subframe. Accordingly, the eNB 702 does not transmit channel reservation and access indication signals 761 to the UE 704 to indicate the start of the partial frame 712 prior to the subframe 747. Further, the eNB 702 may transmit signals that are not recognizable by the UE 704 on the unlicensed spectrum during the subframe periods 777-779 in order to retain the unlicensed spectrum. As such, the eNB 702 is able to use the unlicensed spectrum at the beginning of the next frame period (i.e., the subframe period 780 of the frame period 794). Subsequently, the eNB 702 transmits the eIMTA configuration in the subframe 730 of the frame 713 in the frame period 794 on the PCC 706. Upon receiving the eIMTA configuration, the UE 704 applies the eIMTA configuration to a frame 714 transmitted on the SCC 708 during the frame period 794.

As is evident from FIG. 7, various examples envision the possibility of beginning eIMTA configurations with a series of downlink subframes, or some variation thereof. In one technique, the eNB 702 may inform the UE 704 that in a frame on the SCC 708 all the downlink subframes are consecutive and all the uplink subframes are consecutive; further, the downlink subframes are allocated prior to the uplink subframes. For example, the allocation may be D D D D D S U U U S'. The eNB may implement such as allocation using a reference subframe indication. For example, the eNB may indicate the reference subframe 5 (subframes begin at 0) for the existing TDD configuration D S U U U D D D D to shift the configuration by 5 subframes to generate the new configuration D D D D D D S U U U. Using such a shifting mechanism, the eNB may arrange the downlink and uplink subframes to a configuration better suited for LTE in unlicensed spectrum.

Various techniques may be used to implement the reference subframe indication, including explicit and implicit signaling. For example, the reference subframe indication may be explicitly transmitted as an index or other value with eIMTA configuration.

Various implicit signaling methods may also be used. For example, instead of transmitting the eIMTA configuration at subframe 0, the eIMTA may be transmitted on the reference subframe. Accordingly, in the eIMTA configuration is transmitted on subframe 5, then the transmitted eIMTA configuration is shifted 5 subframes, but still begins at subframe 0 of the next frame. In a similar example, when eIMTA configuration is transmitted on subframe 5, then the transmitted eIMTA configuration begins on subframe 5, effectively shifting the implementation for the next subframe. In yet another example, when eIMTA configuration is transmitted on subframe 5, the eIMTA configuration may immediately become effective starting with subframe 5 of the eIMTA configuration.

Various other subframe configuration and reference subframes may be used, as subframe 5 and configuration D S U U U D D D D D are used only for exemplary purposes.

Alternatively, the eNB 702 may not transmit an eIMTA configuration on the PCC 706 to indicate the allocation. Instead, the UE 704 may determine the allocation of uplink subframes and special subframes upon not detecting a downlink subframe after detecting consecutive downlink subframes. The UE 704 may determine, in a frame on the SCC 708, that the consecutive downlink subframes are followed by a special subframe (S), that uplink subframes (U) follows the special subframe (S), and that the last subframe in the frame is another special subframe (S').

Figure 8:
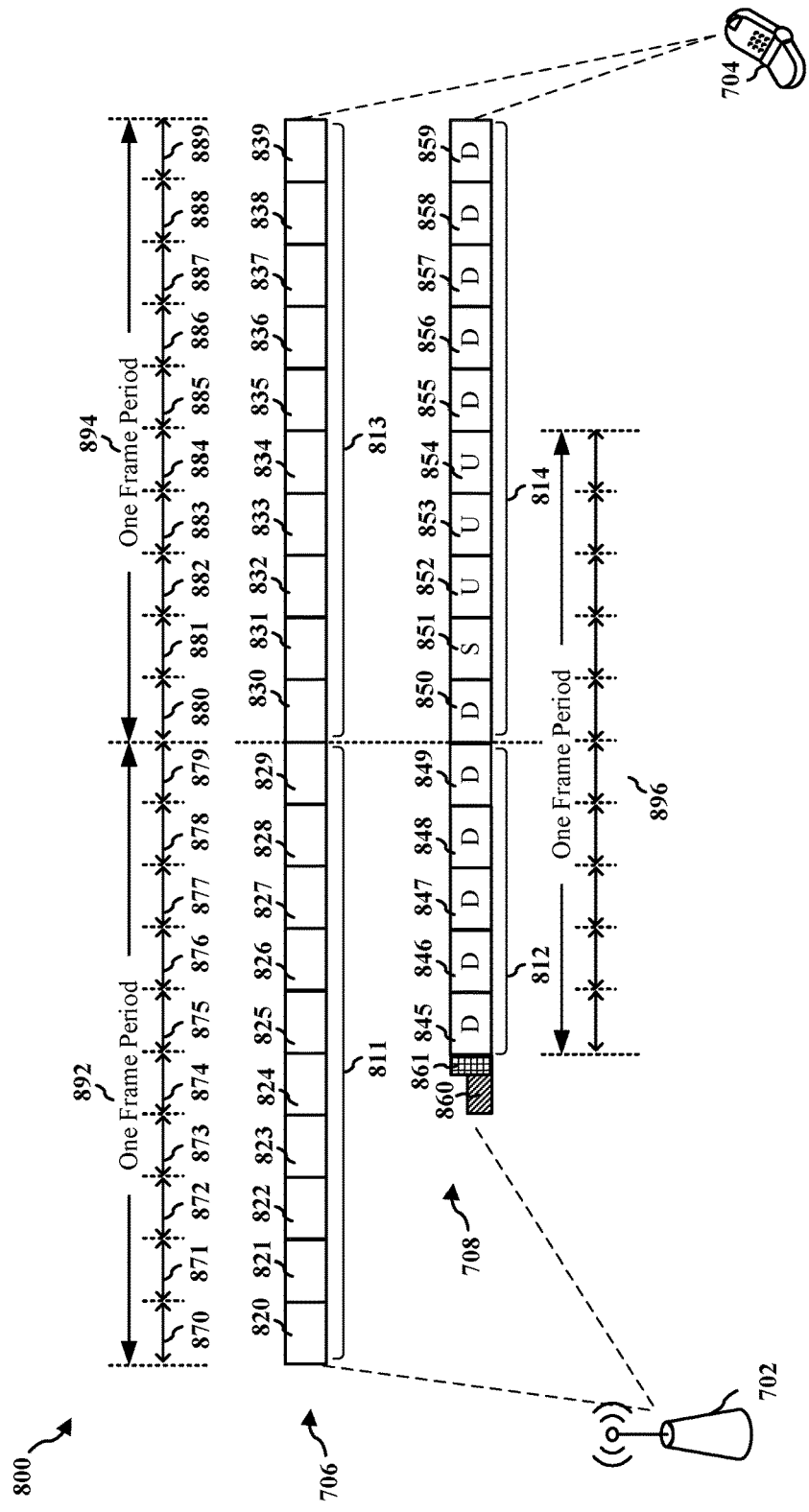
FIG. 8 is a diagram illustrating wireless communication between a UE and an eNB on a PCC and an SCC in another configuration.

FIG. 8 is a diagram 800 illustrating wireless communication between a UE and an eNB on a PCC and an SCC in another configuration. The PCC 706 is illustrated with frames 811 and 813 overlapping frame periods 892 and 894, respectively. The frame 811 includes subframes 820-829 overlapping subframe periods 870-879, respectively. The frame 813 includes subframes 830-839 overlapping subframe periods 880-889, respectively. The SCC 708 is illustrated with frames 812 and 814 overlapping frame periods 892 and 894, respectively. The frame 812 includes subframes 845-849 overlapping subframe periods 875-879, respectively. An interference time period 860 and channel reservation and access indication signals 861 (e.g., a D-CUBS) are prior to the frame 812. The frame 814 includes subframes 850-859 overlapping subframe periods 880-889, respectively.

In this configuration, the eNB 702 selects an eIMTA configuration for use in the SCC 708 and then determines whether the eIMTA configuration allocates multiple consecutive downlink subframes. If the eIMTA configuration allocates multiple consecutive downlink subframes, the eNB 702 finds the index of the initial subframe of the consecutive downlink subframes and then transmits the eIMTA configuration in a subframe having the same index in a selected frame period. The eIMTA configuration may indicate that the eIMTA configuration is to be applied to one virtual frame 896 transmitted on the SCC 708 that starts at a subframe having the same index of a frame transmitted in the selected frame period and that extends into a frame in the next frame period.

For example, the eIMTA configuration may allocate the $0^{th}$ to the $9^{th}$ subframes in a frame as D S U U U D D D D D. The eNB 702 determines that the eIMTA configuration allocates consecutive downlink subframes in the $5^{th}$ to the $9^{th}$ subframes. The initial subframe of the consecutive downlink subframes is the $5^{th}$ subframe. Accordingly, the eNB 702 includes the eIMTA configuration in the subframe 825 of the frame 811 transmitted on the PCC 706 in the frame period 892. The eIMTA configuration indicates that the applicable subframes are subframes 845-849 of the frame 812 transmitted in the frame period 792 and subframes 850-854 of the frame 814 transmitted in the frame period 794 on the SCC 708. The allocation of these 10 subframes (i.e., the virtual frame 896) is D D D D D D S U U U.

The eNB 702 may use the time period 860 to acquire the unlicensed spectrum and then transmits channel reservation and access indication signals 861 on the SCC 708 prior to the subframe period 875 to indicate the start of the transmission of the frame 812. Upon detecting the channel reservation and access indication signals 861, the UE 704 starts communicating with the eNB 702 at the next subframe (e.g., the subframe 845) of the subframes 845-849 of the frame 812 and the subframes 850-854 of the frame 814. In certain circumstances, the eNB 702 may take a longer time to acquire the unlicensed spectrum. For example, the time period 860 may occupy the subframe periods 875-877. Accordingly, the UE 704 starts communicating with the eNB 702 at the subframe 848 of the frame 812. In one technique, the communication between the eNB 702 and the UE 704 on the SCC 708 may be required to start at a downlink subframe from the eNB 702 to the UE 704. Thus, the initial consecutive downlink subframes of the 10 subframes associated with the eIMTA configuration may provide the eNB 702 more opportunities to acquire the unlicensed spectrum and then immediately transmit a downlink subframe to the UE 704 such that the communication between the eNB 702 and the UE 704 starts promptly without delay. Further, the eNB 702 may transmit another eIMTA configuration in the subframe 835 of the frame 813. Upon receiving the eIMTA configuration, the UE 704 applies the eIMTA configuration to n subframes starting at the subframe 855 (where n can be a predetermined integer value, e.g., 10 or 11, or a value signaled via RRC or MAC signaling).

Figure 9:
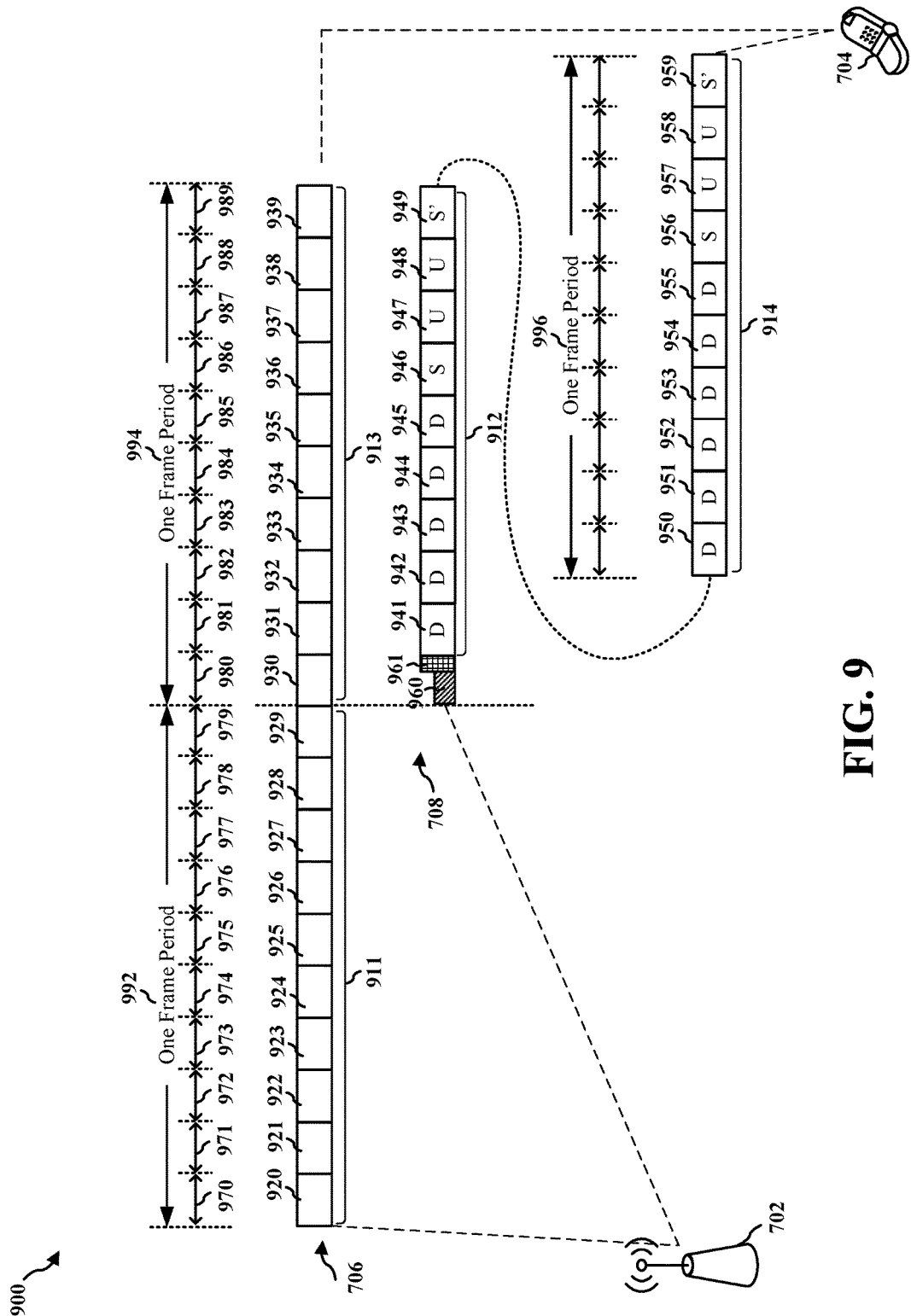
FIG. 9 is a diagram illustrating wireless communication between a UE and an eNB on a PCC and an SCC in another configuration.

FIG. 9 is a diagram 900 illustrating wireless communication between a UE and an eNB on a PCC and an SCC in another configuration. The PCC 706 is illustrated with frames 911 and 913 overlapping frame periods 992 and 994, respectively. The frame 911 includes subframes 920-929 overlapping subframe periods 970-979, respectively. The frame 913 includes subframes 930-939 overlapping subframe periods 980-989, respectively. The SCC 708 is illustrated with frames 912 and 914 overlapping frame periods 994 and 996, respectively. The frame 912 includes subframes 941-949 overlapping subframe periods 981-989, respectively. An interference time period 960 and channel reservation and access indication signals 961 (e.g., a D-CUBS) are prior to the frame 912. The frame 914 includes subframes 950-959 overlapping the frame period 996.

In this configuration, the eIMTA configuration indicates allocation of the subframes that is to be applied to multiple frames on the SCC 708. For example, the periodicity (T) of the eIMTA configuration may be 20, 40, or 80 subframes (i.e., T=20, 40, or 80). In one technique, the eIMTA configuration indicated in a subframe in the $(mT/10)^{th}$ frame (i.e., a frame in the $(mT/10)^{th}$ frame period) on the PCC 706 is to be used for the $(mT/10+1)^{th}$, $(mT/10+2)^{th}$, . . . $((m+1)T/10)^{th}$ frames on the SCC 708. m is an integer greater than 0. In this example, the eIMTA configuration may be included in a subframe of the frame 911 transmitted in the frame period 992. The eIMTA configuration indicates that the eIMTA configuration is to be applied to the frame 912 and the frame 914 transmitted on the SCC 708 in the subsequent frame period 994 and frame period 996, respectively. As described supra, the eNB 702 acquires the unlicensed spectrum in the time period 960 and then transmits channel reservation and access indication signals 961 on the SCC 708 to inform the UE 704 the start of the frame 912. Upon detecting the start of the frame 912, the UE 704 communicates the frame 912 in accordance with the eIMTA configuration, similarly to what described above regarding FIGS. 7-8. Subsequently, the UE 704 may similarly detect the start of the frame 914. Upon detecting the start of the frame 914, the UE 704 communicates the frame 914 in accordance with the eIMTA configuration.

Referring back to FIG. 7, in one scenario, the eIMTA configuration may indicate the following allocation D D D S U U U U U S. As described above, the transmission of the partial frame 712 starts at a downlink subframe. If the eNB 702 does not obtain channel access until, for example, the subframe period 774, the UE 704 will not detect a downlink subframe and will not communicate with the eNB 702 in the frame period 792. Thus, the subframe periods 774-779 may be wasted, as the eNB 702 has declared the subframes in those periods to be uplink subframes. In one technique, if the UE 704 determines that the eIMTA configuration received is not valid, then the UE 704 may assume that the next few subframes are downlink subframes. In this example, the UE 704 may assume that the subframes 744-749 are downlink subframes. Accordingly, the eNB 702, aware of the assumption of the UE 704, may transmit on subframes 744-749 after acquiring the unlicensed spectrum, for example, in the subframe period 774. Alternatively, the UE 704 may have a default eIMTA configuration, and the eNB 702 and the UE 704 can use the default eIMTA configuration in this scenario. In another technique, in the above scenario, the UE 704 may assume that the eNB 702 would be inactive until the start of the next radio frame (i.e., the frame 714).

In another scenario, the uplink grant in a subframe may not match with the eIMTA configuration. For example, the eIMTA configuration may indicate an allocation of D D D D D D D S U U for the partial frame 712. The UE 704, however, subsequently detects an uplink grant for the subframe 746, which is in conflict with the downlink subframe allocation for the subframe 746 in accordance with the eIMTA configuration. In one technique, the UE 704 may operate in accordance with the uplink grant. That is, the uplink grant overrides the eIMTA configuration. In another technique, the UE 704 may assume that the uplink grant in conflict is a false alarm.

In another scenario, the UE 704, for example, receives from the eNB 702 an eIMTA configuration in the subframe 730 of the frame 713. At the same time, the UE 704 receives the subframe 750, which is a downlink subframe, on the SCC 708. Further, the eIMTA configuration may allocate the subframe 751, for example, as a downlink subframe or a special subframe, and the UE 704 needs to process the eIMTA configuration in the subframe period 780, which is typically about 1 ms, in order to communicate the subframe 751 with the eNB 702 in accordance with the allocation of the eIMTA configuration. If the UE 704 takes a time period longer than the subframe period 780 to process the eIMTA configuration and determine the allocation for the subframe 751, the UE 704 may not be able to utilize the subframe 751.

For example, in one technique, if the UE 704 needs 1.5 ms to process the eIMTA configuration, the eNB 702 may inform the UE 704 that the eIMTA configuration allocates the initial two subframes as downlink subframes. Thus, upon receiving the eIMTA configuration in the subframe 730, the UE 704 may use the subframe periods 780-781 to process the eIMTA configuration. In other words, the eNB 702 allocates a number of initial subframes (e.g., 2, 3, or 4 subframes) as downlink subframes in accordance with the time period needed by the UE 704 to process the eIMTA configuration to provide the UE 704 sufficient processing time.

Alternatively, the UE 704 may buffer the subframes received during the processing time period and process the buffered subframes after the UE 704 has processed the eIMTA configuration to determine the allocation of the buffered subframes. For example, upon receiving the eIMTA configuration in the subframe 730, the UE 704 knows that the subframe 750 is a downlink subframe, and may buffer and delay processing the subframe 751 until the UE 704 has processed the eIMTA configuration.

In another technique, the eNB 702 may transmit the eIMTA configuration for the frame 714 in the frame 711, thus allowing the UE 704 sufficient time to process the eIMTA configuration. In other words, the eNB 702 transmits the eIMTA configuration to be used in a frame period in the frame period prior to that frame period.

Figure 10:
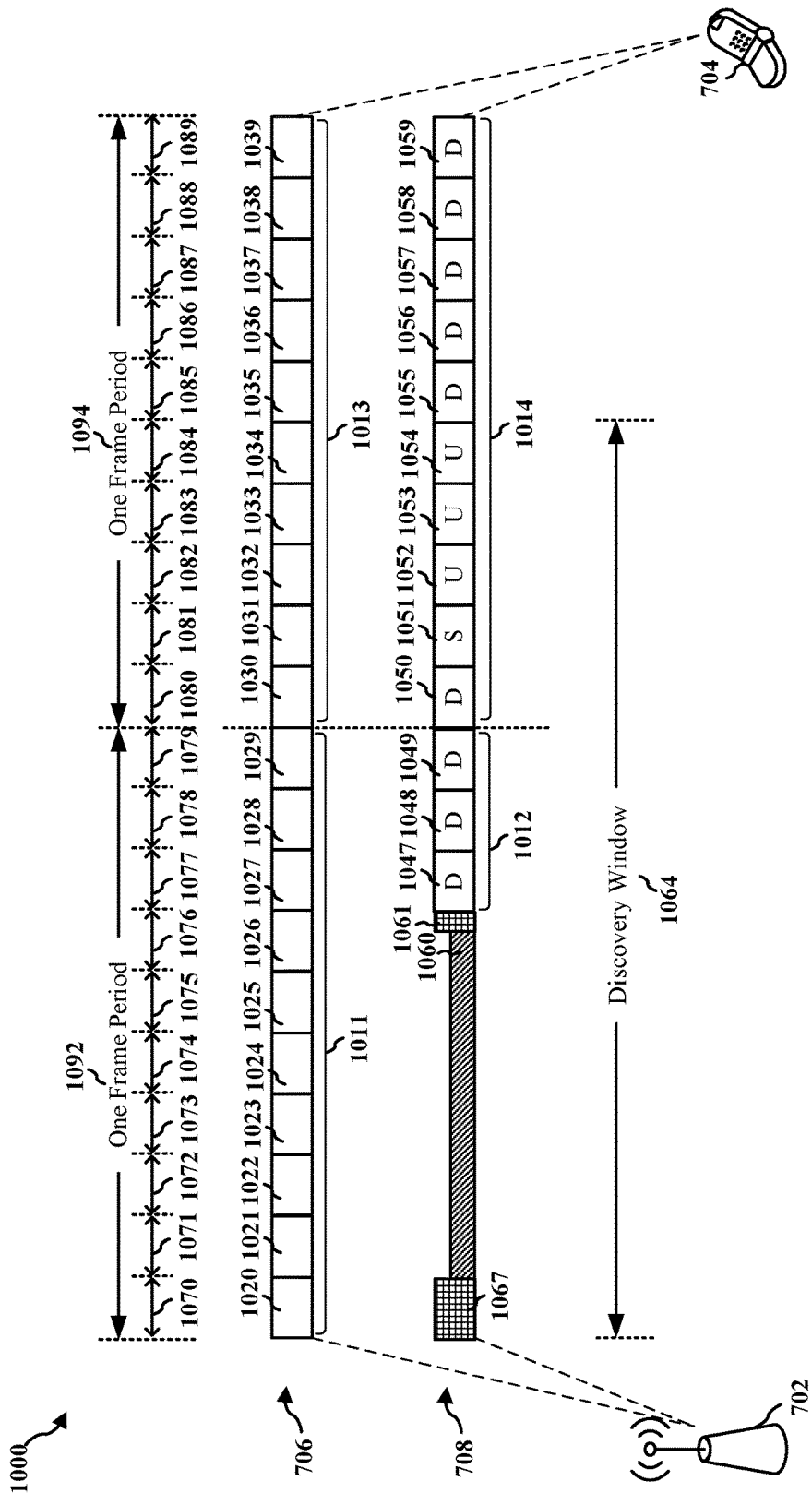
FIG. 10 is a diagram illustrating wireless communication between a UE and an eNB on a PCC and an SCC in another configuration.

FIG. 10 is a diagram 1000 illustrating wireless communication between a UE and an eNB on a PCC and an SCC in another configuration. The PCC 706 is illustrated with frames 1011 and 1013 overlapping frame periods 1092 and 1094, respectively. The frame 1011 includes subframes 1020-1029 overlapping subframe periods 1070-1079, respectively. The frame 1013 includes subframes 1030-1039 overlapping subframe periods 1080-1089, respectively. The SCC 708 is illustrated with frames 1012 and 1014 overlapping frame periods 1092 and 1094, respectively. The frame 1012 includes subframes 1047-1049 overlapping subframe periods 1077-1079, respectively. Discovery signals 1067, an interference time period 1060, and channel reservation and access indication signals 1061 (e.g., a D-CUBS) are prior to the frame 1012. The frame 1014 includes subframes 1050-1059 overlapping subframe periods 1080-1089, respectively. A discovery window 1064 overlaps subframe periods 1070-1084.

In this configuration, the eNB 702 may periodically transmit one or more discovery signals in a discovery window on the SCC 708 in the unlicensed spectrum. For example, the eNB 702 may allocate a discovery window 1064 that occupies 15 subframe periods. Particularly, the discovery window 1064 starts from the subframe period 1070 of the frame period 1092 and ends at subframe period 1084 of the frame period 1094. In this example, the eNB 702 transmits one or more discovery signals 1067 on the SCC 708 in the discovery window 1064. The one or more discovery signals 1067 may overlap the interference time period 1060 on the SCC 708.

In one technique, the eNB 702 may transmit an eIMTA configuration in the subframe 1020 of the frame 1011 transmitted in the frame period 1092 on the PCC 706. The eIMTA configuration may indicate allocation of subframes to be applied in one frame (e.g., a frame transmitted in the frame period 1092.) Further, the eNB 702 transmits channel reservation and access indication signals 1061 after finishing transmitting the one or more discovery signals in the subframe periods 1070-1076. Upon receiving the channel reservation and access indication signals 1061, the UE 704 can determine that the transmission of the frame 1012 starts at the beginning of the subframe period 1077. Alternatively, the eNB 702 may transmit the eIMTA configuration in the subframe 1027 of the frame 1011 transmitted in the subframe period 1077 (i.e., the first downlink subframe after the channel reservation and access indication signal 1061). The UE 704 then processes and communicates the frame 1012 in accordance with the eIMTA configuration. Further, the eNB 702 transmits the eIMTA configuration in the subframe 1030 of the frame 1013 that is transmitted in the frame period 1094 on the PCC 706. Upon receiving the eIMTA configuration, the UE 704 applies the eIMTA configuration to the frame 1014 transmitted on the SCC 708 during the frame period 1094.

Further, as described supra, if UE 704 does not detect the channel reservation and access indication signals 1061 in the downlink subframes as indicated in the eIMTA configuration, the UE 704 may override the eIMTA configuration in the current frame with a default configuration indicated in a previously received RRC message.

Figure 11:
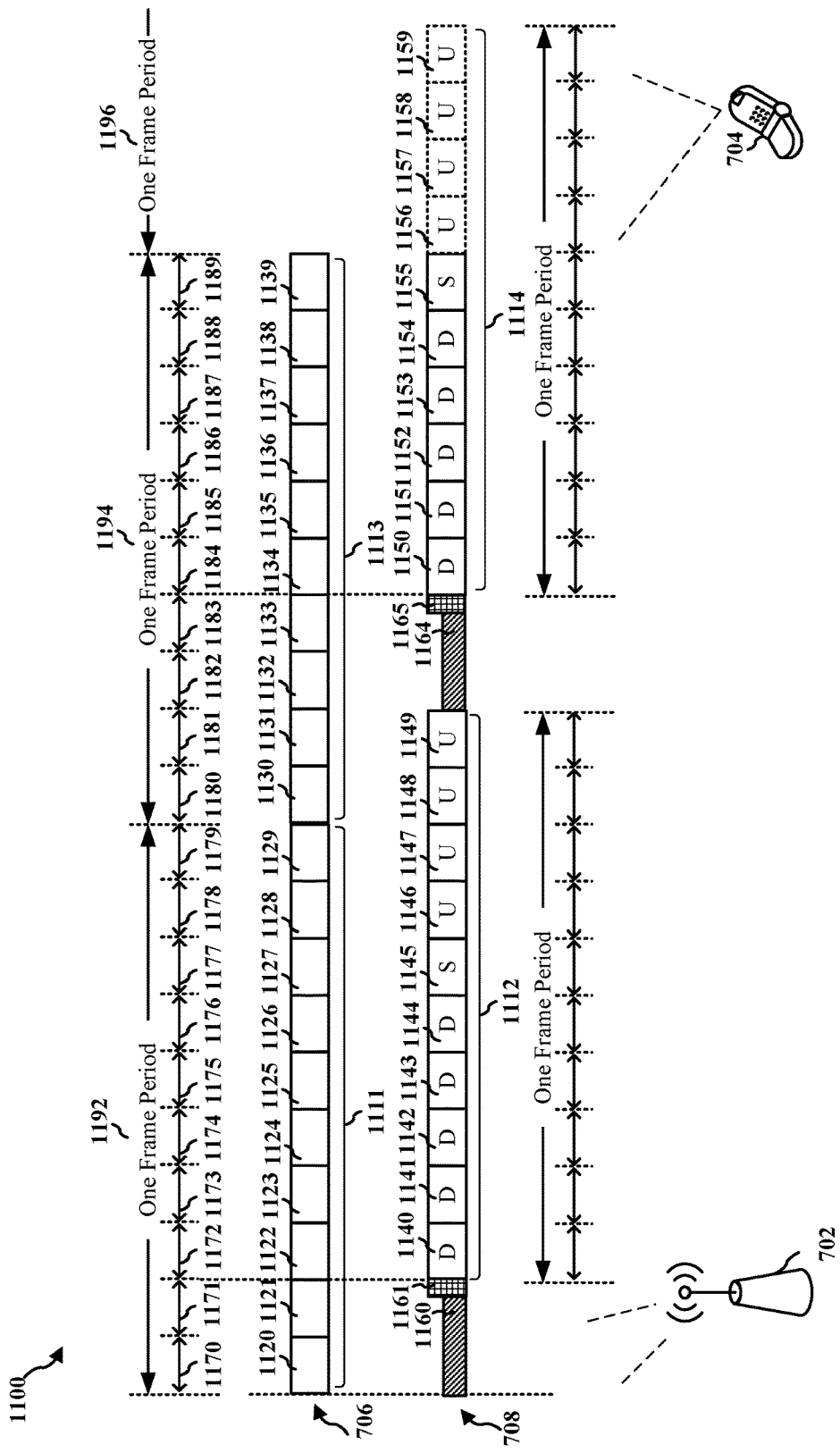
FIG. 11 is a diagram illustrating wireless communication between a UE and an eNB on a PCC and an SCC in another configuration.

FIG. 11 is a diagram 1100 illustrating wireless communication between a UE and an eNB on a PCC and an SCC in another configuration. The PCC 706 is illustrated with frames 1111 and 1113 overlapping frame periods 1192 and 1194, respectively. The frame 1111 includes subframes 1120-1129 overlapping subframe periods 1170-1179, respectively. The frame 1113 includes subframes 1130-1139 overlapping subframe periods 1180-1189, respectively. The SCC 708 is illustrated with virtual frames 1112 and 1114 starting within frame periods 1192 and 1194, respectively. The virtual frame 1112 includes subframes 1140-1149 overlapping subframe periods 1172-1181, respectively. An interference time period 1160 and channel reservation and access indication signals 1161 (e.g., a D-CUBS) are prior to the virtual frame 1112. The virtual frame 1114 may include subframes 1150-1159 starting in the subframe period 1184. An interference time period 1164 and channel reservation and access indication signals 1165 (e.g., a D-CUBS) are prior to the frame 1114.

In this configuration, the eNB 702 may transmit an eIMTA configuration in the subframe 1120 of the frame 1111 on the PCC 706. The eIMTA configuration may indicate allocation of subframes to be applied to frames on the SCC 708 in one or more frame periods (i.e., an eIMTA configuration period). In this example, the eIMTA configuration is to be applied to an eIMTA configuration period including the frame period 1192 and the frame period 1194. As described supra, the eNB 702 may use the time period 1160 to acquire the unlicensed spectrum. After acquiring the unlicensed spectrum, in this configuration, the eNB 702 may transmit channel reservation and access indication signals 1161 on the SCC 708 to inform the UE 704 the start of the virtual frame 1112 that is a full length frame starting in the frame period 1192 and ending in the frame period 1194. In this example, the virtual frame 1112 starts at the subframe period 1173 and ends at the subframe period 1181, or may begin upon completion of a D-CUBS and end one frame later regardless of the subframe alignment. Accordingly, upon receiving the channel reservation and access indication signals 1161, the UE 704 can determine that the virtual frame 1112 starts at the beginning of the subframe period 1173. The UE 704 then processes and communicates the virtual frame 1112 in accordance with the eIMTA configuration.

After communicating the virtual frame 1112, the eNB 702 may determine that the current time is still within the eIMTA configuration period, and may accordingly use the time period 1164 to acquire the unlicensed spectrum again. After acquiring the unlicensed spectrum, the eNB 702 may transmit channel reservation and access indication signals 1165 on the SCC 708 to inform the UE 704 the start of the virtual frame 1114. In one technique, the virtual frame 1114 may be a full length frame starting in the frame period 1194 and ending in the frame period 1196 subsequent to the frame period 1194. In other words, the virtual frame 1114 contains subframes 1150-1159. In another technique, the virtual frame 1114 may ends at the boundary of the frame period 1194 (i.e., the end of the eIMTA configuration period). In other words, the virtual frame 1114 contains subframes 1150-1155.

Further, when the frame period 1196 is allocated as the discovery window described supra and the subframes (i.e., subframes 1156-1159) of the virtual frame 1114 in the frame period 1196 are one or more uplink subframes that may interfere with the discovery window, the eNB 702 and/or the UE 704 can truncate the virtual frame 1114 at the boundary of the frame period 1194. Further, the UE 704 can determine whether to truncate the virtual frame 1114 based on the start position of the virtual frame 1114 relative to discovery window and the eIMTA configuration.

Figure 12:
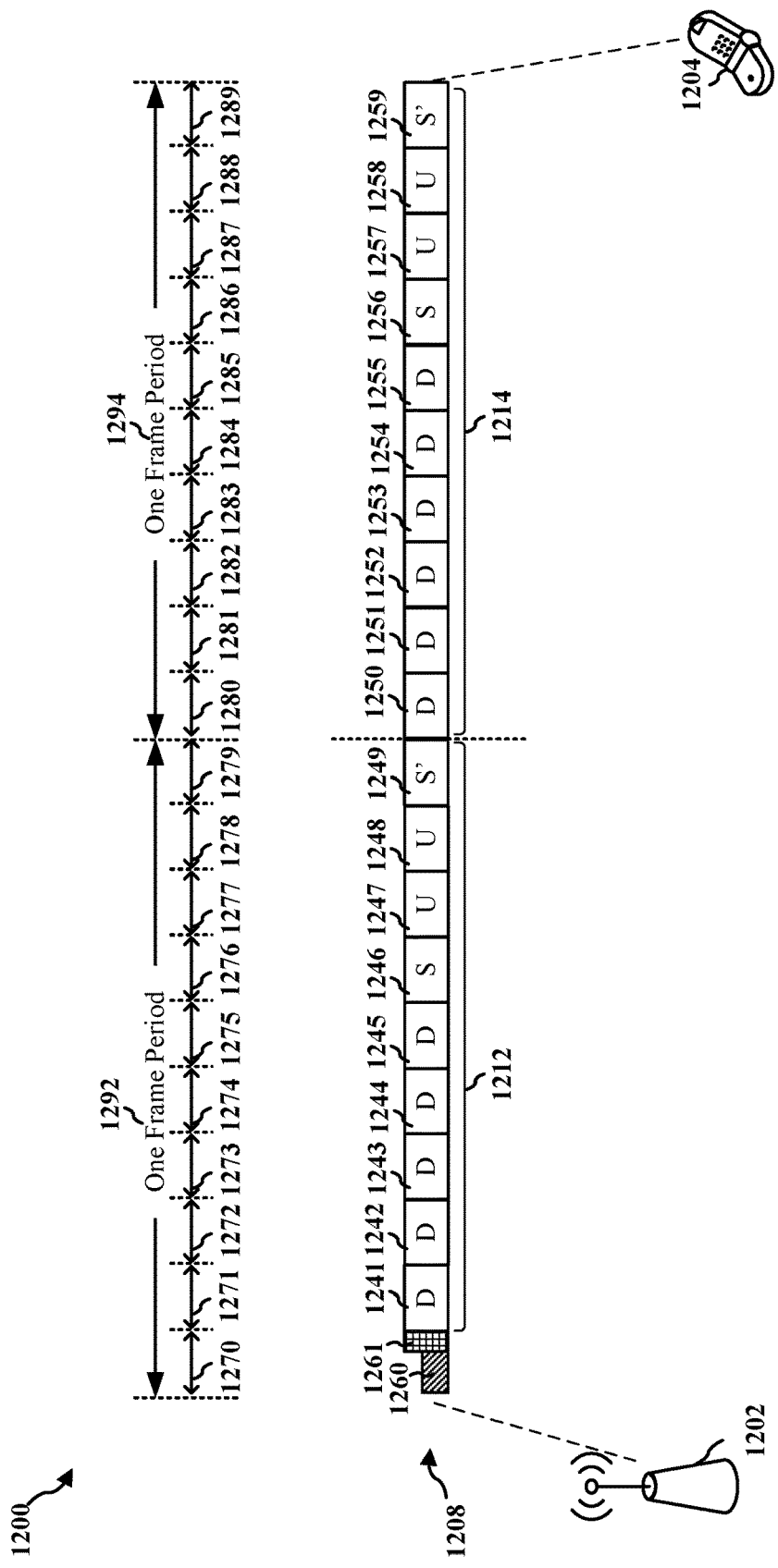
FIG. 12 is a diagram illustrating wireless communication between a UE and an eNB on a carrier in a configuration.

FIG. 12 is a diagram 1200 illustrating wireless communication between a UE and an eNB on a carrier in a configuration. An eNB 1202 communicates with a UE 1204 on a carrier 1208 in a TDD mode. Consecutive frame periods 1292 and 1294 have subframe periods 1270-1279 and subframe periods 1280-1289, respectively. The carrier 1208 is illustrated with frames 1212 and 1214 overlapping the frame periods 1292 and 1294, respectively. The frame 1212 includes subframes 1241-1249 overlapping the subframe periods 1271-1279, respectively. An interference time period 1260 and channel reservation and access indication signals 1261 (e.g., a D-CUBS) are prior to the frame 1212. The frame 1214 includes subframes 1250-1259 overlapping the subframe periods 1280-1289, respectively. As described supra, a frame transmitted on the carrier 1208 may have downlink subframes (D), uplink subframes (U), and/or special subframes (S) in accordance with an eIMTA configuration. Further, the carrier 1208 is in the unlicensed spectrum.

The UE 1204 may determine frame periods of used by the eNB 1202 based on, for example, synchronization information transmitted by the eNB 1202 on a carrier in the licensed spectrum. Upon deciding to communicate data with the UE 1204 on the carrier 1208, the eNB 1202 attempts to acquire the unlicensed spectrum using the reservation mechanism of the RAT sharing the unlicensed spectrum. For example, if the unlicensed spectrum is shared by the IEEE 802.11, the eNB 1202 may use various medium access/random access procedures to acquire the unlicensed spectrum. It may take the eNB 1202 the time period 1260 to acquire the unlicensed spectrum. After acquiring the unlicensed spectrum, the eNB 1202 may start communicating data with the UE 1204 in the next subframe period. In this example, the time period 1260 is within the subframe period 1270 of the frame period 1292. Subsequently, the eNB 1202 transmits channel reservation and access indication signals 1261 on the carrier 1208 to inform the UE 1204 the start of the frame 1212, which includes subframes 1241-1249. The eNB 1202 may transmit an eIMTA configuration in a subframe of the frame 1212. In one technique, the frame 1212 starts with a downlink subframe.

In one option, the eIMTA configuration indicates that the periodicity (T) of the eIMTA configuration is 10 subframes (i.e., T=10). In one technique, the eNB 1202 may transmit the eIMTA configuration in any downlink subframe of the frame 1212. The eIMTA configuration further indicates that the allocation is to be used for the frame 1214 subsequent to the frame 1212.

In one technique, if UE 1204 is not able to detect an eIMTA configuration in the frame 1212, but is able to detect an eIMTA configuration in an initial downlink subframe (e.g., the subframe 1250) of the frame 1214, the UE 1204 may use the allocation indicated in the eIMTA configuration in the initial downlink subframe for the frame 1214. Alternative, the UE 1204 may use the allocation indicated in a default eIMTA configuration sent in an eSIB for the frame 1214.

In another technique, the eNB 1202 transmits the eIMTA configuration in a first downlink subframe (i.e., the subframe 1241) of the frame 1212. The eIMTA configuration may indicate that the allocation is for the current frame. Upon receiving the eIMTA configuration in the first downlink subframe (i.e., the subframe 1241) of the frame 1212, the UE 1204 processes the eIMTA configuration and communicates the remaining subframes (i.e., the subframes 1242-1249) in accordance with the allocation indicated in the eIMTA configuration.

Figure 13:
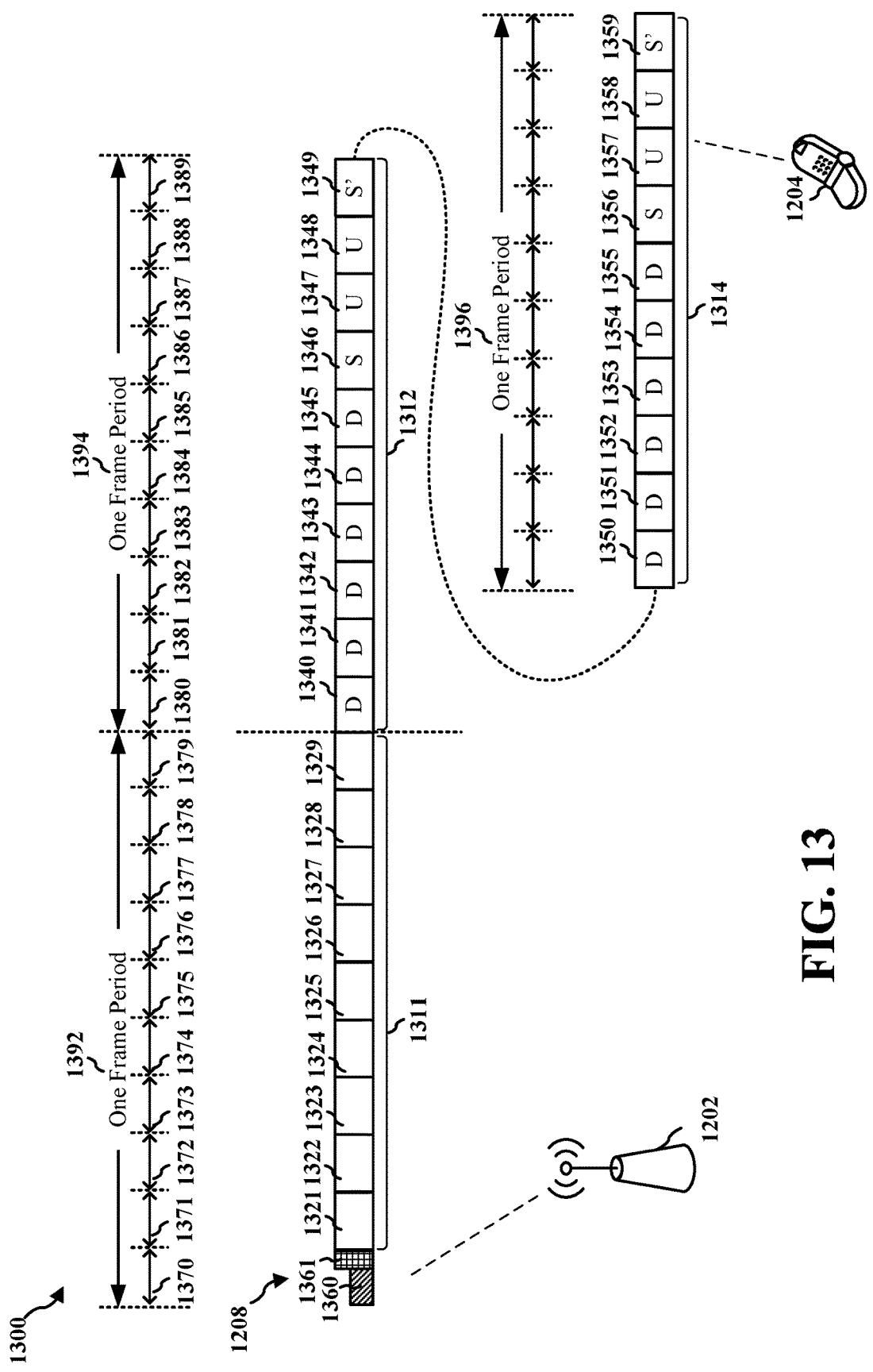
FIG. 13 is a diagram illustrating wireless communication between a UE and an eNB on a carrier in a configuration.

FIG. 13 is a diagram 1300 illustrating wireless communication between a UE and an eNB on a carrier in another configuration. Consecutive frame periods 1392 and 1394 have subframe periods 1370-1379 and subframe periods 1380-1389, respectively. A frame period 1396 is subsequent to the frame period 1394. The carrier 1208 is illustrated with frames 1311, 1312, and 1314 overlapping the frame periods 1392, 1394, and 1396, respectively. The frame 1311 includes subframes 1321-1329 overlapping the subframe periods 1371-1379, respectively. An interference time period 1360 and channel reservation and access indication signals 1361 (e.g., a D-CUBS) are prior to the frame 1311. The frame 1312 includes subframes 1340-1349 overlapping the subframe periods 1380-1389, respectively. The frame 1314 includes subframes 1350-1359 overlapping the frame period 1396.

In this configuration, the eIMTA configuration indicates allocation of the subframes that is to be applied to multiple frames on the carrier 1208. For example, the periodicity (T) of the eIMTA configuration may indicate an eIMTA configuration period that has 20, 40, or 80 subframes (i.e., T=20, 40, or 80). In one technique, the eIMTA configuration indicated in a subframe in the $(mT/10)^{th}$ frame (i.e., a frame in the $(mT/10)^{th}$ frame period), which is in a current eIMTA configuration period, is to be used for the $(mT/10+1)^{th}$, $(mT/10+2)^{th}$, ..., $(m+1)T/10)^{th}$ frames, which are in the next eIMTA configuration period. M is an integer greater than 0. In this example, the eIMTA configuration may be included in a subframe of the frame 1311 transmitted in the frame period 1392 and may indicate that the eIMTA configuration period includes the frame period 1394 and the frame period 1396. In other words, the eIMTA configuration indicates that the eIMTA configuration is to be applied to the frame 1312 and the frame 1314 transmitted on the carrier 1208 in the subsequent frame period 1394 and frame period 1396, respectively. As described supra, the eNB 1202 acquires the unlicensed spectrum in the time period 1360 and then transmits channel reservation and access indication signals 1361 on the carrier 1208 to inform the UE 1204 the start of the frame 1311.

In one technique, the eNB 1202 may send an eIMTA configuration in a physical frame format indicator channel (PFFICH) of the first frame transmitted in one eIMTA configuration period to indicate subframe allocations for all the frames starting within that eIMTA configuration period. The PFFICH may be transmitted at the beginning of each frame. In this example, the eIMTA configuration may be sent in the PFFICH of the frame 1312 and may apply to both the frame 1312 and the frame 1314. Optionally, the eNB 1202 may send the eIMTA configuration in the PFFICH of each frame starting within the eIMTA configuration period.

In another technique, the eNB 1202 may send an eIMTA configuration in the PFFICH of the last frame (e.g., the frame 1311) starting within the current eIMTA configuration period to indicate subframe allocations for all the frames (e.g., the frames 1312, 1314) starting within the next eIMTA configuration period.

If UE 1204 is not able to detect an eIMTA configuration in the frame 1311, but is able to detect an eIMTA configuration in an initial downlink subframe of the frame 1312, the UE 1204 may use the allocation indicated in the eIMTA configuration in the initial downlink subframe for both the frame 1312 and the frame 1314 (i.e., the frames within the periodicity). Alternative, the UE 1204 may use the allocation indicated in a default eIMTA configuration sent in an eSIB for both the frame 1312 and the frame 1314.

In one technique, the UE 1204 is configured such that the uplink grant overrides the eIMTA configuration when there is a conflict at a subframe, as the eNB 1202 transmits uplink grants only in the current frame and uplink grants are not valid across frames.

In another technique, the eIMTA configuration may be transmitted in multiple downlink subframes of the frame 1311. For example, the eNB 1202 may transmit the eIMTA configuration in the subframe 1321, the subframe 1323, and the subframe 1325. The UE 1204 may assume that the eIMTA configuration detected in multiple downlink subframes of a single frame are the same and indicate the same allocation.

In another technique, the eNB 1202 may send the eIMTA configuration in the PFFICH, which overrides any previously sent eIMTA configuration. In yet another technique, the eNB 1202 may use common search space based enhanced physical downlink control channel (EPDCCH) to send the eIMTA configuration in the DCI Format 1C.

Figure 14:
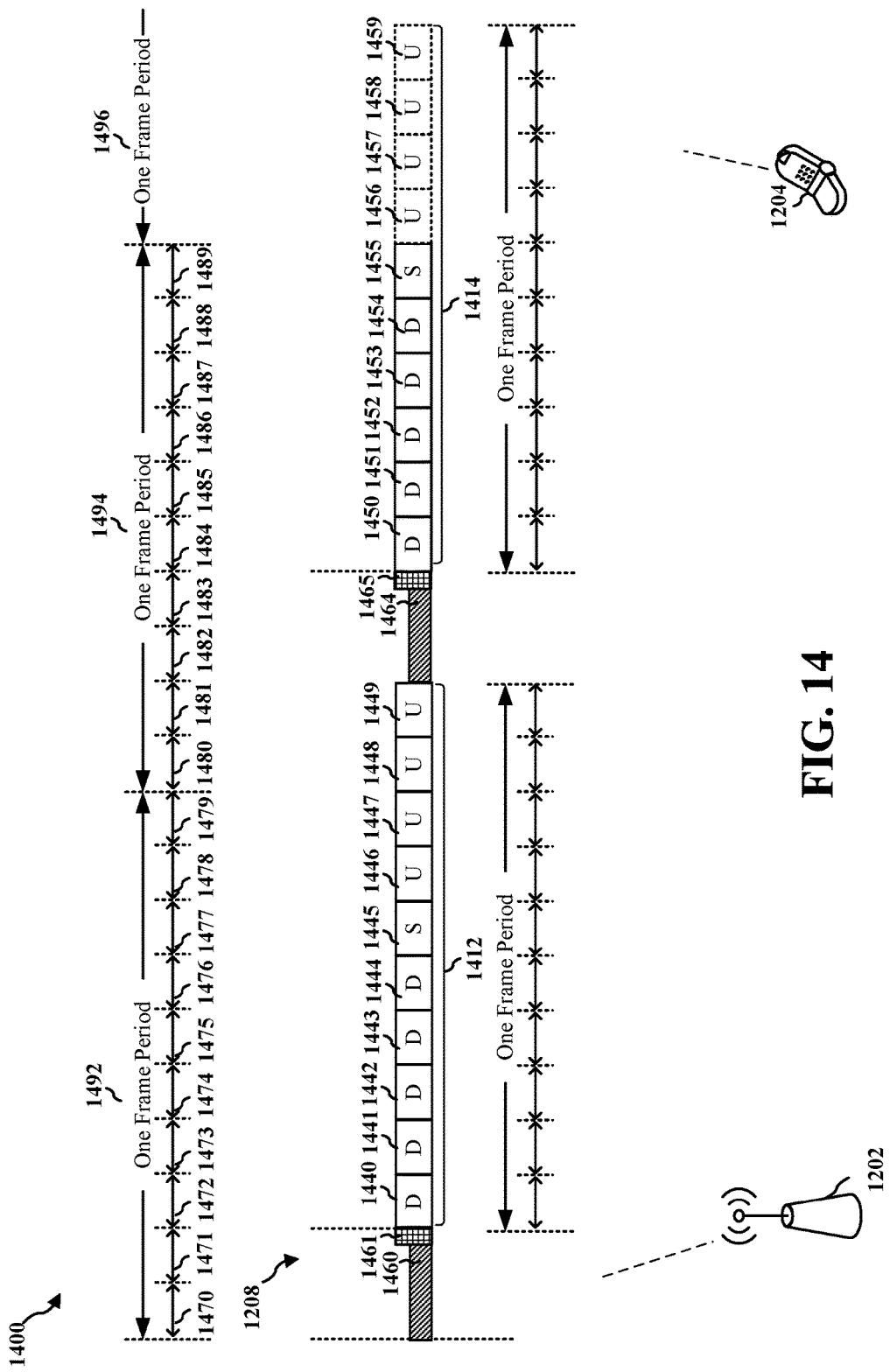
FIG. 14 is a diagram illustrating wireless communication between a UE and an eNB on a carrier in another configuration.

FIG. 14 is a diagram 1400 illustrating wireless communication between a UE and an eNB on a carrier in another configuration. Consecutive frame periods 1492 and 1494 have subframe periods 1470-1479 and subframe periods 1480-1489, respectively. A frame period 1496 is subsequent to the frame period 1494. The carrier 1208 is illustrated with virtual frames 1412 and 1414 starting with the frame periods 1492 and 1494, respectively. The virtual frame 1412 includes subframes 1440-1449 overlapping the subframe periods 1472-1481, respectively. An interference time period 1460 and channel reservation and access indication signals 1461 (e.g., a D-CUBS) are prior to the virtual frame 1412. The virtual frame 1414 may include subframes 1450-1459 overlapping the periods 1494 and 1496. An interference time period 1464 and channel reservation and access indication signals 1465 (e.g., a D-CUBS) are prior to the virtual frame 1414.

In this configuration, the eNB 1202 may use the time period 1460 to acquire the unlicensed spectrum. After acquiring the unlicensed spectrum, the eNB 1202 may transmit channel reservation and access indication signals 1461 on the carrier 1208 to inform the UE 1204 the start of the virtual frame 1412. In this example, the channel reservation and access indication signals 1461 are transmitted prior to the subframe period 1473 of the frame period 1492. Accordingly, upon receiving the channel reservation and access indication signals 1461, the UE 1204 can determine that the virtual frame 1412 starts at the beginning of the subframe period 1473. Further, the eNB 1202 may transmit an eIMTA configuration in a subframe of the virtual frame 1412. The eIMTA configuration may indicate allocation of subframes to be applied to frames on the carrier 1208 in one or more frame periods (i.e., an eIMTA configuration period). In this example, the eIMTA configuration is to be applied to the frame period 1492 and the subsequent frame period 1494. The eNB 1202 may determine that the virtual frame 1412 is a full-length frame starting in the frame period 1492 and ending in the frame period 1494. In this example, the virtual frame 1412 starts at subframe period 1473 of the frame period 1092 and ends at the subframe period 1481 of the frame period 1494. The UE 1204 then processes and communicates the virtual frame 1412 in accordance with the eIMTA configuration.

After communicating the virtual frame 1412, the eNB 1202 may, within the frame period 1494, use the time period 1464 to acquire the unlicensed spectrum again. Then, the eNB 1202 may transmit channel reservation and access indication signals 1465 on the carrier 1208 to inform the UE 1204 the start of the virtual frame 1414. In one technique, the virtual frame 1414 may be a full-length frame starting in the frame period 1494 and ending in the frame period 1496 subsequent to the frame period 1494. In other words, the virtual frame 1414 contains subframes 1450-1459. In another technique, the virtual frame 1414 may ends at the boundary of the frame period 1494 (i.e., the end of the eIMTA configuration period). In other words, the virtual frame 1414 contains subframes 1450-1455.

In one technique, the eNB 1202 may send an eIMTA configuration in a PFFICH of the first frame transmitted in one eIMTA configuration period to indicate subframe allocations for all the virtual frames starting within the eIMTA configuration period. The PFFICH may be transmitted at the beginning of each virtual frame. In this example, the eIMTA configuration may be sent in the PFFICH of the virtual frame 1412 and may apply to both the virtual frame 1412 and the virtual frame 1414. Optionally, the eNB 1202 may send the eIMTA configuration in the PFFICH of each virtual frame starting within the eIMTA configuration period.

In another technique, the eNB 1202 may send an eIMTA configuration in the PFFICH of the last virtual frame (e.g., the virtual frame 1414) starting within the current eIMTA configuration period to indicate subframe allocations for all the virtual frames starting within the next eIMTA configuration period.

Further, when the frame period 1496 is allocated as the discovery window described supra and the subframes (i.e., the subframes 1456-1459) of the virtual frame 1414 in the frame period 1496 are one or more uplink subframes that may interfere with the discovery window, the eNB 1202 and/or the UE 1204 can truncate the virtual frame 1414 at the boundary of the frame period 1494. Further, the UE 1204 can determine whether to truncate the virtual frame 1414 based on the start position of the virtual frame 1414 relative to the discovery window and the eIMTA configuration.

If the UE 1204 misses the eIMTA-RNTI for all downlink subframes in the virtual frame 1412, the UE 1204 may use a default configuration indicated in a previously received RRC message. In addition, the UE 1204 may use the enhanced Physical Frame Format Indicator Channel (ePFFICH) transmitted with the channel reservation and access indication signals (e.g., CUBS) to signal the eIMTA configuration in each virtual frame.

Figure 15:
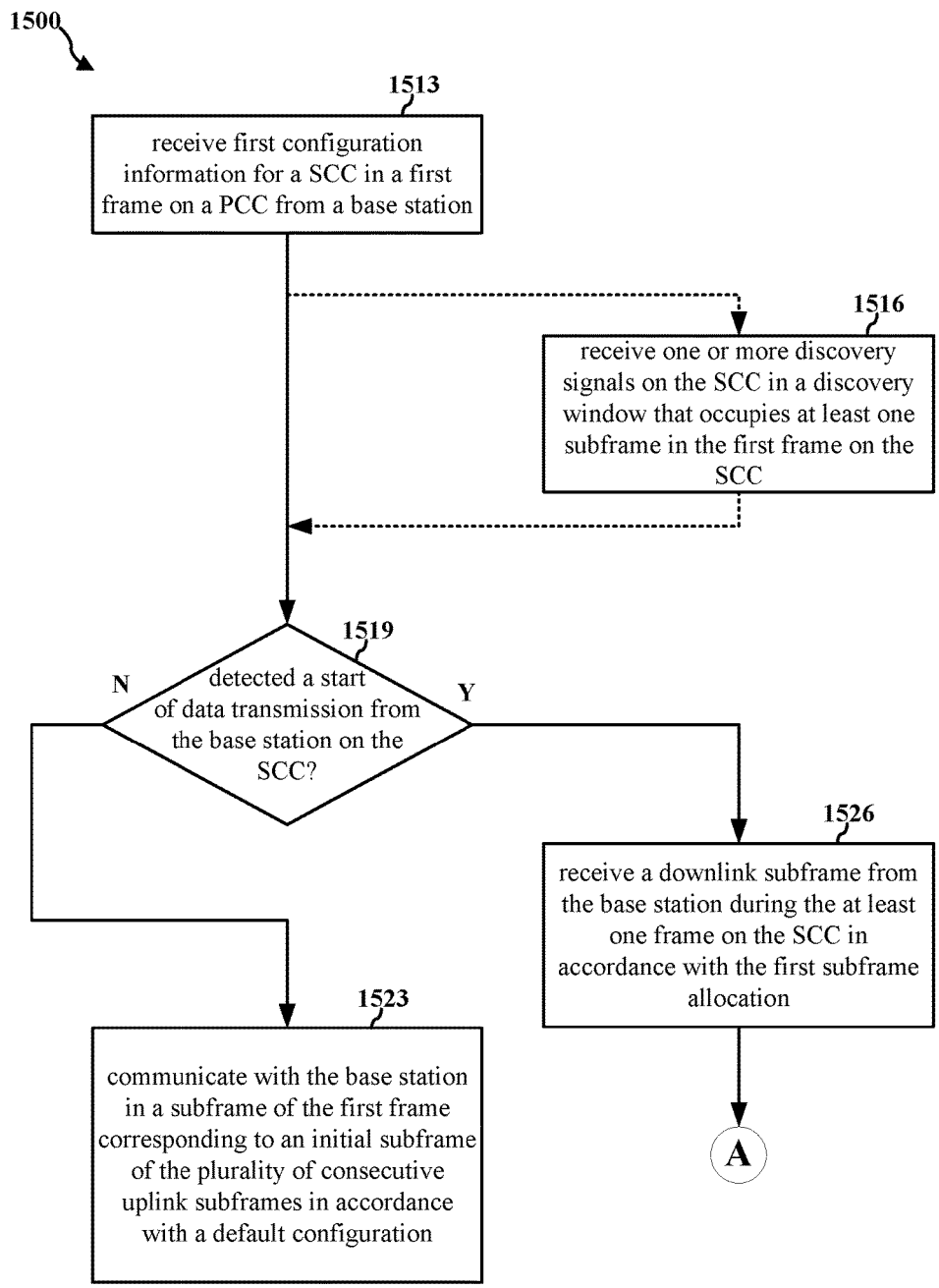
FIG. 15 is a flow chart of a method of wireless communication of a UE on a PCC and an SCC.

FIG. 15 is a flow chart 1500 of a method of wireless communication of a UE on a PCC and an SCC. The method may be performed by a UE (e.g., the UE 704, the apparatus 2302/2302').

At operation 1513, the UE receives first configuration information for an SCC in a first frame on a PCC from a base station. The PCC is in a licensed spectrum. The SCC is in an unlicensed spectrum. The first configuration information indicates a first subframe allocation for at least one frame on the SCC. For example, referring to FIG. 7, the UE 704 receives from the eNB 702 an eIMTA configuration for the SCC 708 in the frame 711 on the PCC 706.

At operation 1516, in one configuration, the UE may receive one or more discovery signals on the SCC in a discovery window that occupies at least one subframe in the first frame on the SCC. For example, referring to FIG. 10, the UE 704 may receive one or more discovery signals in the discovery window 1064 on the SCC 708.

At operation 1519, the UE attempts to detect a start of data transmission from the base station on the SCC. For example, referring to FIG. 7, the UE 704 attempts to detect the channel reservation and access indication signals 761.

In one configuration, the first configuration information indicates the first subframe allocation in one frame. The first allocation of the one frame is applied to each frame of the at least one frame. For example, referring to FIG. 9, the eIMTA configuration may be included in a subframe of a frame 911 transmitted in a frame period 992. The eIMTA configuration indicates that the eIMTA configuration is to be applied to a frame 912 and a frame 914 transmitted on the SCC 708 in subsequent frame period 994 and frame period 996, respectively.

In one configuration, the first configuration information indicates a plurality of consecutive uplink subframes at an end of the one frame. When the attempt to detect the start of data transmission is not successful, at operation 1523, the UE may communicate with the base station in a subframe of the first frame corresponding to an initial subframe of the plurality of consecutive uplink subframes in accordance with a default configuration. For example, referring to FIG. 7, in one scenario, the eIMTA configuration may indicate the following allocation D D D S U U U U U S. If the eNB 702 does not obtain channel access until, for example, the subframe period 774, the UE 704 will not detect a downlink subframe and will not communicate with the eNB 702 in the frame period 792. The UE 704 may have a default eIMTA configuration, and the eNB 702 and the UE 704 can use the default eIMTA configuration to communicate.

In one configuration, the receipt of the downlink subframe occurs subsequent to the receipt of the discovery signals in the discovery window in accordance with a default configuration when the attempt to detect the start of data transmission is not successful.

When the attempt to detect the start of data transmission is successful, the UE may, at operation 1526, receive a downlink subframe from the base station during the at least one frame on the SCC in accordance with the first subframe allocation. The downlink subframe is an initial subframe of the data transmission and subsequent to the start of the first subframe allocation. For example, referring to FIG. 7, the UE 704 receives a downlink subframe from the eNB 702 in the subframe 741.

In one configuration, the first subframe allocation indicates an allocation of one or more uplink subframes, one or more downlink subframes, and one or more special subframes in the at least one frame.

In one configuration, the at least one frame includes the first frame on the SCC. The first configuration information is received on the PCC in an initial subframe of the first frame.

Figure 16:
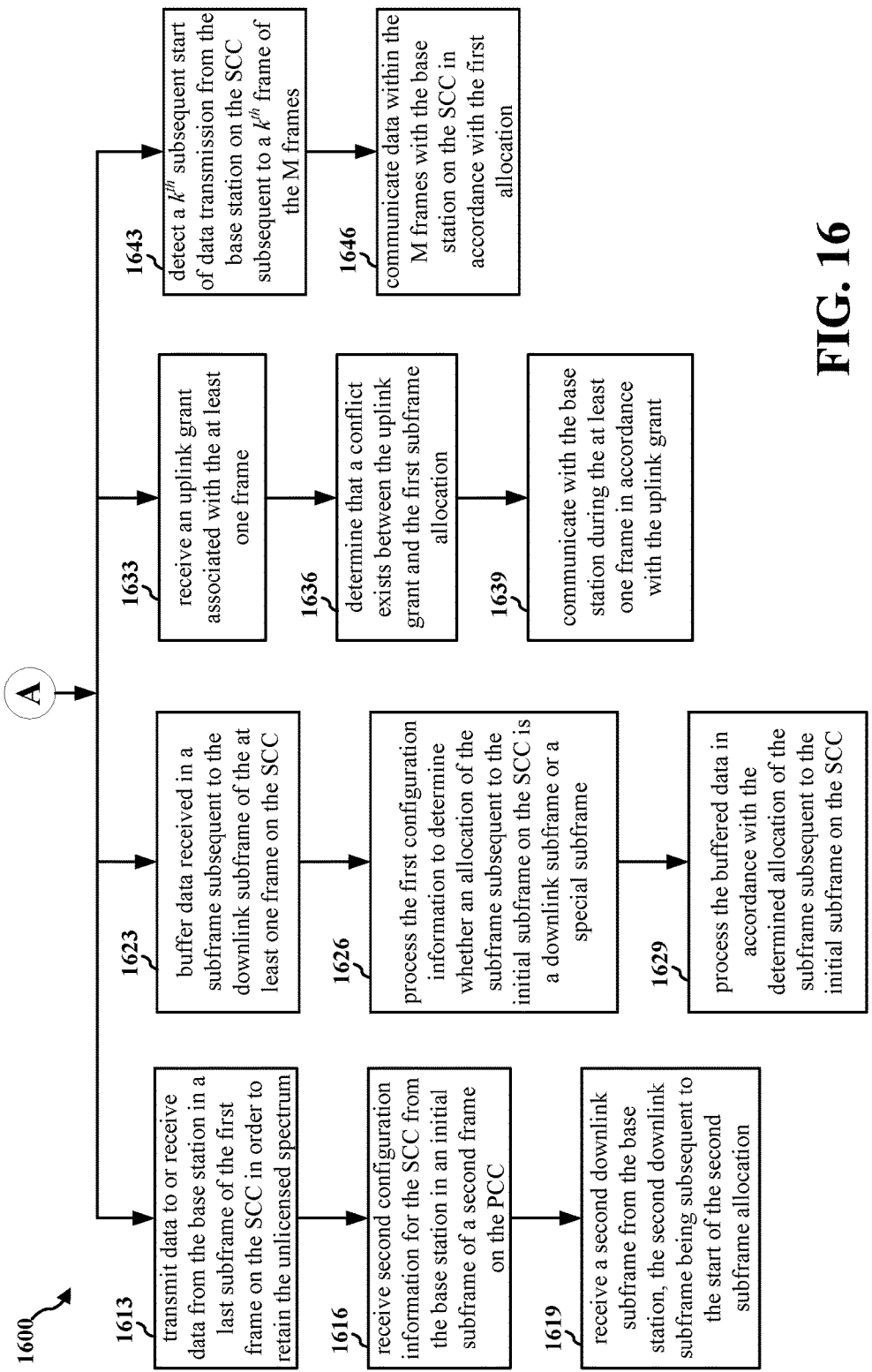
FIG. 16 is a flow chart of another method of wireless communication of a UE on a PCC and an SCC.

In certain configurations, subsequent to operation 1526, the UE may perform one or more operations shown in FIG. 16.

FIG. 16 is a flow chart 1600 of another method of wireless communication of a UE on a PCC and an SCC. The method may be performed by a UE (e.g., the UE 704, the apparatus 2302/2302') subsequent to the operation 1526 shown in FIG. 15.

In one configuration, at operation 1613, the UE may transmit data to or receiving data from the base station in a last subframe of the first frame on the SCC in order to retain the unlicensed spectrum. For example, referring to FIG. 7, the UE 704 may receive from the eNB 702 signals that are not recognizable by the UE 704 on the unlicensed spectrum during the subframe periods 777-779 in order to retain the unlicensed spectrum. At operation 1616, the UE may receive second configuration information for the SCC from the base station in an initial subframe of a second frame on the PCC. The second frame is subsequent and consecutive to the first frame. The second configuration information indicates a second subframe allocation for the second frame on the SCC. At operation 1619, the UE may receive a second downlink subframe from the base station. The second downlink subframe is subsequent to the start of the second subframe allocation. For example, referring to FIG. 7, the UE 704 may receive an eIMTA configuration in the subframe 730 of the frame 713 on the PCC 706. The UE 704 may receive downlink subframe in the subframe 750 of the frame 714 on the SCC 708.

In one configuration, the first configuration information indicates that initial two subframes of the first frame on the SCC are downlink subframes.

In one configuration, the UE, at operation 1623, may buffer data received in a subframe subsequent to the downlink subframe of the at least one frame on the SCC. At operation 1626, the UE may process the first configuration information to determine whether an allocation of the subframe subsequent to the initial subframe on the SCC is a downlink subframe or a special subframe. At operation 1629, the UE may process the buffered data in accordance with the determined allocation of the subframe subsequent to the initial subframe on the SCC. For example, referring to FIG. 7, the UE 704 may buffer the subframes received during the processing time period and process the buffered subframes after the UE 704 has processed the eIMTA configuration to determine the allocation of the buffered subframes. For example, upon receiving the eIMTA configuration in the subframe 730, the UE 704 knows that the subframe 750 is a downlink subframe, and may buffer and delay processing the subframe 751 until the UE 704 has processed the eIMTA configuration.

In one configuration, the at least one frame may include M frames subsequent to the first frame. M is an integer greater than 1. In one configuration, the first configuration information indicates the first subframe allocation in one frame. The first allocation of the one frame is applied to each frame of the at least one frame. For example, referring to FIG. 9, the eIMTA configuration may be included in a subframe of a frame 911 transmitted in a frame period 992. The eIMTA configuration indicates that the eIMTA configuration is to be applied to a frame 912 and a frame 914 transmitted on the SCC 708 in subsequent frame period 994 and frame period 996, respectively.

In one configuration, the first subframe allocation may allocate one or more downlink subframes consecutively and prior to each uplink subframe in the one frame. For example, referring to FIG. 7, in one technique, the eNB 702 may inform the UE 704 that in a frame on the SCC 708 all the downlink subframes are consecutive and all the uplink subframes are consecutive; further, the downlink subframes are allocated prior to the uplink subframes. For example, the allocation may be D D D D D S U U U S.

In one configuration, the first configuration information may indicate a plurality of consecutive downlink subframes in the one frame. The first configuration information may be received in an $n^{th}$ subframe of the first frame corresponding to an initial downlink subframe of the plurality of consecutive downlink subframes of the one frame. n is an integer. The at least one frame may include the first frame and a second frame consecutively. The receiving the downlink subframe from the base station on the SCC may be performed within a period from the $n^{th}$ subframe of the first frame to an $(n-1)^{th}$ subframe of the second frame. For example, referring to FIG. 8, the eIMTA configuration is applied to from the subframe 845 of the frame 812 to the subframe 854 of the frame 814.

In one configuration, at operation 1633, the UE may receive an uplink grant associated with the at least one frame. At operation 1636, the UE may determine that a conflict exists between the uplink grant and the first subframe allocation. At operation 1639, the UE may communicate with the base station during the at least one frame in accordance with the uplink grant. For example, referring to FIG. 7, the uplink grant in a subframe may not match with the eIMTA configuration. For example, the eIMTA configuration may indicate an allocation of D D D D D D S U U for the partial frame 712. The UE 704, however, subsequently detects an uplink grant for the subframe 746, which is in conflict with the downlink subframe allocation for the subframe 746 in accordance with the eIMTA configuration. In one technique, the UE 704 may operate in accordance with the uplink grant. That is, the uplink grant overrides the eIMTA configuration.

In one configuration, the at least one frame includes a second frame on the SCC starting at the received downlink subframe. In one configuration, the at least one frame may include M frames. M is an integer greater than 1. An initial frame of the M frames may start at the received downlink subframe subsequent to the start of the data transmission. At operation 1643, the UE may detect a $k^{th}$ subsequent start of data transmission from the base station on the SCC subsequent to a $k^{th}$ frame of the M frames. k is an integer and k=1 to (M−1). The $(k+1)^{th}$ frame of the M frames starts at an initial downlink subframe subsequent to the $k^{th}$ subsequent start. At operation 1646, the UE may communicate data within the M frames with the base station on the SCC in accordance with the first allocation. For example, referring to FIG. 11, the at least one frame may include the virtual frame 1112 and the virtual frame 1114.

Figure 17:
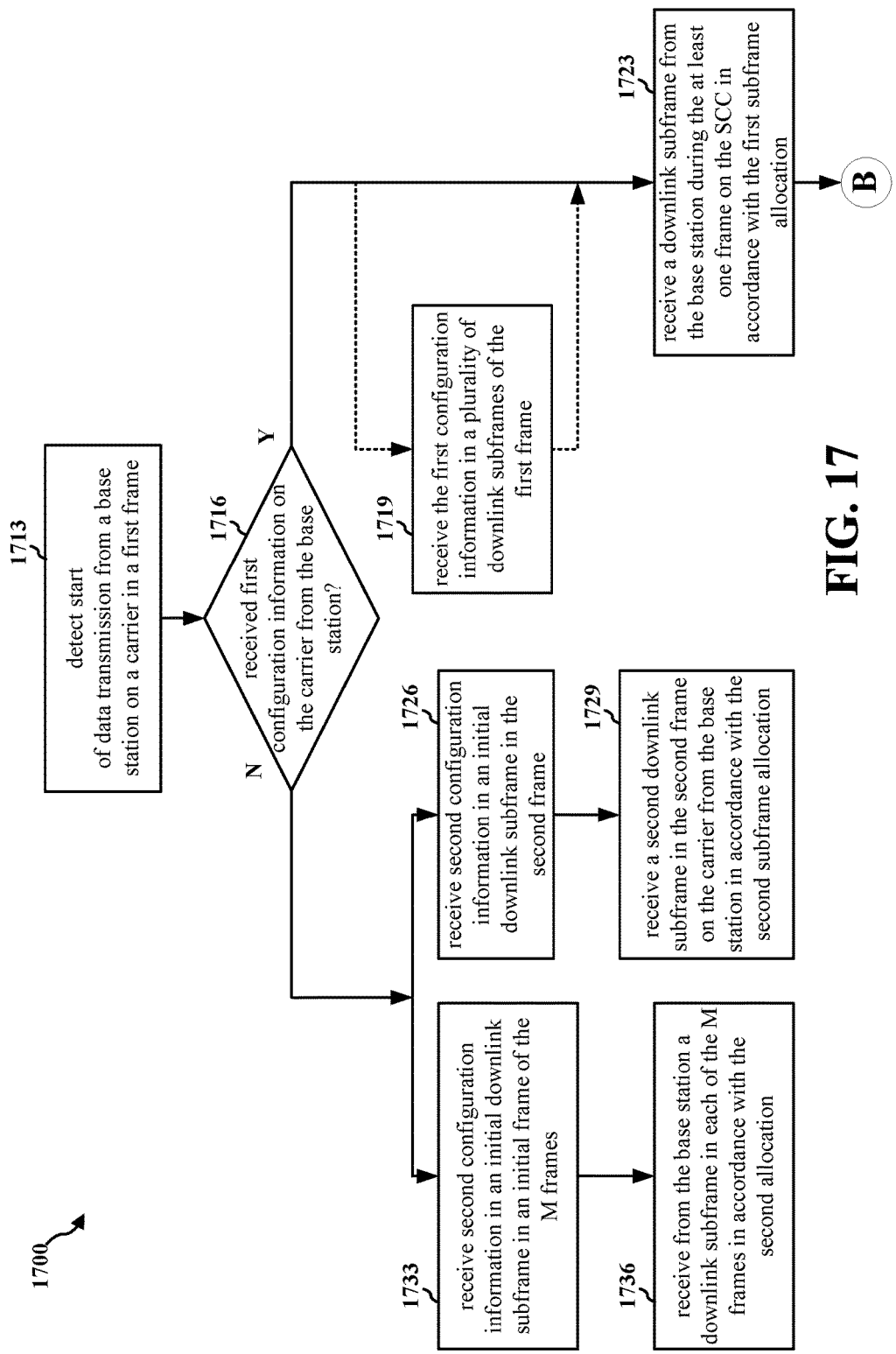
FIG. 17 is a flow chart of a method of wireless communication of a UE on a carrier.

FIG. 17 is a flow chart 1700 of a method of wireless communication of a UE on a carrier. The method may be performed by a UE (e.g., the UE 1204, the apparatus 2302/2302').

At operation 1713, the UE detects a start of data transmission from a base station on a carrier in a first frame. The carrier is in an unlicensed spectrum. At operation 1716, the UE attempts to receive first configuration information on the carrier from the base station. The first configuration information indicates a first subframe allocation for at least one frame on the carrier. For example, referring to FIG. 12, the UE 1204 detects the channel reservation and access indication signals 1261 from the eNB 1202 on the carrier 1208. The UE 1204 attempts to receive an eIMTA configuration in the frame 1212 on the carrier 1208.

When the attempt to receive the first configuration information on the carrier is successful, in one configuration, the UE may, at operation 1719, receive the first configuration information in a plurality of downlink subframes of the first frame. For example, referring to FIG. 13, in one technique, the UE 1204 may receive the eIMTA configuration in multiple downlink subframes of the frame 1311. The UE 1204 may assume that the eIMTA configuration detected in multiple downlink subframes of a single frame are the same and indicate the same allocation.

At operation 1723, the UE receives a downlink subframe from the base station during the at least one frame on the carrier in accordance with the first subframe allocation. The downlink subframe is an initial subframe of the data transmission and subsequent to the start of the first subframe allocation. For example, referring to FIG. 12, the UE 1204 receives a downlink subframe from the eNB 1202 in the subframe 1250 in accordance with the received eIMTA configuration.

In one configuration, the first subframe allocation may indicate allocation of one or more uplink subframes, one or more downlink subframes, and one or more special subframes in the at least one frame. In one configuration, the at least one frame may include a second frame that is subsequent and consecutive to the first frame. For example, referring to FIG. 13, the eIMTA configuration may be included in a subframe of a frame 1311 transmitted in a frame period 1392. The eIMTA configuration indicates that the eIMTA configuration is to be applied to a frame 1312 and a frame 1314 transmitted on the carrier 1208 in subsequent frame period 1394 and frame period 1396, respectively.

In one configuration, when the attempt to receive the first configuration information on the carrier is not successful, the UE may, at operation 1726, receive second configuration information in an initial downlink subframe in the second frame. The second configuration information indicates a second subframe allocation for the second frame on the carrier. At operation 1729, the UE may receive a second downlink subframe in the second frame on the carrier from the base station in accordance with the second subframe allocation. For example, referring to FIG. 12, in one technique, if UE 1204 is not able to detect an eIMTA configuration in the frame 1212, but is able to detect an eIMTA configuration in an initial downlink subframe (e.g., a subframe 1250) of the frame 1214, the UE 1204 may use the allocation indicated in the eIMTA configuration in the initial downlink subframe for the frame 1214.

In one configuration, the at least one frame may include the first frame. The first configuration information may be received in an initial downlink subframe of the first frame. In one configuration, the at least one frame may include M frames subsequent to the first frame. M is an integer greater than 1. In one configuration, when the attempt to receive the first configuration information on the carrier is not successful, the UE may, at operation 1733, receive second configuration information in an initial downlink subframe in an initial frame of the M frames. The second configuration information indicates second subframe allocation in one frame on the carrier. At operation 1736, the UE may receive from the base station a downlink subframe in each of the M frames in accordance with the second subframe allocation. For example, referring to FIG. 13, if UE 1204 is not able to detect an eIMTA configuration in the frame 1311, but is able to detect an eIMTA configuration in an initial downlink subframe of the frame 1312, the UE 1204 may use the allocation indicated in the eIMTA configuration in the initial downlink subframe for both the frame 1312 and the frame 1314 (i.e., the frames within the periodicity).

Figure 18:
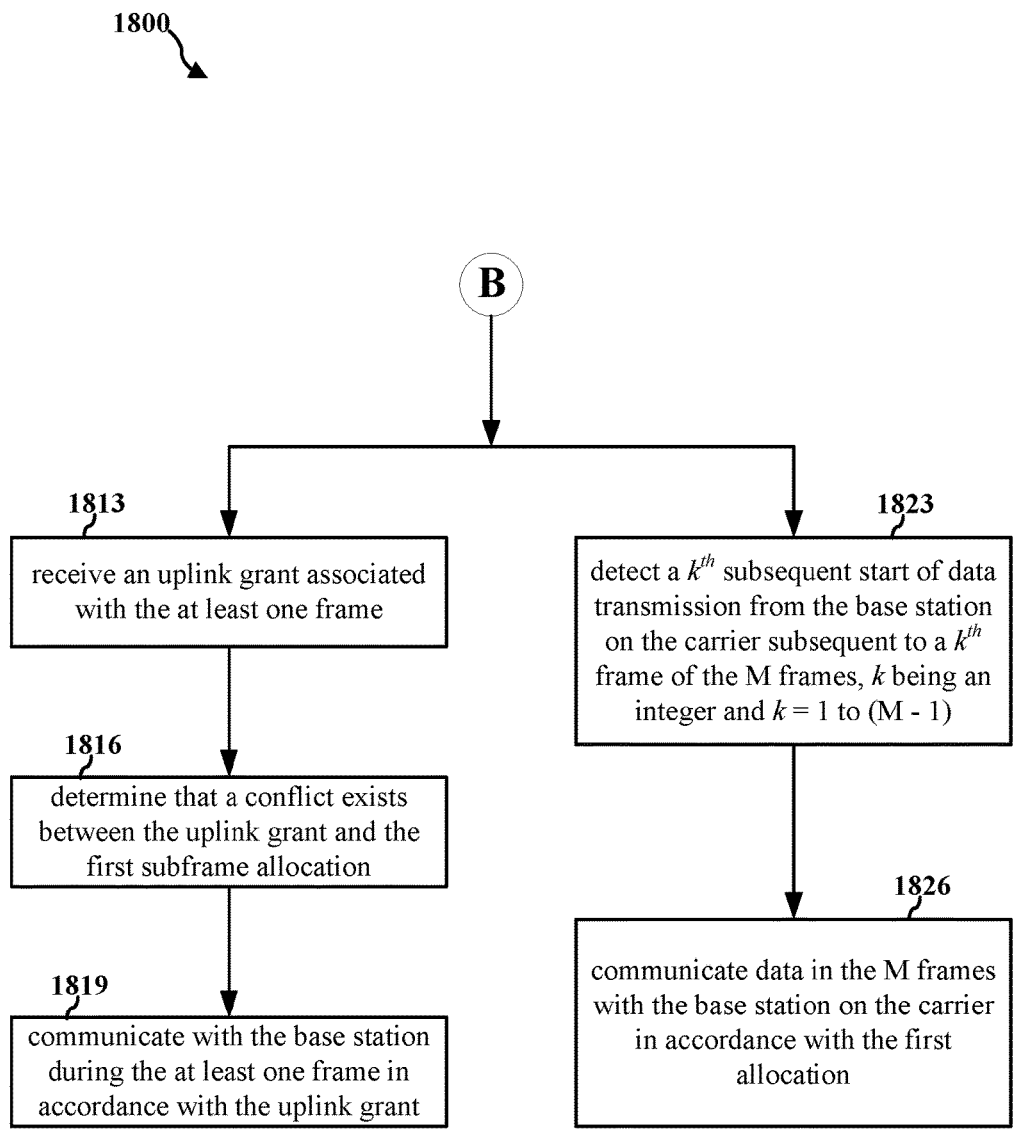
FIG. 18 is a flow chart of another method of wireless communication of a UE on a carrier.

FIG. 18 is a flow chart 1800 of another method of wireless communication of a UE on a carrier. The method may be performed by a UE (e.g., the UE 1204, the apparatus 2302/2302') subsequent to the operation 1723 shown in FIG. 17.

In one configuration, subsequent to the operation 1723, the UE may, at operation 1813, receive an uplink grant associated with the at least one frame. At operation 1816, the UE may determine that a conflict exists between the uplink grant and the first subframe allocation. At operation 1819, the UE may communicate with the base station during the at least one frame in accordance with the uplink grant. For example, referring to FIG. 12, the UE 1204 is configured such that the uplink grant overrides the eIMTA configuration when there is a conflict at a subframe, as the eNB 1202 transmits uplink grants only in the current frame and uplink grants are not valid across frames.

In one configuration, the at least one frame may include a second frame on the carrier starting at the downlink subframe. For example, referring to FIG. 14, the at least one frame may include the frame 1412. In one configuration, the at least one frame may include M frames. M is an integer greater than 1. An initial frame of the M frames may start at the downlink subframe subsequent to the start of the data transmission. The first configuration information may be received in the downlink subframe subsequent to the start of the data transmission. Subsequent to the operation 1723, the UE may, at operation 1823, detect a $k^{th}$ subsequent start of data transmission from the base station on the carrier subsequent to a $k^{th}$ frame of the M frames. k is an integer and k=1 to (M−1). The $(k+1)^{th}$ frame of the M frames starts in an initial downlink subframe subsequent to the $k^{th}$ subsequent start. At operation 1826, The UE may communicate data in the M frames with the base station on the carrier in accordance with the first allocation. For example, referring to FIG. 14, the at least one frame may include the virtual frame 1412 and the virtual frame 1414.

Figure 19:
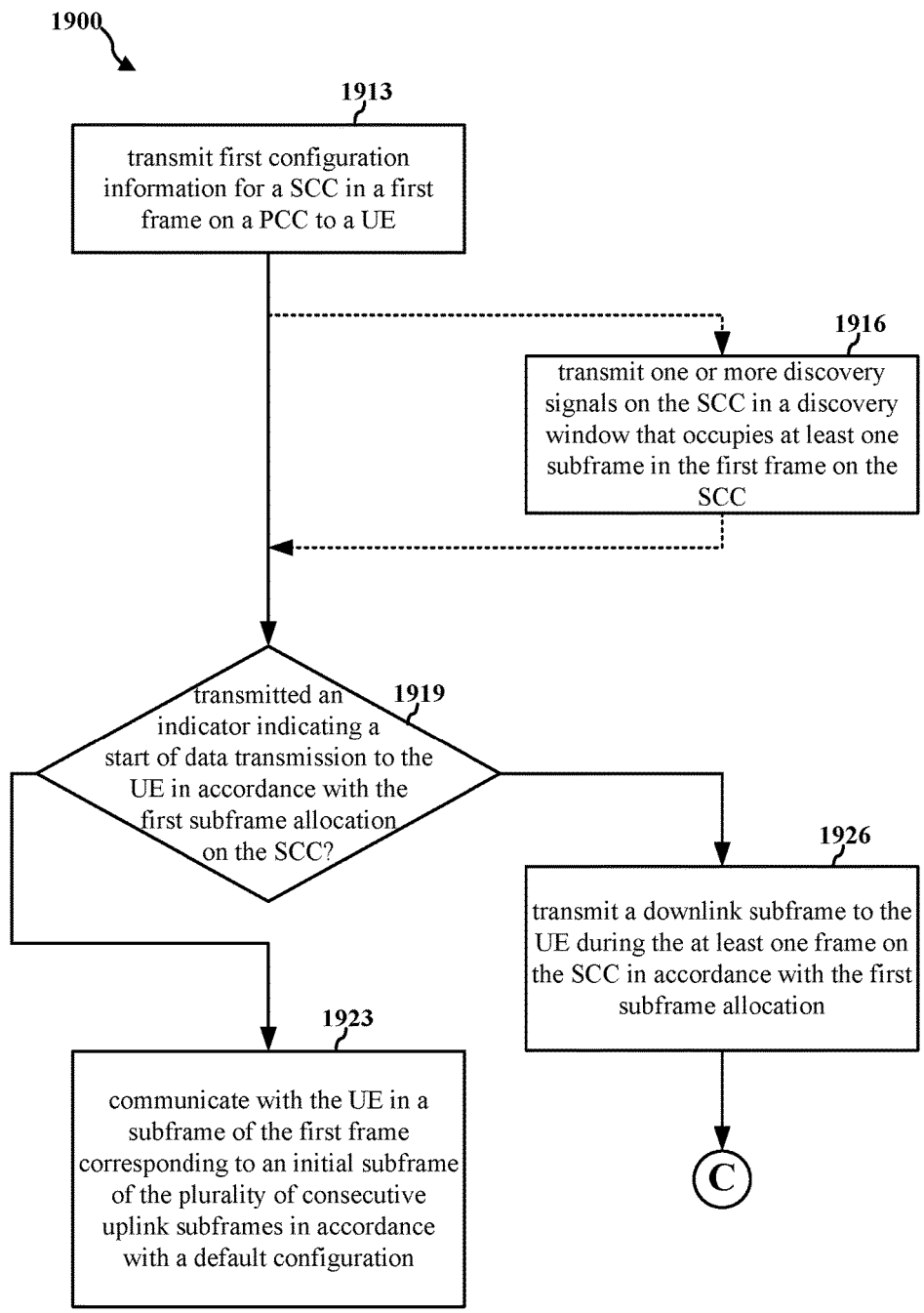
FIG. 19 is a flow chart of a method of wireless communication of a base station on a PCC and an SCC.

FIG. 19 is a flow chart 1900 of a method of wireless communication of a base station on a PCC and an SCC. The method may be performed by a base station (e.g., the eNB 702, the apparatus 2402/2402').

At operation 1913, the base station transmits first configuration information for a SCC in a first frame on a PCC to a UE. The PCC is in a licensed spectrum. The SCC is in an unlicensed spectrum. The first configuration information indicates a first subframe allocation for at least one frame on the SCC. For example, referring to FIG. 7, the eNB 702 transmits to the UE 704 an eIMTA configuration for the SCC 708 in the frame 711 on the PCC 706.

At operation 1916, in one configuration, the base station may transmit one or more discovery signals on the SCC in a discovery window that occupies at least one subframe in the first frame on the SCC. For example, referring to FIG. 10, the eNB 702 may transmit one or more discovery signals in the discovery window 1064 on the SCC 708.

At operation 1919, the base station attempts to transmit an indicator indicating a start of data transmission to the UE in accordance with the first subframe allocation on the SCC. For example, referring to FIG. 7, the eNB 702 attempts to transmit the channel reservation and access indication signals 761.

In one configuration, the first configuration information indicates the first subframe allocation in one frame. The first allocation of the one frame is applied to each frame of the at least one frame. For example, referring to FIG. 9, the eIMTA configuration may be included in a subframe of a frame 911 transmitted in a frame period 992. The eIMTA configuration indicates that the eIMTA configuration is to be applied to a frame 912 and a frame 914 transmitted on the SCC 708 in subsequent frame period 994 and frame period 996, respectively.

In one configuration, the first configuration information indicates a plurality of consecutive uplink subframes at an end of the one frame. When the attempt to transmit the indicator is not successful, at operation 1923, the base station may communicate with the UE in a subframe of the first frame corresponding to an initial subframe of the plurality of consecutive uplink subframes in accordance with a default configuration. For example, referring to FIG. 7, in one scenario, the eIMTA configuration may indicate the following allocation D D D S U U U U U S. If the eNB 702 does not obtain channel access until, for example, the subframe period 774, the UE 704 will not detect a downlink subframe and will not communicate with the eNB 702 in the frame period 792. The UE 704 may have a default eIMTA configuration, and the eNB 702 and the UE 704 can use the default eIMTA configuration to communicate.

In one configuration, the transmission of the downlink subframe occurs subsequent to the transmission of the discovery signals in the discovery window in accordance with a default configuration when the attempt to transmit the indicator is not successful.

When the attempt to transmit the indicator is successful, the base station may, at operation 1926, transmit a downlink subframe to the UE during the at least one frame on the SCC in accordance with the first subframe allocation. The downlink subframe is an initial subframe of the data transmission and subsequent to the start of the first subframe allocation. For example, referring to FIG. 7, the eNB 702 transmits a downlink subframe to the UE 704 in the subframe 741.

In one configuration, the first subframe allocation indicates an allocation of one or more uplink subframes, one or more downlink subframes, and one or more special subframes in the at least one frame.

In one configuration, the at least one frame includes the first frame on the SCC. The first configuration information is received on the PCC in an initial subframe of the first frame.

Figure 20:
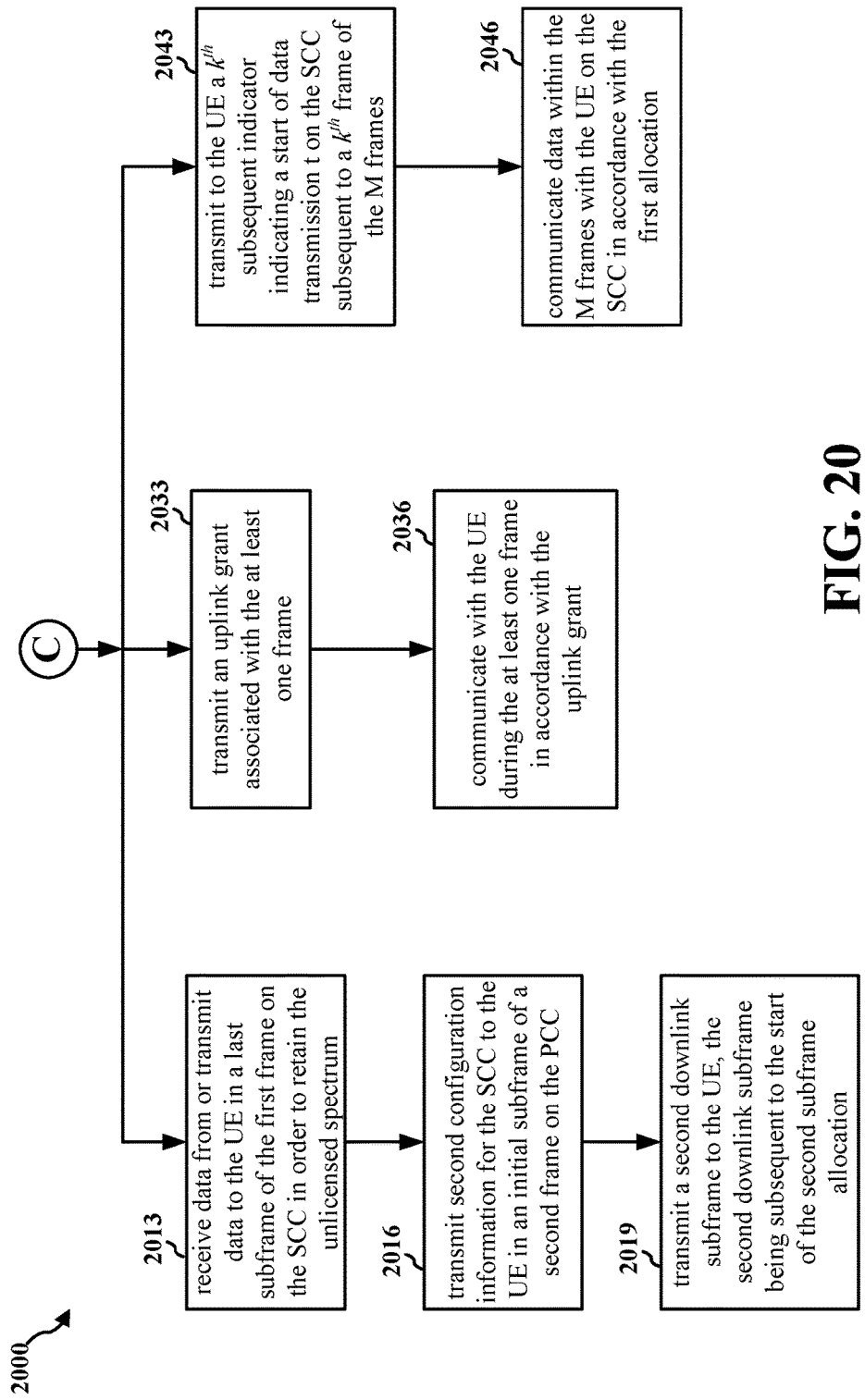
FIG. 20 is a flow chart of another method of wireless communication of a base station on a PCC and an SCC.

In certain configurations, subsequent to operation 1926, the base station may perform one or more operations shown in FIG. 20.

FIG. 20 is a flow chart 2000 of another method of wireless communication of a base station on a PCC and an SCC. The method may be performed by a base station (e.g., the eNB 702, the apparatus 2402/2402') subsequent to the operation 1926 shown in FIG. 19.

In one configuration, at operation 2013, the base station may receive data from or transmit data to the UE in a last subframe of the first frame on the SCC in order to retain the unlicensed spectrum. For example, referring to FIG. 7, the eNB 702 may transmit signals that are not recognizable by the UE 704 on the unlicensed spectrum during the subframe periods 777-779 in order to retain the unlicensed spectrum. At operation 2016, the base station may transmit second configuration information for the SCC to the UE in an initial subframe of a second frame on the PCC. The second frame is subsequent and consecutive to the first frame. The second configuration information indicates a second subframe allocation for the second frame on the SCC. At operation 2019, the base station may transmit a second downlink subframe to the UE. The second downlink subframe is subsequent to the start of the second subframe allocation. For example, referring to FIG. 7, the eNB 702 may transmit an eIMTA configuration in the subframe 730 of the frame 713 on the PCC 706. The eNB 702 may transmit downlink subframe in the subframe 750 of the frame 714 on the SCC 708.

In one configuration, the first configuration information indicates that initial two subframes of the first frame on the SCC are downlink subframes.

In one configuration, the at least one frame may include M frames subsequent to the first frame. M is an integer greater than 1. In one configuration, the first configuration information indicates the first subframe allocation in one frame. The first allocation of the one frame is applied to each frame of the at least one frame. For example, referring to FIG. 9, the eIMTA configuration may be included in a subframe of a frame 911 transmitted in a frame period 992. The eIMTA configuration indicates that the eIMTA configuration is to be applied to a frame 912 and a frame 914 transmitted on the SCC 708 in subsequent frame period 994 and frame period 996, respectively.

In one configuration, the first subframe allocation may allocate one or more downlink subframes consecutively and prior to each uplink subframe in the one frame. For example, referring to FIG. 7, in one technique, the eNB 702 may inform the UE 704 that in a frame on the SCC 708 all the downlink subframes are consecutive and all the uplink subframes are consecutive; further, the downlink subframes are allocated prior to the uplink subframes. For example, the allocation may be D D D D D S U U U S.

In one configuration, the first configuration information may indicate a plurality of consecutive downlink subframes in the one frame. The first configuration information may be transmitted in an $n^{th}$ subframe of the first frame corresponding to an initial downlink subframe of the plurality of consecutive downlink subframes of the one frame. n is an integer. The at least one frame may include the first frame and a second frame consecutively. The transmitting the downlink subframe to the UE on the SCC may be performed within a period from the $n^{th}$ subframe of the first frame to an $(n-1)^{th}$ subframe of the second frame. For example, referring to FIG. 8, the eIMTA configuration is applied to from the subframe 845 of the frame 812 to the subframe 854 of the frame 814.

In one configuration, at operation 2033, the base station may transmit an uplink grant associated with the at least one frame. A conflict may exist between the uplink grant and the first subframe allocation. At operation 2036, the base station may communicate with the UE during the at least one frame in accordance with the uplink grant. For example, referring to FIG. 7, the uplink grant in a subframe may not match with the eIMTA configuration. For example, the eIMTA configuration may indicate an allocation of D D D D D D S U U for the partial frame 712. The eNB 702, however, subsequently transmits an uplink grant for the subframe 746, which is in conflict with the downlink subframe allocation for the subframe 746 in accordance with the eIMTA configuration. In one technique, the eNB 702 may operate in accordance with the uplink grant. That is, the uplink grant overrides the eIMTA configuration. In one configuration, the at least one frame includes a second frame on the SCC starting at the received downlink subframe.

In one configuration, the at least one frame includes a second frame on the SCC starting at the transmitted downlink subframe. In one configuration, the at least one frame may include M frames. M is an integer greater than 1. An initial frame of the M frames may start at the received downlink subframe subsequent to the start of the data transmission. At operation 2043, the base station may transmit to the UE a $k^{th}$ subsequent indicator indicating a start of data transmission on the SCC subsequent to a $k^{th}$ frame of the M frames. k is an integer and k=1 to (M−1). The $(k+1)^{th}$ frame of the M frames starts at an initial downlink subframe subsequent to the $k^{th}$ subsequent indicator. At operation 2046, the base station may communicate data within the M frames with the UE on the SCC in accordance with the first allocation. For example, referring to FIG. 11, the at least one frame may include the virtual frame 1112 and the virtual frame 1114.

Figure 21:
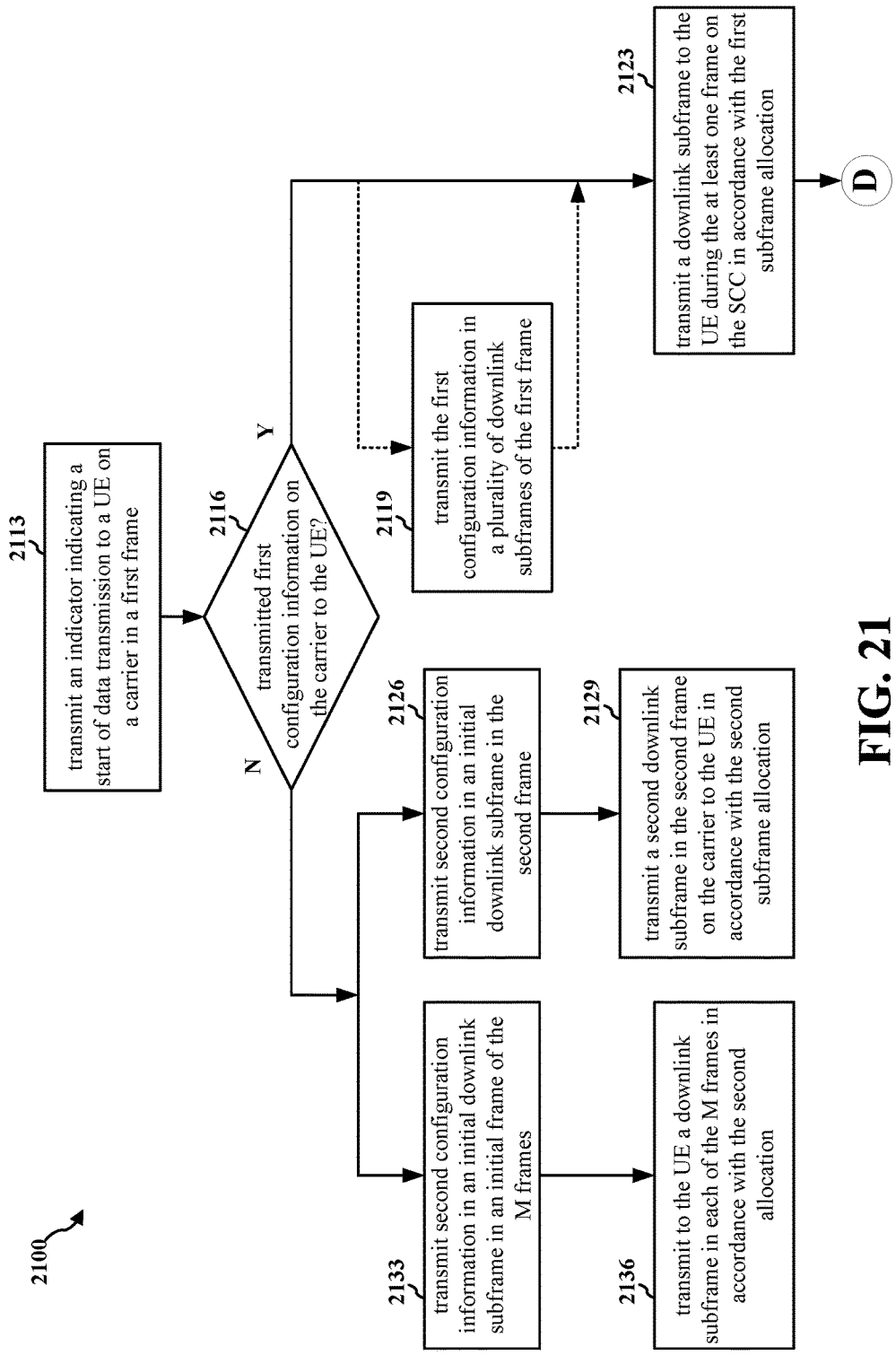
FIG. 21 is a flow chart of a method of wireless communication of a base station on a carrier.

FIG. 21 is a flow chart 2100 of a method of wireless communication of a base station on a carrier. The method may be performed by a base station (e.g., the eNB 1202, the apparatus 2402/2402').

At operation 2113, the base station transmits an indicator indicating a start of data transmission to a UE on a carrier in a first frame. The carrier is in an unlicensed spectrum. At operation 2116, the base station attempts to transmit first configuration information on the carrier to the UE. The first configuration information indicates a first subframe allocation for at least one frame on the carrier. For example, referring to FIG. 12, the eNB 1202 transmits the channel reservation and access indication signals 1261 to the UE 1204 on the carrier 1208. The eNB 1202 attempts to transmit an eIMTA configuration in the frame 1212 on the carrier 1208.

When the attempt to transmit the first configuration information on the carrier is successful, in one configuration, the base station may, at operation 2119, transmit the first configuration information in a plurality of downlink subframes of the first frame. For example, referring to FIG. 13, in one technique, the eNB 1202 may transmit the eIMTA configuration in multiple downlink subframes of the frame 1311. The eNB 1202 includes the same eIMTA configuration indicating the same allocation in multiple downlink subframes of a single frame.

When the attempt to transmit the first configuration information on the carrier is successful, the base station, at operation 2123, transmits a downlink subframe to the UE during the at least one frame on the carrier in accordance with the first subframe allocation. The downlink subframe is an initial subframe of the data transmission and subsequent to the start of the first subframe allocation.

In one configuration, the first subframe allocation may indicate allocation of one or more uplink subframes, one or more downlink subframes, and one or more special subframes in the at least one frame. In one configuration, the at least one frame may include a second frame that is subsequent and consecutive to the first frame. For example, referring to FIG. 13, the eIMTA configuration may be included in a subframe of a frame 1311 transmitted in a frame period 1392. The eIMTA configuration indicates that the eIMTA configuration is to be applied to a frame 1312 and a frame 1314 transmitted on the carrier 1208 in subsequent frame period 1394 and frame period 1396, respectively.

In one configuration, when the attempt to transmit the first configuration information on the carrier is not successful, the base station may, at operation 2126, transmit second configuration information in an initial downlink subframe in the second frame. The second configuration information indicates a second subframe allocation for the second frame on the carrier. At operation 2129, the base station may transmit a second downlink subframe in the second frame on the carrier from the base station in accordance with the second subframe allocation. For example, referring to FIG. 12, in one technique, if eNB 1202 is not able to transmit an eIMTA configuration in the frame 1212, but is able to transmit an eIMTA configuration in an initial downlink subframe (e.g., a subframe 1250) of the frame 1214, the eNB 1202 may use the allocation indicated in the eIMTA configuration in the initial downlink subframe for the frame 1214.

In one configuration, the at least one frame may include the first frame. The first configuration information may be received in an initial downlink subframe of the first frame. In one configuration, the at least one frame may include M frames subsequent to the first frame. M is an integer greater than 1. In one configuration, when the attempt to transmit the first configuration information on the carrier is not successful, the base station may, at operation 2133, transmit second configuration information in an initial downlink subframe in an initial frame of the M frames. The second configuration information indicates second subframe allocation in one frame on the carrier. At operation 2136, the base station may transmit to the UE a downlink subframe in each of the M frames in accordance with the second subframe allocation. For example, referring to FIG. 13, if eNB 1202 is not able to transmit an eIMTA configuration in the frame 1311, but is able to transmit an eIMTA configuration in an initial downlink subframe of the frame 1312, the eNB 1202 may use the allocation indicated in the eIMTA configuration in the initial downlink subframe for both the frame 1312 and the frame 1314 (i.e., the frames within the periodicity).

Figure 22:
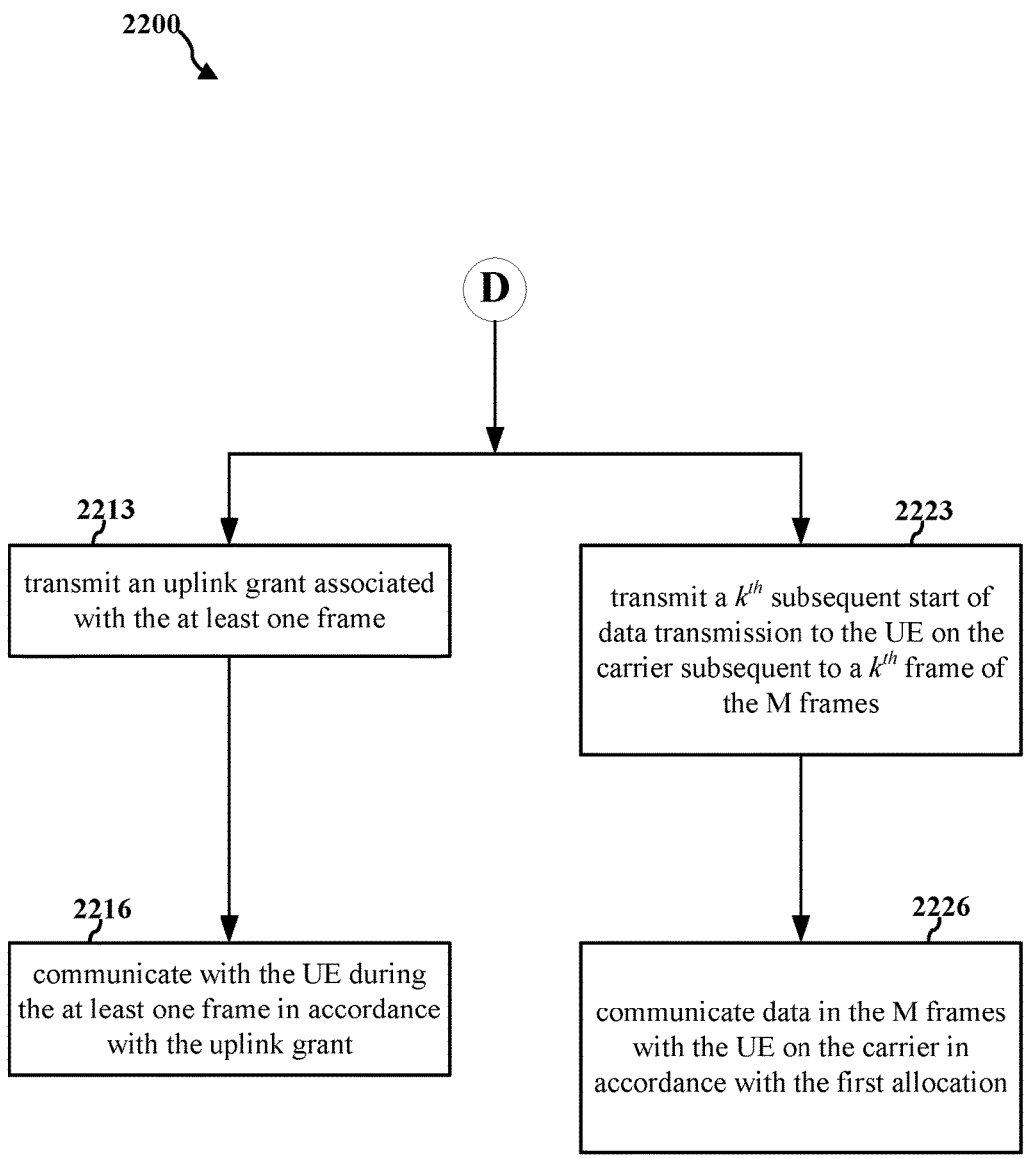
FIG. 22 is a flow chart of another method of wireless communication of a base station on a carrier.

FIG. 22 is a flow chart 2200 of another method of wireless communication of a base station on a carrier. The method may be performed by a base station (e.g., the eNB 1202, the apparatus 2402/2402') subsequent to the operation 2123 shown in FIG. 21.

In one configuration, subsequent to the operation 2123, the base station may, at operation 2213, transmit an uplink grant associated with the at least one frame. A conflict may exist between the uplink grant and the first subframe allocation. At operation 2216, the base station may communicate with the UE during the at least one frame in accordance with the uplink grant. For example, referring to FIG. 12, the uplink grant overrides the eIMTA configuration when there is a conflict at a subframe, as the eNB 1202 transmits uplink grants only in the current frame and uplink grants are not valid across frames.

In one configuration, the at least one frame may include a second frame on the carrier starting at the downlink subframe. For example, referring to FIG. 14, the at least one frame may include the frame 1412. In one configuration, the at least one frame may include M frames. M is an integer greater than 1. An initial frame of the M frames may start at the downlink subframe subsequent to the start of the data transmission. The first configuration information may be transmitted in the downlink subframe subsequent to the start of the data transmission. Subsequent to the operation 2123, the base station may, at operation 2223, transmit a $k^{th}$ subsequent indicator indicating a start of data transmission to the UE on the carrier subsequent to a $k^{th}$ frame of the M frames. k is an integer and k=1 to (M−1). The $(k+1)^{th}$ frame of the M frames starts in an initial downlink subframe subsequent to the kth subsequent indicator. At operation 2226, the base station may communicate data in the M frames with the UE on the carrier in accordance with the first allocation. For example, referring to FIG. 14, the at least one frame may include the virtual frame 1412 and the virtual frame 1414.

Figure 23:
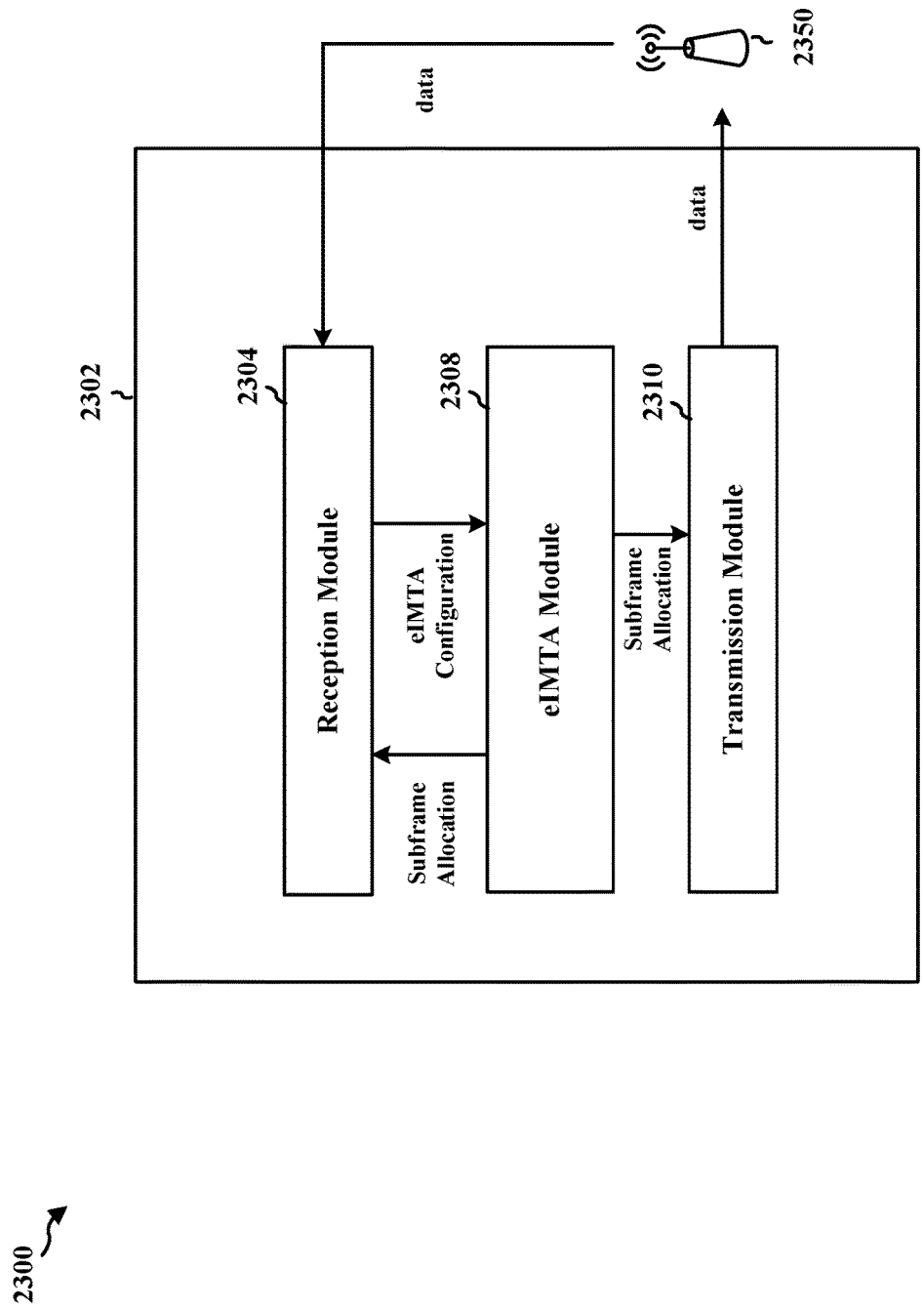
FIG. 23 is a conceptual data flow diagram illustrating the data flow between different modules/means/components in an exemplary apparatus.

FIG. 23 is a conceptual data flow diagram 2300 illustrating the data flow between different modules/means/components in an exemplary apparatus 2302. The apparatus may be a UE. The apparatus includes a reception module 2304, a transmission module 2310, and an eIMTA module 2308.

In one aspect, the reception module 2304 may be configured to receive first configuration information for a SCC in a first frame on a PCC from an eNB 2350. The PCC is in a licensed spectrum. The SCC is in an unlicensed spectrum. The first configuration information indicates a first subframe allocation for at least one frame on the SCC. The reception module 2304 may be configured to transmit the first configuration information to the eIMTA module 2308. The eIMTA module 2308 may be configured to process the first configuration information to obtain the first subframe allocation and to send the first subframe allocation to the reception module 2304 and the transmission module 2310. The reception module 2304 may be configured to attempt to detect a start of data transmission from the eNB 2350 on the SCC. The reception module 2304 may be configured to receive a downlink subframe from the eNB 2350 during the at least one frame on the SCC in accordance with the first subframe allocation when the attempt to detect the start of data transmission is successful. The downlink subframe is an initial subframe of the data transmission and subsequent to the start of the first subframe allocation.

In one configuration, the first subframe allocation indicates an allocation of one or more uplink subframes, one or more downlink subframes, and one or more special subframes in the at least one frame. In one configuration, the at least one frame includes the first frame on the SCC. The first configuration information is received on the PCC in an initial subframe of the first frame.

In one configuration, the transmission module 2310 may be configured to transmit data to or the reception module 2304 may be configured to receive data from the eNB 2350 in a last subframe of the first frame on the SCC in order to retain the unlicensed spectrum. The reception module 2304 may be configured to receive second configuration information for the SCC from the eNB 2350 in an initial subframe of a second frame on the PCC. The second frame is subsequent and consecutive to the first frame. The second configuration information indicates a second subframe allocation for the second frame on the SCC. The reception module 2304 may be configured to transmit the second configuration information to the eIMTA module 2308. The eIMTA module 2308 may be configured to process the second configuration information to obtain the second subframe allocation and to send the first subframe allocation to the reception module 2304 and the transmission module 2310. The reception module 2304 may be configured to receive a second downlink subframe from the eNB 2350. The second downlink subframe is subsequent to the start of the second subframe allocation.

In one configuration, the first configuration information indicates that initial two subframes of the first frame on the SCC are downlink subframes. In one configuration, the reception module 2304 may be configured to buffer data received in a subframe subsequent to the downlink subframe of the at least one frame on the SCC. The eIMTA module 2308 may be configured to process the first configuration information to determine whether an allocation of the subframe subsequent to the initial subframe on the SCC is a downlink subframe or a special subframe. The reception module 2304 and/or the transmission module 2310 may be configured to process the buffered data in accordance with the determined allocation of the subframe subsequent to the initial subframe on the SCC.

In one configuration, the reception module 2304 may be configured to receive one or more discovery signals on the SCC in a discovery window that occupies at least one subframe in the first frame on the SCC. The attempting to detect the start of the data transmission is performed in a subframe on the SCC subsequent to the receipt of the discovery signals in the discovery window. In one configuration, the receipt of the downlink subframe occurs subsequent to the receipt of the discovery signals in the discovery window in accordance with a default configuration when the attempt to detect the start of data transmission is not successful.

In one configuration, the at least one frame includes M frames subsequent to the first frame. M is an integer greater than 1. In one configuration, the first configuration information indicates the first subframe allocation in one frame. The first allocation of the one frame is applied to each frame of the at least one frame. In one configuration, the first subframe allocation allocates one or more downlink subframes consecutively and prior to each uplink subframe in the one frame.

In one configuration, the first configuration information indicates a plurality of consecutive downlink subframes in the one frame. The first configuration information is received in an $n^{th}$ subframe of the first frame corresponding to an initial downlink subframe of the plurality of consecutive downlink subframes of the one frame. n is an integer. The at least one frame includes the first frame and a second frame consecutively. The receiving the downlink subframe from the eNB 2350 on the SCC is performed within a period from the $n^{th}$ subframe of the first frame to an $(n-1)^{th}$ subframe of the second frame.

In one configuration, the first configuration information indicates a plurality of consecutive uplink subframes at an end of the one frame. The reception module 2304 and/or the transmission module 2310 may be configured to communicate with the eNB 2350 in a subframe of the first frame corresponding to an initial subframe of the plurality of consecutive uplink subframes in accordance with a default configuration when the attempt to detect the start of data transmission is not successful.

In one configuration, the reception module 2304 may be configured to receive an uplink grant associated with the at least one frame. The eIMTA module 2308 may be configured to determine that a conflict exists between the uplink grant and the first subframe allocation. The reception module 2304 and/or the transmission module 2310 may be configured to communicate with the eNB 2350 during the at least one frame in accordance with the uplink grant.

In one configuration, the at least one frame includes M frames. M is an integer greater than 1. An initial frame of the M frames starts at the received downlink subframe subsequent to the start of the data transmission. At operation 1643, the reception module 2304 may be configured to detect a $k^{th}$ subsequent start of data transmission from the eNB 2350 on the SCC subsequent to a $k^{th}$ frame of the M frames. k is an integer and k=1 to (M−1). The $(k+1)^{th}$ frame of the M frames starts at an initial downlink subframe subsequent to the $k^{th}$ subsequent start. The reception module 2304 and/or the transmission module 2310 may be configured to communicate data within the M frames with the eNB 2350 on the SCC in accordance with the first subframe allocation.

In another aspect, the reception module 2304 may be configured to detect a start of data transmission from an eNB 2350 on a carrier in a first frame. The carrier is in an unlicensed spectrum. The reception module 2304 may be configured to attempt to receive first configuration information on the carrier from the eNB 2350. The first configuration information indicates a first subframe allocation for at least one frame on the carrier. The reception module 2304 may be configured to transmit the first configuration information to the eIMTA module 2308. The eIMTA module 2308 may be configured to process the first configuration information to obtain the first subframe allocation and to send the first subframe allocation to the reception module 2304 and the transmission module 2310. The reception module 2304 may be configured to receive a downlink subframe from the eNB 2350 during the at least one frame on the carrier in accordance with the first subframe allocation when the attempt to receive the first configuration information on the carrier is successful. The downlink subframe is an initial subframe of the data transmission and subsequent to the start of the first subframe allocation.

In one configuration, the first subframe allocation indicates allocation of one or more uplink subframes, one or more downlink subframes, and one or more special subframes in the at least one frame.

In one configuration, the at least one frame includes a second frame that is subsequent and consecutive to the first frame. In one configuration, the reception module 2304 may be configured to receive second configuration information in an initial downlink subframe in the second frame. The second configuration information indicates a second subframe allocation for the second frame on the carrier. The reception module 2304 may be configured to transmit the second configuration information to the eIMTA module 2308. The eIMTA module 2308 may be configured to process the second configuration information to obtain the second subframe allocation and to send the second subframe allocation to the reception module 2304 and the transmission module 2310. The reception module 2304 may be configured to receive a second downlink subframe in the second frame on the carrier from the eNB 2350 in accordance with the second subframe allocation when the attempt to receive the first configuration information on the carrier is not successful.

In one configuration, the at least one frame includes the first frame. The first configuration information is received in an initial downlink subframe of the first frame. In one configuration, the at least one frame includes M frames subsequent to the first frame. M is an integer greater than 1. In one configuration, the reception module 2304 may be configured to receive second configuration information in an initial downlink subframe in an initial frame of the M frames. The second configuration information indicates second subframe allocation in one frame on the carrier. The reception module 2304 may be configured to receive from the eNB 2350 a downlink subframe in each of the M frames in accordance with the second allocation when the attempt to receive the first configuration information on the carrier is not successful.

In one configuration, the reception module 2304 may be configured to receive an uplink grant associated with the at least one frame. The eIMTA module 2308 may be configured to determine that a conflict exists between the uplink grant and the first subframe allocation. The reception module 2304 and/or the transmission module 2310 may be configured to communicate with the eNB 2350 during the at least one frame in accordance with the uplink grant.

In one configuration, the reception module 2304 may be configured to receive the first configuration information in a plurality of downlink subframes of the first frame. In one configuration, the at least one frame includes a second frame on the carrier starting at the downlink subframe. In one configuration, the at least one frame includes M frames. M is an integer greater than 1. An initial frame of the M frames starts at the downlink subframe subsequent to the start of the data transmission. The first configuration information is received in the downlink subframe subsequent to the start of the data transmission. The reception module 2304 may be configured to detect a $k^{th}$ subsequent start of data transmission from the eNB 2350 on the carrier subsequent to a $k^{th}$ frame of the M frames. k is an integer and k=1 to (M−1). The $(k+1)^{th}$ frame of the M frames starts in an initial downlink subframe subsequent to the $k^{th}$ subsequent start. The reception module 2304 and/or the transmission module 2310 may be configured to communicate data in the M frames with the eNB 2350 on the carrier in accordance with the first allocation.

The apparatus may include additional modules that perform each of the blocks of the algorithm in the aforementioned flow charts of FIGS. 15-18. As such, each block in the aforementioned flow charts of FIGS. 15-18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 24:
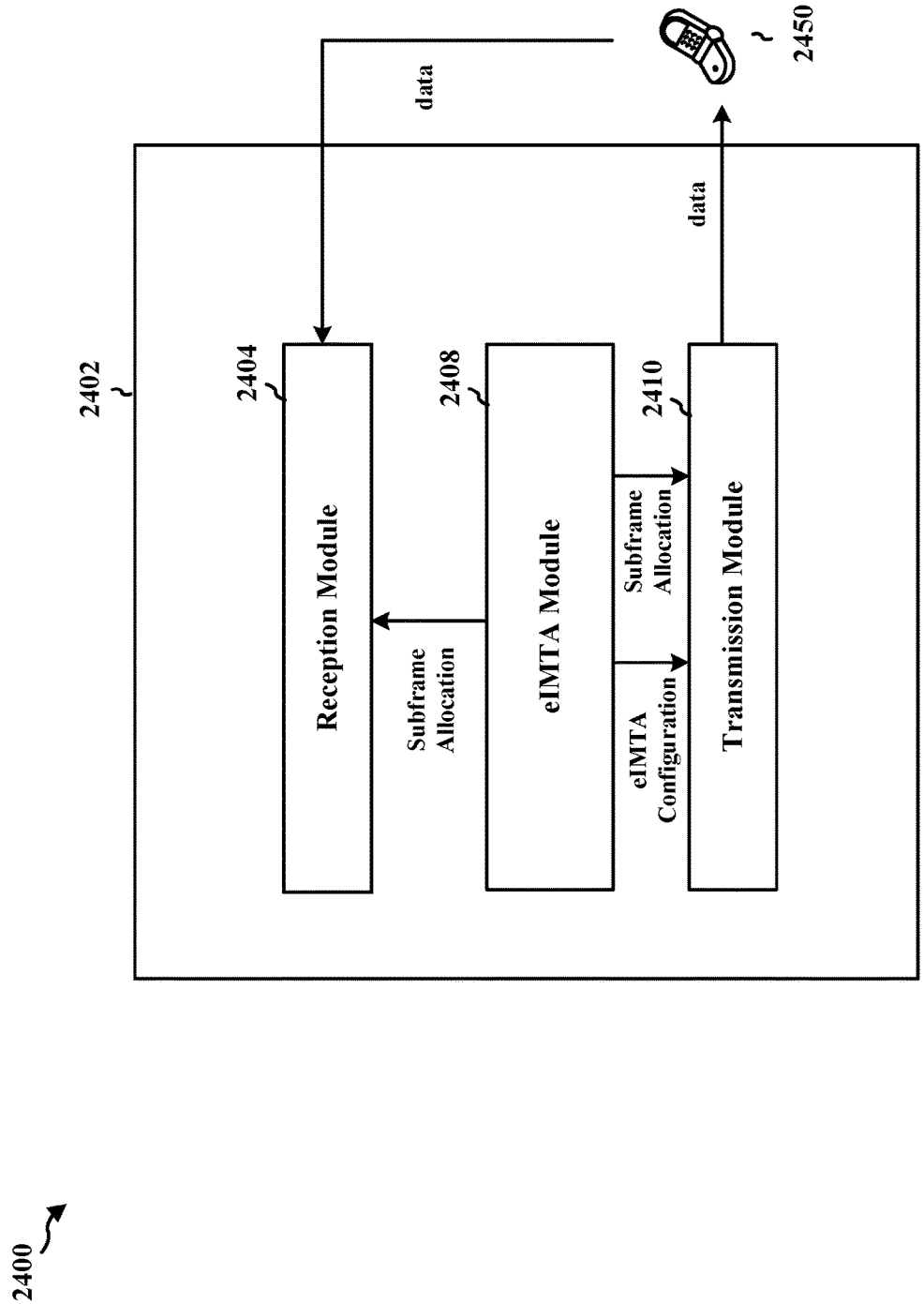
FIG. 24 is a conceptual data flow diagram illustrating the data flow between different modules/means/components in another exemplary apparatus.

FIG. 24 is a conceptual data flow diagram 2400 illustrating the data flow between different modules/means/components in another exemplary apparatus 2402. The apparatus may be an eNB. The apparatus includes a reception module 2404, a transmission module 2410, and an eIMTA module 2408.

In one aspect, the eIMTA module 2408 may be configured to transmit first configuration information for an SCC to the transmission module 2410. The first configuration information indicates a first subframe allocation for at least one frame on the SCC. The transmission module 2410 may be configured to transmit the first configuration information in a first frame on a PCC to a UE 2450. The PCC is in a licensed spectrum. The SCC is in an unlicensed spectrum.

The transmission module 2410 may be configured to attempt to transmit an indicator indicating a start of data transmission to the UE 2450 in accordance with the first subframe allocation on the SCC. The transmission module 2410 may be configured to transmit a downlink subframe to the UE 2450 during the at least one frame on the SCC in accordance with the first subframe allocation when the attempt to transmit the indicator is successful. The downlink subframe is an initial subframe of the data transmission and subsequent to the start of the first subframe allocation.

In one configuration, the first subframe allocation indicates an allocation of one or more uplink subframes, one or more downlink subframes, and one or more special subframes in the at least one frame. In one configuration, the at least one frame includes the first frame on the SCC. The first configuration information is transmitted on the PCC in an initial subframe of the first frame. In one configuration, the reception module 2404 may be configured to receive data from or the transmission module 2410 may be configured to transmit data to the UE 2450 in a last subframe of the first frame on the SCC in order to retain the unlicensed spectrum.

In one configuration, the eIMTA module 2408 may be configured to transmit second configuration information for the SCC to the transmission module 2410. The second configuration information indicates a second subframe allocation for the second frame on the SCC. The transmission module 2410 may be configured to transmit the second configuration information to the UE 2450 in an initial subframe of a second frame on the PCC. The second frame is subsequent and consecutive to the first frame. The transmission module 2410 may be configured to transmit a second downlink subframe to the UE 2450. The second downlink subframe is subsequent to the start of the second subframe allocation.

In one configuration, the first configuration information indicates that initial two subframes of the first frame on the SCC are downlink subframes. In one configuration, the transmission module 2410 may be configured to transmit one or more discovery signals on the SCC in a discovery window that occupies at least one subframe in the first frame on the SCC. The attempting to transmit the indicator is performed in a subframe on the SCC subsequent to the transmission of the discovery signals in the discovery window.

In one configuration, the transmission of the downlink subframe occurs subsequent to the transmission of the discovery signals in the discovery window in accordance with a default configuration when the attempt to transmit the indicator is not successful. In one configuration, the at least one frame includes M frames subsequent to the first frame. M is an integer greater than 1.

In one configuration, the first configuration information indicates the first allocation of subframes in one frame. The first allocation of the one frame is applied to each frame of the at least one frame.

In one configuration, the first subframe allocation allocates one or more downlink subframes consecutively and prior to each uplink subframe in the one frame. In one configuration, the first configuration information indicates a plurality of consecutive downlink subframes in the one frame. The first configuration information is transmitted in an $n^{th}$ subframe of the first frame corresponding to an initial downlink subframe of the plurality of consecutive downlink subframes of the one frame. n is an integer. The at least one frame includes the first frame and a second frame consecutively. The transmitting the downlink subframe to the UE 2450 on the SCC is performed within a period from the nth subframe of the first frame to an $(n-1)^{th}$ subframe of the second frame.

In one configuration, the first configuration information indicates a plurality of consecutive uplink subframes at an end of the one frame. The reception module 2404 and/or the transmission module 2410 may be configured to communicate with the UE 2450 in a subframe of the first frame corresponding to an initial subframe of the plurality of consecutive uplink subframes in accordance with a default configuration when the attempt to transmit the indicator is not In one configuration, the transmission module 2410 may be configured to transmit an uplink grant associated with the at least one frame. A conflict exists between the uplink grant and the first subframe allocation. The reception module 2404 and/or the transmission module 2410 may be configured to communicate with the UE 2450 during the at least one frame in accordance with the uplink grant.

In one configuration, the at least one frame includes a second frame on the SCC starting at the transmitted downlink subframe. In one configuration, the at least one frame includes M frames. M is an integer greater than 1. An initial frame of the M frames starts at the transmitted downlink subframe subsequent to the start of the data transmission. The transmission module 2410 may be configured to transmit to the UE 2450 a $k^{th}$ subsequent indicator indicating a start of data transmission on the SCC subsequent to a $k^{th}$ frame of the M frames. k is an integer and k=1 to (M−1). The $(k+1)^{th}$ frame of the M frames starts at an initial downlink subframe subsequent to the $k^{th}$ subsequent indicator. The reception module 2404 and/or the transmission module 2410 may be configured to communicate data within the M frames with the UE 2450 on the SCC in accordance with the first subframe allocation.

In another aspect, the transmission module 2410 may be configured to transmit an indicator indicating a start of data transmission to the UE 2450 on a carrier in a first frame. The carrier is in an unlicensed spectrum. The eIMTA module 2408 may be configured to transmit first configuration information to the transmission module 2410. The first configuration information indicates a first subframe allocation for at least one frame on the carrier. The transmission module 2410 may be configured to attempt to transmit the first configuration information on the carrier to the UE 2450.

The transmission module 2410 may be configured to transmit a downlink subframe to the UE 2450 during the at least one frame on the carrier in accordance with the first subframe allocation when the attempt to transmit the first configuration information on the carrier is successful. The downlink subframe is an initial subframe of the data transmission and subsequent to the start of the first subframe allocation.

In one configuration, the first subframe allocation indicates allocation of one or more uplink subframes, one or more downlink subframes, and one or more special subframes in the at least one frame. In one configuration, the at least one frame includes a second frame that is subsequent and consecutive to the first frame. In one configuration, the transmission module 2410 may be configured to transmit second configuration information in an initial downlink subframe in the second frame. The second configuration information indicates a second subframe allocation for the second frame on the carrier. The transmission module 2410 may be configured to transmit a second downlink subframe in the second frame on the carrier to the UE 2450 in accordance with the second subframe allocation when the attempt to transmit the first configuration information on the carrier is not successful.

In one configuration, the at least one frame includes the first frame. The first configuration information is transmitted in an initial downlink subframe of the first frame. In one configuration, the at least one frame includes M frames subsequent to the first frame. M is an integer greater than 1. In one configuration, the transmission module 2410 may be configured to transmit second configuration information in an initial downlink subframe in an initial frame of the M frames. The second configuration information indicates second subframe allocation in one frame on the carrier. The transmission module 2410 may be configured to transmit to the UE 2450 a downlink subframe in each of the M frames in accordance with the second subframe allocation when the attempt to transmit the first configuration information on the carrier is not successful.

In one configuration, the transmission module 2410 may be configured to transmit an uplink grant associated with the at least one frame. A conflict exists between the uplink grant and the first subframe allocation. The reception module 2404 and/or the transmission module 2410 may be configured to communicate with the UE 2450 during the at least one frame in accordance with the uplink grant.

In one configuration, the transmission module 2410 may be configured to transmit the first configuration information in a plurality of downlink subframes of the first frame. In one configuration, the at least one frame includes a second frame on the carrier starting at the downlink subframe. In one configuration, the at least one frame includes M frames. M is an integer greater than 1. An initial frame of the M frames starts at the downlink subframe subsequent to the start of the data transmission. The first configuration information is transmitted in the downlink subframe subsequent to the start of the data transmission. The transmission module 2410 may be configured to transmit a kth subsequent indicator indicating a start of data transmission to the UE 2450 on the carrier subsequent to a $k^{th}$ frame of the M frames. k is an integer and k=1 to (M−1). The $(k+1)^{th}$ frame of the M frames starts in an initial downlink subframe subsequent to the $k^{th}$ subsequent indicator. The reception module 2404 and/or the transmission module 2410 may be configured to communicate data in the M frames with the UE 2450 on the carrier in accordance with the first subframe allocation.

The apparatus may include additional modules that perform each of the blocks of the algorithm in the aforementioned flow charts of FIGS. 19-22. As such, each block in the aforementioned flow charts of FIGS. 19-22 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 25:
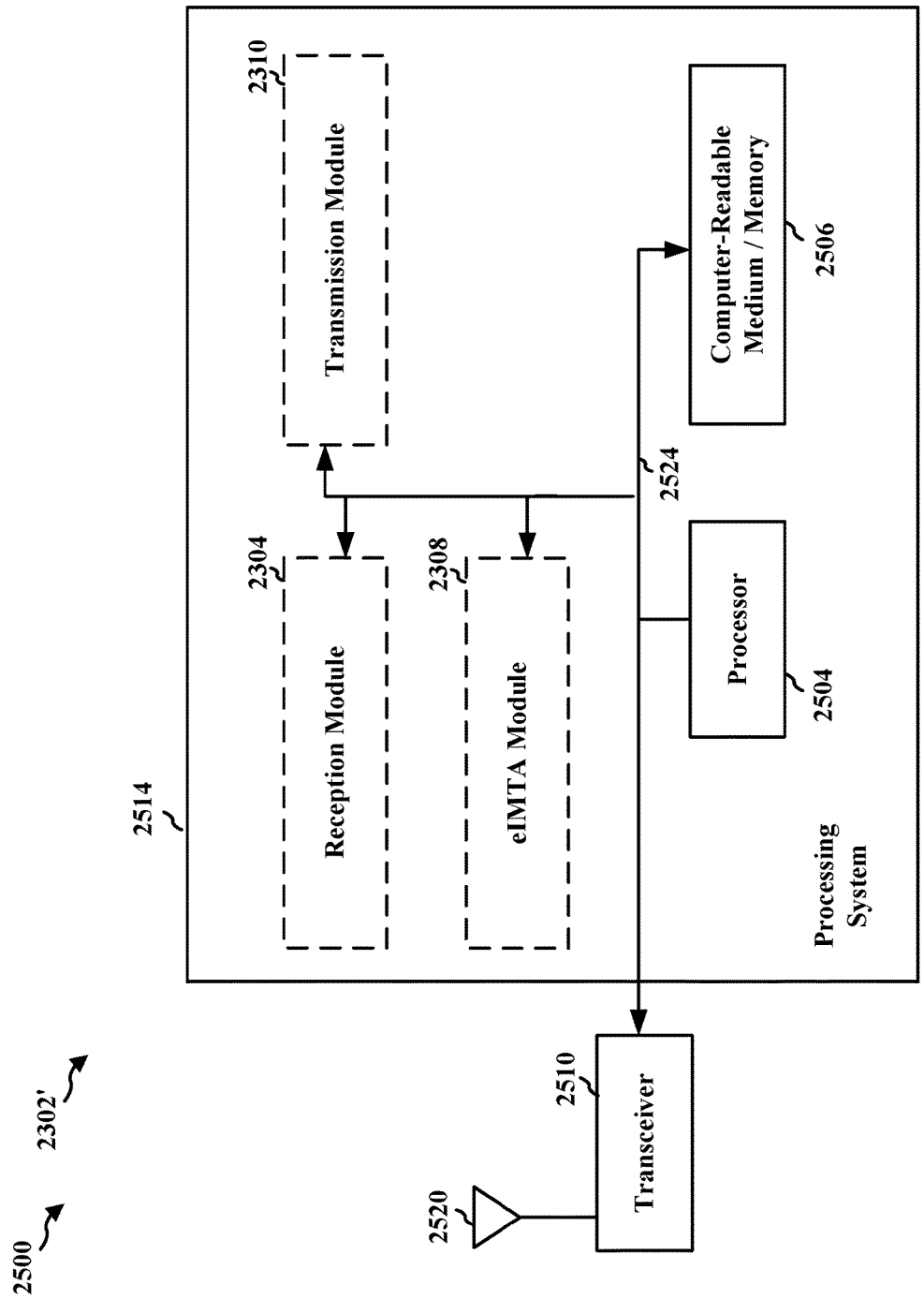
FIG. 25 is a diagram illustrating an example of a hardware implementation for an apparatus employing a processing system.

FIG. 25 is a diagram 2500 illustrating an example of a hardware implementation for an apparatus 2302' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware modules, represented by the processor 2504, the modules 2304, 2308, 2310, and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception module 2304. In addition, the transceiver 2510 receives information from the processing system 2514, specifically the transmission module 2310, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system further includes at least one of the modules 2304, 2308, and 2310. The modules may be software modules running in the processor 2504, resident/stored in the computer readable medium/memory 2506, one or more hardware modules coupled to the processor 2504, or some combination thereof. The processing system 2514 may be a component of the UE 650 and may include the memory 660 and/or at least one of the TX processor 668, the RX processor 656, and the controller/processor 659.

In one configuration, the apparatus 2302/2302' for wireless communication includes means for receiving first configuration information for SCC in a first frame on a PCC from a base station. The PCC is in a licensed spectrum. The SCC is in an unlicensed spectrum. The first configuration information indicates a first subframe allocation for at least one frame on the SCC. The apparatus 2302/2302' includes means for attempting to detect a start of data transmission from the base station on the SCC. The apparatus 2302/2302' includes means for receiving a downlink subframe from the base station during the at least one frame on the SCC in accordance with the first subframe allocation when the attempt to detect the start of data transmission is successful. The downlink subframe is an initial subframe of the data transmission and subsequent to the start of the first subframe allocation.

The first subframe allocation may indicate an allocation of one or more uplink subframes, one or more downlink subframes, and one or more special subframes in the at least one frame. The at least one frame may include the first frame on the SCC. The first configuration information is received on the PCC in an initial subframe of the first frame.

The apparatus 2302/2302' may include means for transmitting data to or receiving data from the base station in a last subframe of the first frame on the SCC in order to retain the unlicensed spectrum. The apparatus 2302/2302' may include means for receiving second configuration information for the SCC from the base station in an initial subframe of a second frame on the PCC. The second frame is subsequent and consecutive to the first frame. The second configuration information indicates a second subframe allocation for the second frame on the SCC. The apparatus 2302/2302' may include means for receiving a second downlink subframe from the base station. The second downlink subframe is subsequent to the start of the second subframe allocation. The first configuration information may indicate that initial two subframes of the first frame on the SCC are downlink subframes.

The apparatus 2302/2302' may include means for buffering data received in a subframe subsequent to the downlink subframe of the at least one frame on the SCC. The apparatus 2302/2302' may include means for processing the first configuration information to determine whether an allocation of the subframe subsequent to the initial subframe on the SCC is a downlink subframe or a special subframe. The apparatus 2302/2302' may include means for processing the buffered data in accordance with the determined allocation of the subframe subsequent to the initial subframe on the SCC.

The apparatus 2302/2302' may include means for receiving one or more discovery signals on the SCC in a discovery window that occupies at least one subframe in the first frame on the SCC. The means for attempting to detect the start of data transmission may be configured to attempt to detect the start of the data transmission in a subframe on the SCC subsequent to the receipt of the discovery signals in the discovery window.

The means for receiving the one or more discovery signals may be configured to receive the downlink subframe subsequent to the receipt of the discovery signals in the discovery window in accordance with a default configuration when the attempt to detect the start of data transmission is not successful. The at least one frame may include M frames subsequent to the first frame. M is an integer greater than 1. The first configuration information may indicate the first subframe allocation in one frame. The first allocation of the one frame may be applied to each frame of the at least one frame. The first subframe allocation may allocate one or more downlink subframes consecutively and prior to each uplink subframe in the one frame.

The first configuration information may indicate a plurality of consecutive downlink subframes in the one frame. The means for receiving first configuration information may be configured to receive the first configuration information in an $n^{th}$ subframe of the first frame corresponding to an initial downlink subframe of the plurality of consecutive downlink subframes of the one frame, n being an integer. The at least one frame may include the first frame and a second frame consecutively. The means for receiving the downlink subframe may be configured to receive the downlink subframe from the base station on the SCC within a period from the $n^{th}$ subframe of the first frame to an $(n-1)^{th}$ subframe of the second frame.

The first configuration information may indicate a plurality of consecutive uplink subframes at an end of the one frame. The apparatus 2302/2302' may include means for communicating with the base station in a subframe of the first frame corresponding to an initial subframe of the plurality of consecutive uplink subframes in accordance with a default configuration when the attempt to detect the start of data transmission is not successful.

The apparatus 2302/2302' may include means for receiving an uplink grant associated with the at least one frame. The apparatus 2302/2302' may include means for determining that a conflict exists between the uplink grant and the first subframe allocation. The apparatus 2302/2302' may include means for communicating with the base station during the at least one frame in accordance with the uplink grant. The at least one frame may include a second frame on the SCC starting at the received downlink subframe.

The at least one frame may include M frames. M is an integer greater than 1. An initial frame of the M frames may start at the received downlink subframe subsequent to the start of the data transmission. The apparatus 2302/2302' may include means for detecting a $k^{th}$ subsequent start of data transmission from the base station on the SCC subsequent to a $k^{th}$ frame of the M frames, k being an integer and k=1 to (M−1). The $(k+1)^{th}$ frame of the M frames starts at an initial downlink subframe subsequent to the $k^{th}$ subsequent start. The apparatus 2302/2302' may include means for communicating data within the M frames with the base station on the SCC in accordance with the first subframe allocation.

In another configuration, the apparatus 2302/2302' includes means for detecting a start of data transmission from a base station on a carrier in a first frame. The carrier is in an unlicensed spectrum. The apparatus 2302/2302' includes means for attempting to receive first configuration information on the carrier from the base station. The first configuration information indicates a first subframe allocation for at least one frame on the carrier. The apparatus 2302/2302' may include means for receiving a downlink subframe from the base station during the at least one frame on the carrier in accordance with the first subframe allocation when the attempt to receive the first configuration information on the carrier is successful. The downlink subframe is an initial subframe of the data transmission and subsequent to the start of the first subframe allocation. The first subframe allocation may indicate allocation of one or more uplink subframes, one or more downlink subframes, and one or more special subframes in the at least one frame. The at least one frame may include a second frame that is subsequent and consecutive to the first frame.

The apparatus 2302/2302' may include means for receiving second configuration information in an initial downlink subframe in the second frame. The second configuration information indicates a second subframe allocation for the second frame on the carrier. The apparatus 2302/2302' may include means for receiving a second downlink subframe in the second frame on the carrier from the base station in accordance with the second subframe allocation when the attempt to receive the first configuration information on the carrier is not successful.

The at least one frame may include the first frame. The means for receiving the first configuration may be configured to receive the first configuration information in an initial downlink subframe of the first frame. The at least one frame includes M frames subsequent to the first frame, M being an integer greater than 1.

The apparatus 2302/2302' may include means for receiving second configuration information in an initial downlink subframe in an initial frame of the M frames. The second configuration information indicates second subframe allocation in one frame on the carrier. The apparatus 2302/2302' may include means for receiving from the base station a downlink subframe in each of the M frames in accordance with the second subframe allocation when the attempt to receive the first configuration information on the carrier is not successful.

The apparatus 2302/2302' may include means for receiving an uplink grant associated with the at least one frame. The apparatus 2302/2302' may include means for determining that a conflict exists between the uplink grant and the first subframe allocation. The apparatus 2302/2302' may include means for communicating with the base station during the at least one frame in accordance with the uplink grant. The apparatus 2302/2302' may include means for receiving the first configuration information in a plurality of downlink subframes of the first frame. The at least one frame may include a second frame on the carrier starting at the downlink subframe.

The at least one frame includes M frames. M is an integer greater than 1. An initial frame of the M frames may start at the downlink subframe subsequent to the start of the data transmission. The first configuration information may be received in the downlink subframe subsequent to the start of the data transmission. The apparatus 2302/2302' may include means for detecting a $k^{th}$ subsequent start of data transmission from the base station on the carrier subsequent to a $k^{th}$ frame of the M frames. k is an integer and k=1 to (M−1). The $(k+1)^{th}$ frame of the M frames may start in an initial downlink subframe subsequent to the $k^{th}$ subsequent start. The apparatus 2302/2302' may include means for communicating data in the M frames with the base station on the carrier in accordance with the first allocation.

The aforementioned means may be one or more of the aforementioned modules of the apparatus 2302 and/or the processing system 2514 of the apparatus 2302' configured to perform the functions recited by the aforementioned means. As described supra, the processing system 2514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 26:
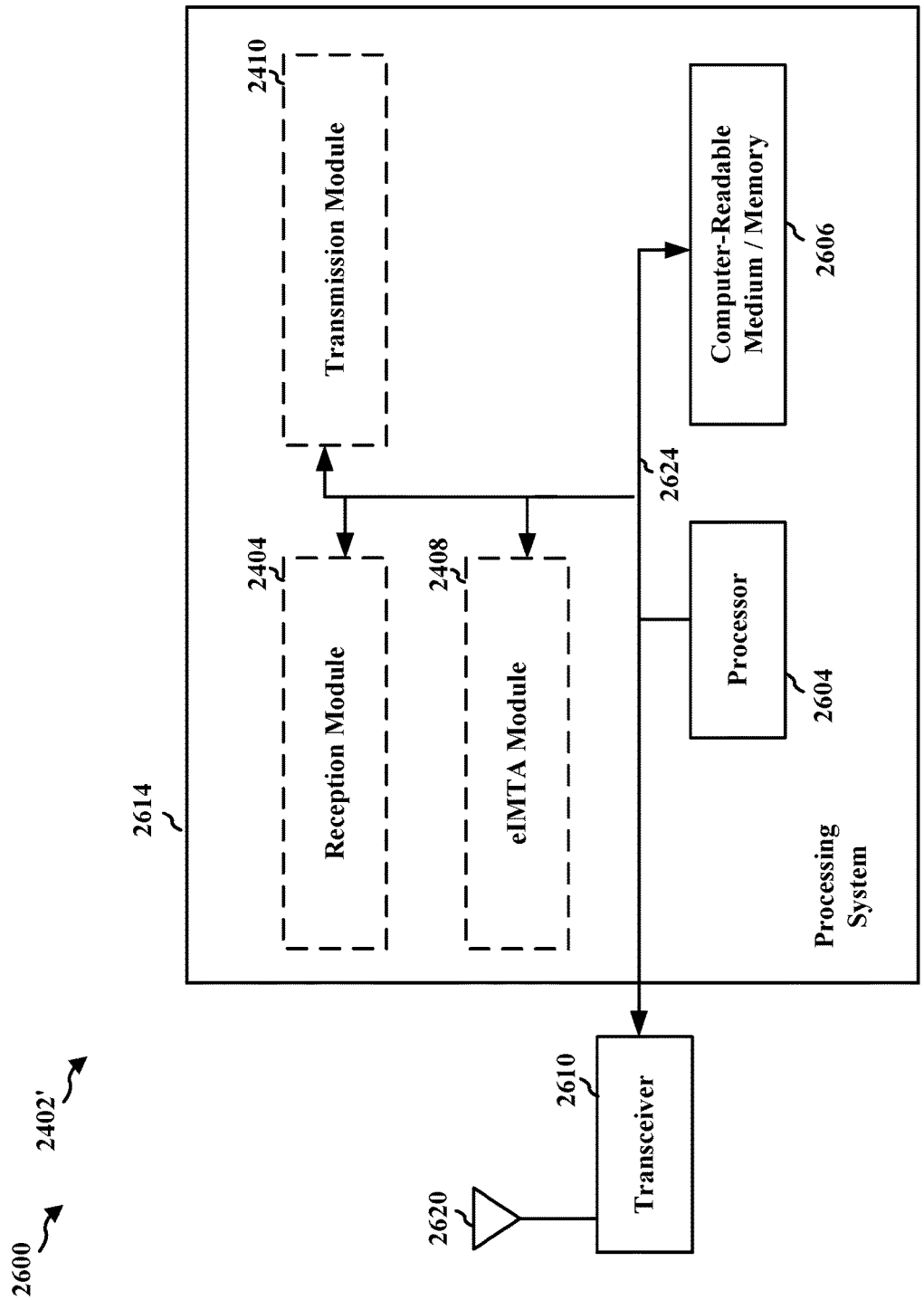
FIG. 26 is a diagram illustrating an example of a hardware implementation for another apparatus employing a processing system.

FIG. 26 is a diagram 2600 illustrating an example of a hardware implementation for an apparatus 2402' employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors and/or hardware modules, represented by the processor 2604, the modules 2404, 2408, 2410, and the computer-readable medium/memory 2606. The bus 2624 may also link various other circuits such as timing sources, peripherals, voltage regulators, and power management circuits, which are well known in the art, and therefore, will not be described any further.

The processing system 2614 may be coupled to a transceiver 2610. The transceiver 2610 is coupled to one or more antennas 2620. The transceiver 2610 provides a means for communicating with various other apparatus over a transmission medium. The transceiver 2610 receives a signal from the one or more antennas 2620, extracts information from the received signal, and provides the extracted information to the processing system 2614, specifically the reception module 2404. In addition, the transceiver 2610 receives information from the processing system 2614, specifically the transmission module 2410, and based on the received information, generates a signal to be applied to the one or more antennas 2620. The processing system 2614 includes a processor 2604 coupled to a computer-readable medium/memory 2606. The processor 2604 is responsible for general processing, including the execution of software stored on the computer-readable medium/memory 2606. The software, when executed by the processor 2604, causes the processing system 2614 to perform the various functions described supra for any particular apparatus. The computer-readable medium/memory 2606 may also be used for storing data that is manipulated by the processor 2604 when executing software. The processing system further includes at least one of the modules 2404, 2408, and 2410. The modules may be software modules running in the processor 2604, resident/stored in the computer readable medium/memory 2606, one or more hardware modules coupled to the processor 2604, or some combination thereof. The processing system 2614 may be a component of the eNB 610 and may include the memory 676 and/or at least one of the TX processor 616, the RX processor 670, and the controller/processor 675.

In one configuration, the apparatus 2402/2402' for wireless communication includes means for means for transmitting first configuration information for a SCC in a first frame on a PCC to a UE. The PCC is in a licensed spectrum. The SCC is in an unlicensed spectrum. The first configuration information indicates a first subframe allocation for at least one frame on the SCC. The apparatus 2402/2402' includes means for attempting to transmit an indicator indicating a start of data transmission to the UE in accordance with the first subframe allocation on the SCC. The apparatus 2402/2402' includes means for transmitting a downlink subframe to the UE during the at least one frame on the SCC in accordance with the first subframe allocation when the attempt to transmit the indicator is successful. The downlink subframe is an initial subframe of the data transmission and subsequent to the start of the first subframe allocation.

The first subframe allocation may indicate an allocation of one or more uplink subframes, one or more downlink subframes, and one or more special subframes in the at least one frame. The at least one frame may include the first frame on the SCC. The first configuration information may be transmitted on the PCC in an initial subframe of the first frame.

The apparatus 2402/2402' may include means for receiving data from or transmitting data to the UE in a last subframe of the first frame on the SCC in order to retain the unlicensed spectrum. The apparatus 2402/2402' may include means for transmitting second configuration information for the SCC to the UE in an initial subframe of a second frame on the PCC. The second frame may be subsequent and consecutive to the first frame. The second configuration information may indicate a second subframe allocation for the second frame on the SCC. The apparatus 2402/2402' may include means for transmitting a second downlink subframe to the UE, the second downlink subframe being subsequent to the start of the second subframe allocation. The first configuration information indicates that initial two subframes of the first frame on the SCC are downlink subframes.

The apparatus 2402/2402' may include means for transmitting one or more discovery signals on the SCC in a discovery window that occupies at least one subframe in the first frame on the SCC. The means for attempting to transmit the indicator may be configured to attempt to transmit the indicator in a subframe on the SCC subsequent to the transmission of the discovery signals in the discovery window. The means for transmitting the downlink subframe may be configured to transmit the downlink subframe subsequent to the transmission of the discovery signals in the discovery window in accordance with a default configuration when the attempt to transmit the indicator is not successful.

The at least one frame includes M frames subsequent to the first frame. M is an integer greater than 1. The first configuration information may indicate the first allocation of subframes in one frame. The first allocation of the one frame may be applied to each frame of the at least one frame. The first subframe allocation may allocate one or more downlink subframes consecutively and prior to each uplink subframe in the one frame.

The first configuration information may indicate a plurality of consecutive downlink subframes in the one frame. The means for transmitting the first configuration information may be configured to transmit the first configuration information in an $n^{th}$ subframe of the first frame corresponding to an initial downlink subframe of the plurality of consecutive downlink subframes of the one frame. n is an integer. The at least one frame includes the first frame and a second frame consecutively. The means for transmitting the downlink subframe is configured to transmit the downlink subframe to the UE on the SCC within a period from the $n^{th}$ subframe of the first frame to an $(n-1)^{th}$ subframe of the second frame.

The first configuration information may indicate a plurality of consecutive uplink subframes at an end of the one frame. The apparatus 2402/2402' may include means for communicating with the UE in a subframe of the first frame corresponding to an initial subframe of the plurality of consecutive uplink subframes in accordance with a default configuration when the attempt to transmit the indicator is not successful.

The apparatus 2402/2402' may include means for transmitting an uplink grant associated with the at least one frame. A conflict may exist between the uplink grant and the first subframe allocation. The apparatus 2402/2402' may include means for communicating with the UE during the at least one frame in accordance with the uplink grant. The at least one frame may include a second frame on the SCC starting at the transmitted downlink subframe.

The at least one frame includes M frames. M is an integer greater than 1. An initial frame of the M frames may start at the transmitted downlink subframe subsequent to the start of the data transmission. The apparatus 2402/2402' may include means for transmitting to the UE a $k^{th}$ subsequent indicator indicating a start of data transmission on the SCC subsequent to a $k^{th}$ frame of the M frames. k is an integer and k=1 to (M−1). The $(k+1)^{th}$ frame of the M frames may start at an initial downlink subframe subsequent to the $k^{th}$ subsequent indicator. The apparatus 2402/2402' may include means for communicating data within the M frames with the UE on the SCC in accordance with the first subframe allocation.

In another configuration, the apparatus 2402/2402' includes means for transmitting an indicator indicating a start of data transmission to a UE on a carrier in a first frame. The carrier is in an unlicensed spectrum. The apparatus 2402/2402' includes means for attempting to transmit first configuration information on the carrier to the UE. The first configuration information indicates a first subframe allocation for at least one frame on the carrier. The apparatus 2402/2402' includes means for transmitting a downlink subframe to the UE during the at least one frame on the carrier in accordance with the first subframe allocation when the attempt to transmit the first configuration information on the carrier is successful. The downlink subframe is an initial subframe of the data transmission and subsequent to the start of the first subframe allocation.

The first subframe allocation may indicate allocation of one or more uplink subframes, one or more downlink subframes, and one or more special subframes in the at least one frame. The at least one frame may include a second frame that is subsequent and consecutive to the first frame.

The apparatus 2402/2402' may include means for transmitting second configuration information in an initial downlink subframe in the second frame. The second configuration information may indicate a second subframe allocation for the second frame on the carrier. The apparatus 2402/2402' may include means for transmitting a second downlink subframe in the second frame on the carrier to the UE in accordance with the second subframe allocation when the attempt to transmit the first configuration information on the carrier is not successful.

The at least one frame may include the first frame. The means for transmitting the first configuration information may be configured to transmit the first configuration information in an initial downlink subframe of the first frame. The at least one frame includes M frames subsequent to the first frame. M is an integer greater than 1.

The apparatus 2402/2402' may include means for transmitting second configuration information in an initial downlink subframe in an initial frame of the M frames. The second configuration information may indicate second subframe allocation in one frame on the carrier. The apparatus 2402/2402' may include means for transmitting to the UE a downlink subframe in each of the M frames in accordance with the second subframe allocation when the attempt to transmit the first configuration information on the carrier is not successful.

The apparatus 2402/2402' may include means for transmitting an uplink grant associated with the at least one frame. A conflict exists between the uplink grant and the first subframe allocation. The apparatus 2402/2402' may include means for communicating with the UE during the at least one frame in accordance with the uplink grant. The apparatus 2402/2402' may include means for transmitting the first configuration information in a plurality of downlink subframes of the first frame. The at least one frame may include a second frame on the carrier starting at the downlink subframe.

The at least one frame may include M frames. M is an integer greater than 1. An initial frame of the M frames may start at the downlink subframe subsequent to the start of the data transmission. The first configuration information may be transmitted in the downlink subframe subsequent to the start of the data transmission. The apparatus 2402/2402' may include means for transmitting a $k^{th}$ subsequent indicator indicating a start of data transmission to the UE on the carrier subsequent to a $k^{th}$ frame of the M frames. k being an integer and k=1 to (M−1). The $(k+1)^{th}$ frame of the M frames starts in an initial downlink subframe subsequent to the $k^{th}$ subsequent indicator. The apparatus 2402/2402' may include means for communicating data in the M frames with the UE on the carrier in accordance with the first subframe allocation.

The aforementioned means may be one or more of the aforementioned modules of the apparatus 2402 and/or the processing system 2614 of the apparatus 2402' configured to perform the functions recited by the aforementioned means. As described supra, the processing system 2614 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE) in communication with a base station employing a primary component carrier (PCC) in a licensed spectrum and a secondary component carrier (SCC) in an unlicensed spectrum, comprising:

attempting to receive first configuration information in a first frame on the PCC from a base station, the first configuration information indicating a first downlink/uplink configuration for subframes of at least one frame on a particular unlicensed carrier of the base station, wherein the particular unlicensed carrier is the SCC;

attempting to detect a start of the data transmission from the base station on the particular unlicensed carrier;

receiving a downlink subframe from the base station during the at least one frame on the particular unlicensed carrier in accordance with the first downlink/uplink configuration-when the attempt to receive the first configuration information is successful and when the attempt to detect the start of the data transmission is successful, the downlink subframe being an initial subframe of a data transmission and subsequent to the start of the indicated first downlink/uplink configuration; and communicating with the base station in a subframe of the at least one frame corresponding to an initial subframe in accordance with a default downlink/uplink configuration when the attempt to detect the start of data transmission is not successful.

2. The method of claim 1 wherein the first downlink/uplink configuration indicates an allocation of one or more uplink subframes, one or more downlink subframes, and one or more special subframes in the at least one frame.

3. The method of claim 1 wherein the at least one frame includes the first frame on the SCC, and wherein the first configuration information is received on the PCC in an initial subframe of the first frame.

4. The method of claim 3, further comprising:
transmitting data to or receiving data from the base station in a last subframe of the first frame on the SCC in order to retain the unlicensed spectrum;
receiving second configuration information for the SCC from the base station in an initial subframe of a second frame on the PCC, wherein the second frame is subsequent and consecutive to the first frame, wherein the second configuration information indicates a second downlink/uplink configuration for the second frame on the SCC; and
receiving a second downlink subframe from the base station, the second downlink subframe being subsequent to the start of the second downlink/uplink configuration.

5. The method of claim 1 wherein the first configuration information indicates the first downlink/uplink configuration in one frame, and wherein the first downlink/uplink configuration of the one frame is applied to each frame of the at least one frame.

6. The method of claim 5, wherein the first configuration information indicates a plurality of consecutive uplink subframes at an end of the one frame, and wherein the initial subframe is the initial subframe of the plurality of consecutive uplink subframes.

7. A method of wireless communication at a user equipment (UE) in communication with a base station employing a primary component carrier (PCC) in a licensed spectrum and a secondary component carrier (SCC) in an unlicensed spectrum, comprising:

attempting to receive first configuration information from the base station on a particular unlicensed carrier, the first configuration information indicating a first downlink/uplink configuration for subframes of at least one frame on the particular unlicensed carrier of the base station, wherein the particular unlicensed carrier is the SCC;

attempting to detect a start of the data transmission from the base station on the particular unlicensed carrier in a first frame;

receiving a downlink subframe from the base station during the at least one frame on the particular unlicensed carrier in accordance with the first downlink/uplink configuration-when the attempt to receive the first configuration information is successful and when the attempt to detect the start of the data transmission is successful, the downlink subframe being an initial subframe of a data transmission and subsequent to the start of the indicated first downlink/uplink configuration; and communicating with the base station in a subframe of the at least one frame corresponding to an initial subframe in accordance with a default downlink/uplink configuration when the attempt to detect the start of data transmission is not successful.

8. The method of claim 7, wherein the at least one frame includes a second frame that is subsequent and consecutive to the first frame.

9. The method of claim 8, further comprising:
receiving second configuration information in an initial downlink subframe in the second frame, wherein the second configuration information indicates a second downlink/uplink configuration for the second frame on the particular unlicensed carrier; and
receiving a second downlink subframe in the second frame on the particular unlicensed carrier from the base station in accordance with the second downlink/uplink configuration when the attempt to receive the first configuration information on the particular unlicensed carrier is not successful.

10. The method of claim 7, wherein the at least one frame includes the first frame, and wherein the first configuration information is received in an initial downlink subframe of the first frame.

11. The method of claim 7, wherein the at least one frame includes M frames subsequent to the first frame, M being an integer greater than 1.

12. The method of claim 11, further comprising:
receiving second configuration information in an initial downlink subframe in an initial frame of the M frames, wherein the second configuration information indicates second downlink/uplink configuration in one frame on the particular unlicensed carrier; and
receiving from the base station a downlink subframe in each of the M frames in accordance with the second downlink/uplink configuration when the attempt to receive the first configuration information on the particular unlicensed carrier is not successful.

13. The method of claim 7, further comprising:
receiving an uplink grant associated with the at least one frame;
determining that a conflict exists between the uplink grant and the first downlink/uplink configuration; and
communicating with the base station during the at least one frame in accordance with the uplink grant.

14. A method of wireless communication at a base station employing a primary component carrier (PCC) in a licensed spectrum and a secondary component carrier (SCC) in an unlicensed spectrum, comprising:

attempting to transmit first configuration information to a user equipment (UE) in a first frame on the PCC, the first configuration information indicating a first downlink/uplink configuration for subframes of at least one frame on a particular unlicensed carrier, wherein the particular unlicensed carrier is the SCC;

attempting to transmit an indicator indicating a start of data transmission to the UE in accordance with the first downlink/uplink configuration on the particular unlicensed carrier;

transmitting a downlink subframe to the UE during the at least one frame on the particular unlicensed carrier in accordance with the first downlink/uplink configuration when the attempt to transmit the first configuration information is successful and the attempt to transmit the indicator is successful, the downlink subframe being an initial subframe of a data transmission and subsequent to the start of the indicated first downlink/uplink configuration; and communicating with the UE in a subframe of the at least one frame corresponding to an initial subframe in accordance with a default downlink/uplink configuration when an attempt to transmit the indicator to the UE is not successful.

15. The method of claim 14 wherein the first downlink/uplink configuration indicates an allocation of one or more uplink subframes, one or more downlink subframes, and one or more special subframes in the at least one frame.

16. The method of claim 14, wherein the at least one frame includes the first frame on the SCC, and wherein the first configuration information is transmitted on the PCC in an initial subframe of the first frame.

17. The method of claim 16, further comprising:
receiving data from or transmitting data to the UE in a last subframe of the first frame on the SCC in order to retain the unlicensed spectrum;
transmitting second configuration information for the SCC to the UE in an initial subframe of a second frame on the PCC, wherein the second frame is subsequent and consecutive to the first frame, wherein the second configuration information indicates a second downlink/uplink configuration for the second frame on the SCC; and
transmitting a second downlink subframe to the UE, the second downlink subframe being subsequent to the start of the second downlink/uplink configuration.

18. The method of claim 14, wherein the first configuration information indicates the first downlink/uplink configure in one frame, and wherein the first-downlink/uplink configuration of the one frame is applied to each frame of the at least one frame.

19. The method of claim 18, wherein the first configuration information indicates a plurality of consecutive uplink subframes at an end of the one frame, and wherein the initial subframe is the initial subframe of the plurality of consecutive uplink subframes.

20. The method of claim 14, further comprising:
transmitting an indicator indicating a start of data transmission to a user equipment (UE) on the particular unlicensed carrier in a first frame.

21. The method of claim 20, wherein the at least one frame includes a second frame that is subsequent and consecutive to the first frame.

22. The method of claim 21, further comprising:
transmitting second configuration information in an initial downlink subframe in the second frame, wherein the second configuration information indicates a second downlink/uplink configuration for the second frame on the particular unlicensed carrier; and
transmitting a second downlink subframe in the second frame on the particular unlicensed carrier to the UE in accordance with the second downlink/uplink configuration when the attempt to transmit the first configuration information is not successful.

23. The method of claim 20, wherein the at least one frame includes the first frame, and wherein the first configuration information is transmitted in an initial downlink subframe of the first frame.

24. The method of claim 20, wherein the at least one frame includes M frames subsequent to the first frame, M being an integer greater than 1.

25. The method of claim 24, further comprising:
transmitting second configuration information in an initial downlink subframe in an initial frame of the M frames, wherein the second configuration information indicates second downlink/uplink configuration in one frame on the particular unlicensed carrier; and
transmitting to the UE a downlink subframe in each of the M frames in accordance with the second downlink/uplink configuration when the attempt to transmit the first configuration information on the particular unlicensed carrier is not successful.

26. The method of claim 20, further comprising:
transmitting an uplink grant associated with the at least one frame, wherein a conflict exists between the uplink grant and the first downlink/uplink configuration; and
communicating with the UE during the at least one frame in accordance with the uplink grant.

27. An apparatus for wireless communication, the apparatus being a user equipment (UE) in communication with a base station employing a primary component carrier (PCC) in a licensed spectrum and a secondary component carrier (SCC) in an unlicensed spectrum, comprising:
a memory; and
at least one processor coupled to the memory and configured to
attempt to receive first configuration information in a first frame on the PCC from a base station, wherein the first configuration information indicates a first downlink/uplink configuration for subframes of at least one frame on a particular unlicensed carrier of the base station, wherein the particular unlicensed carrier is the SCC;
attempt to detect a start of the data transmission from the base station on the SCC;
receive a downlink subframe from the base station during the at least one frame on the particular unlicensed carrier in accordance with the first downlink/uplink configuration when the attempt to receive the first configuration information is successful and when the attempt to detect the start of the data transmission is successful, the downlink subframe being an initial subframe of a data transmission and subsequent to the start of the indicated first downlink/uplink configuration; and
communicate with the base station in a subframe of the at least one frame corresponding to an initial subframe in accordance with a default downlink/uplink configuration when the attempt to detect the start of data transmission is not successful.

28. An apparatus for wireless communication, the apparatus being a base station employing a primary component carrier (PCC) in a licensed spectrum and a secondary component carrier (SCC) in an unlicensed spectrum, comprising:
  a memory; and
  at least one processor coupled to the memory and configured to
    attempt to transmit first configuration information to a user equipment (UE) in a first frame on the PCC, the first configuration information indicating a first downlink/uplink configuration for subframes of at least one frame on a particular unlicensed carrier, wherein the particular unlicensed carrier is the SCC;
    attempt to transmit an indicator indicating a start of data transmission to the UE in accordance with the first downlink/uplink configuration on the particular unlicensed carrier;
    transmit a downlink subframe to the UE during the at least one frame on the particular unlicensed carrier in accordance with the first downlink/uplink configuration when the attempt to transmit the first configuration information is successful and the attempt to transmit the indicator is successful, the downlink subframe being an initial subframe of a data transmission and subsequent to the start of the indicated first downlink/uplink configuration; and
    communicate with the UE in a subframe of the at least one frame corresponding to an initial subframe in accordance with a default downlink/uplink configuration when an attempt to transmit the indicator to the UE is not successful.

* * * * *